(12) United States Patent
Mikami et al.

(10) Patent No.: US 12,142,759 B2
(45) Date of Patent: Nov. 12, 2024

(54) POSITIVE ELECTRODE ACTIVE MATERIAL AND SECONDARY BATTERY

(71) Applicant: SEMICONDUCTOR ENERGY LABORATORY CO., LTD., Atsugi (JP)

(72) Inventors: Mayumi Mikami, Kanagawa (JP); Yohei Momma, Kanagawa (JP); Teruaki Ochiai, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 635 days.

(21) Appl. No.: 17/291,463

(22) PCT Filed: Nov. 7, 2019

(86) PCT No.: PCT/IB2019/059561
§ 371 (c)(1),
(2) Date: May 5, 2021

(87) PCT Pub. No.: WO2020/104881
PCT Pub. Date: May 28, 2020

(65) Prior Publication Data
US 2022/0006082 A1    Jan. 6, 2022

(30) Foreign Application Priority Data
Nov. 21, 2018 (JP) .................. 2018-218362

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/505* (2013.01); *H01M 10/0525* (2013.01); *H01M 2004/028* (2013.01)

(58) Field of Classification Search
CPC .... H01M 4/525; H01M 4/131; H01M 4/1315; H01M 4/1391; H01M 4/13915;
(Continued)

(56) References Cited

U.S. PATENT DOCUMENTS 8,003,256 B2    8/2011    Ohishi
8,808,918 B2    8/2014    Jung et al.
(Continued)

FOREIGN PATENT DOCUMENTS

CN    103380529 A    10/2013
CN    103635431 A    3/2014
(Continued)

OTHER PUBLICATIONS

International Search Report (Application No. PCT/IB2019/059561) dated Feb. 18, 2020.
(Continued)

*Primary Examiner* — Matthew W Van Oudenaren
(74) *Attorney, Agent, or Firm* — Fish & Richardson P.C.

(57) ABSTRACT

A positive electrode active material with high capacity and excellent charging and discharging cycle performance for a lithium-ion secondary battery is provided. The positive electrode active material contains lithium, cobalt, and oxygen, and the spin density attributed to a bivalent cobalt ion and a tetravalent cobalt ion is within a predetermined range. It is preferable that the positive electrode active material further contain magnesium. An appropriate magnesium concentration is represented as a concentration with respect to cobalt. It is also preferable that the positive electrode active material further contain fluorine.

8 Claims, 46 Drawing Sheets

(51) Int. Cl.
*H01M 4/505* (2010.01)
*H01M 10/0525* (2010.01)

(58) Field of Classification Search
CPC ........ H01M 4/50; H01M 4/502; H01M 4/505; H01M 4/52; H01M 4/523; H01M 10/0525; H01M 10/052; H01M 2004/028; H01M 2004/021
See application file for complete search history.

(56) References Cited

U.S. PATENT DOCUMENTS

| | | | |
|---|---|---|---|
| 9,882,206 | B2 | 1/2018 | Gopukumar et al. |
| 9,979,021 | B2 | 5/2018 | Paulsen et al. |
| 10,044,035 | B2 | 8/2018 | Paulsen et al. |
| 10,170,763 | B2 | 1/2019 | Blangero et al. |
| 11,094,927 | B2 | 8/2021 | Kawakami et al. |
| 2002/0110736 | A1 | 8/2002 | Kweon et al. |
| 2003/0104279 | A1 | 6/2003 | Miyazaki et al. |
| 2004/0142241 | A1 | 7/2004 | Nagayama |
| 2006/0263690 | A1 | 11/2006 | Suhara et al. |
| 2007/0117014 | A1 | 5/2007 | Saito et al. |
| 2008/0241693 | A1 | 10/2008 | Fukuchi et al. |
| 2009/0087362 | A1 | 4/2009 | Sun et al. |
| 2009/0104532 | A1 | 4/2009 | Hosoya |
| 2010/0086854 | A1 | 4/2010 | Kumar et al. |
| 2010/0247986 | A1 | 9/2010 | Toyama et al. |
| 2013/0052534 | A1 | 2/2013 | Fujiki et al. |
| 2013/0323596 | A1 | 12/2013 | Morita et al. |
| 2014/0087257 | A1 | 3/2014 | Gopukumar et al. |
| 2014/0212759 | A1 | 7/2014 | Blangero et al. |
| 2016/0006032 | A1 | 1/2016 | Paulsen et al. |
| 2016/0013478 | A1 | 1/2016 | Satow et al. |
| 2016/0276659 | A1 | 9/2016 | Choi et al. |
| 2017/0062807 | A1* | 3/2017 | Vanhatalo .............. C01G 51/42 |
| 2017/0069907 | A1 | 3/2017 | Zhu et al. |
| 2018/0013130 | A1 | 1/2018 | Ochiai et al. |
| 2018/0102536 | A1 | 4/2018 | Kawakami et al. |
| 2018/0145317 | A1 | 5/2018 | Momma et al. |
| 2018/0145368 | A1 | 5/2018 | Ochiai et al. |
| 2020/0176770 | A1 | 6/2020 | Takahashi et al. |
| 2020/0313228 | A1 | 10/2020 | Ochiai et al. |
| 2021/0083281 | A1 | 3/2021 | Mikami et al. |
| 2022/0190319 | A1* | 6/2022 | Narita ............... H01M 10/0525 |
| 2023/0052866 | A1* | 2/2023 | Mikami ................. H01M 4/36 |

FOREIGN PATENT DOCUMENTS

| | | |
|---|---|---|
| CN | 105655554 A | 6/2016 |
| CN | 108110225 A | 6/2018 |
| EP | 2630686 A | 8/2013 |
| EP | 2720981 A | 4/2014 |
| JP | 2000-012022 A | 1/2000 |
| JP | 2000012022 * | 1/2000 |
| JP | 2000-203842 A | 7/2000 |
| JP | 2000-277117 A | 10/2000 |
| JP | 2002-216760 A | 8/2002 |
| JP | 2006-261132 A | 9/2006 |
| JP | 2010-080407 A | 4/2010 |
| JP | 2013-541819 | 11/2013 |
| JP | 2014-523840 | 9/2014 |
| JP | 2015-099722 A | 5/2015 |
| JP | 2016-131156 A | 7/2016 |
| JP | 2018-088407 A | 6/2018 |
| KR | 2014-0009526 A | 1/2014 |
| KR | 2014-0040673 A | 4/2014 |
| KR | 2018-0058628 A | 6/2018 |
| WO | WO-2012/052810 | 4/2012 |
| WO | WO-2012/171780 | 12/2012 |

OTHER PUBLICATIONS

Written Opinion (Application No. PCT/IB2019/059561) dated Feb. 18, 2020.
Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.
Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, pp. 165114-1-155114-9.
Chen.Z et al., "Staging Phase Transitions in LixCoO2", J. Electrochem. Soc. (Journal of The Electrochemical Society), 2002, vol. 149, No. 12, pp. A1604-A1609.
Counts.W et al., "Fluoride Model Systems: II, The Binary Systems CaF2—BeF2, MgF2—BeF2, and LiF—MgF2", J. Am. Ceram. Soc. (Journal of The American Ceramic Society), 1953, vol. 36, No. 1, pp. 12-17.
Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.
Mukai.K et al., "Spin fluctuations above 100 K in stoichiometric LiCoO2", Journal of Physics: Conference Series, Jun. 1, 2014, vol. 551, pp. 012008-1-012008-6.
O'Mara.W et al., "Structure of the Fluorine-Containing Trapped-Hole Center in Magnesium Oxide", Phys. Rev. (Physical Review), Mar. 15, 1969, vol. 179, No. 3, pp. 816-818.
McAlpin.J et al., "EPR Evidence for Co(IV) Species Produced During Water Oxidation at Neutral pH", J. Am. Chem. Soc. (Journal of The American Chemical Society), Apr. 30, 2010, vol. 132, No. 20, pp. 6882-6883.
Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.
Stoyanova.R et al., "High-Frequency Electron Paramagnetic Resonance Analysis of the Oxidation State and Local Structure of Ni and Mn Ions in Ni, Mn-Codoped LiCoO2", Inorg. Chem. (Inorganic Chemistry), 2010, vol. 49, No. 4, pp. 1932-1941.
Fey.G et al., "Long-cycling coated LiCoO2 cathodes for lithium batteries—A review", J. Ind. Eng. Chem. (Journal of Industrial and Engineering Chemistry), 2004, vol. 10, No. 7, pp. 1090-1103.
Matsuta.S et al., "Electron-Spin-Resonance Study of the Reaction of Electrolytic Solutions on the Positive Electrode for Lithium-Ion Secondary Batteries", J. Electrochem. Soc. (Journal of The Electrochemical Society), 2001, vol. 148, No. 1, pp. A7-A10.
Kim.Y et al., "Suppression of Cobalt Dissolution from the LiCoO2 Cathodes with Various Metal-Oxide Coatings", J. Electrochem. Soc. (Journal of The Electrochemical Society), 2003, vol. 150, No. 12, pp. A1723-A1725.
Cho.J et al., "LiCoO2 Cathode Material That Does Not Show a Phase Transition from Hexagonal to Monoclinic Phase", J. Electrochem. Soc. (Journal of The Electrochemical Society), Sep. 4, 2001, vol. 148, No. 10, pp. A1110-A1115.
Cho.J et al., "Zero-Strain Intercalation Cathode for Rechargeable Li-Ion Cell", Angew. Chem. Int. Ed. (Angewandte Chemie International Edition), Sep. 17, 2001, vol. 40, No. 18, pp. 3367-3369.
Tan.H et al., "Microscopy Study of Structural Evolution in Epitaxial LiCoO2 Positive Electrode Films during Electrochemical Cycling", ACS Applied Materials & Interfaces, Feb. 25, 2016, vol. 8, No. 10, pp. 6727-6735.
Grey.C et al., "NMR Studies of Cathode Materials for Lithium-Ion Rechargeable Batteries", Chem. Rev.(Chemical Reviews), Sep. 3, 2004, vol. 104, No. 10, pp. 4493-4512.
Dahéron.L et al., "Possible Explanation for the Efficiency of Al-Based Coatings on LiCoO2: Surface Properties of LiCo1—xAlxO2 Solid Solution", Chem. Mater. (Chemistry of Materials), Nov. 2, 2009, vol. 21, No. 23, pp. 5607-5616.
Liu.A et al., "Synthesis of Mg and Mn Doped LiCoO2 and Effects on High Voltage Cycling", J. Electrochem. Soc. (Journal of The Electrochemical Society), Jun. 2, 2017, vol. 164, No. 7, pp. A1655-A1664.

(56) References Cited

OTHER PUBLICATIONS

Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.
Taiwanese Office Action (Application No. 108141320) dated Sep. 7, 2023.

\* cited by examiner

FIG. 18A1
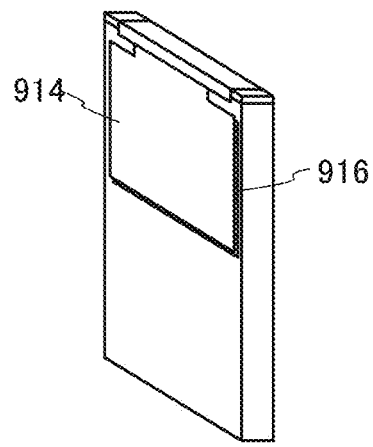
FIG. 18A2
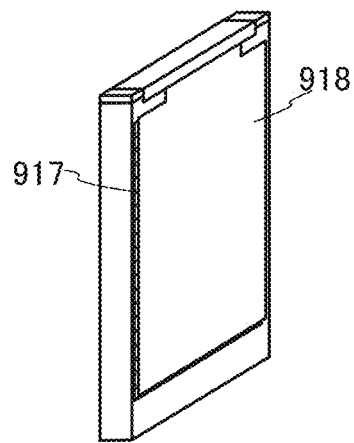
FIG. 18B1
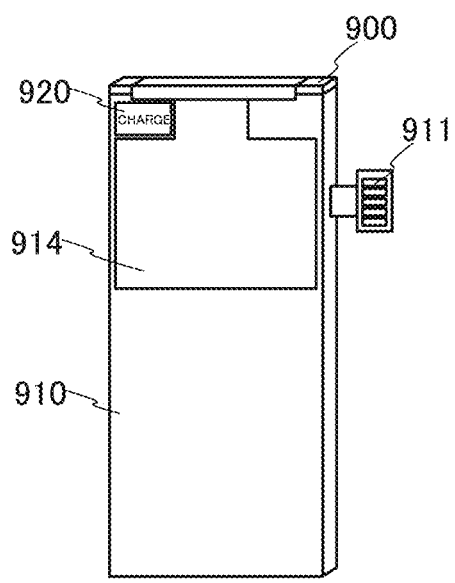
FIG. 18B2
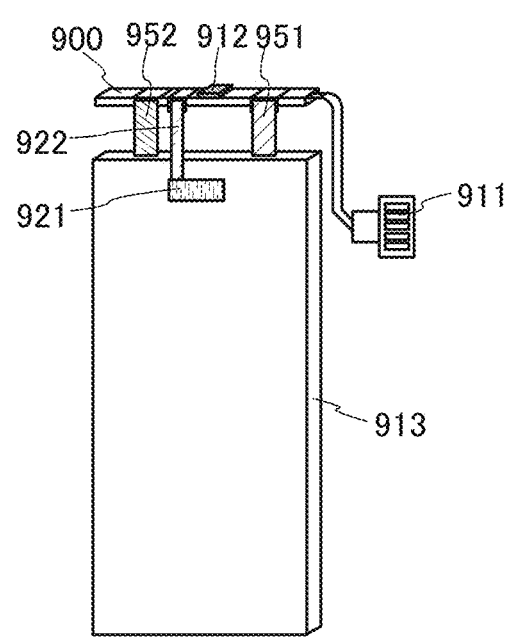

FIG. 26A
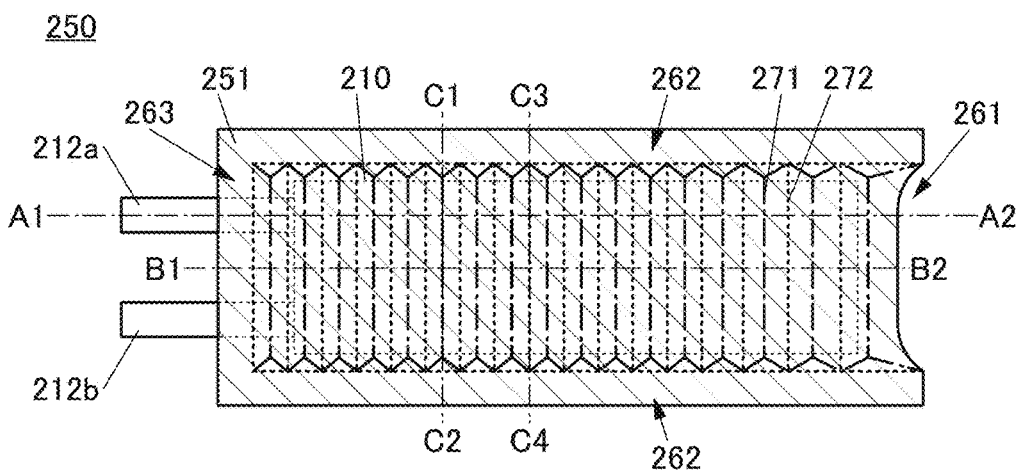
FIG. 26B1
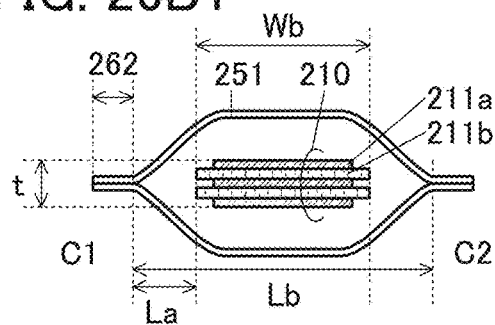
FIG. 26B2
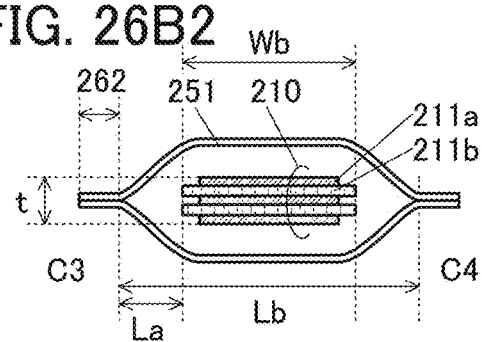
FIG. 26C
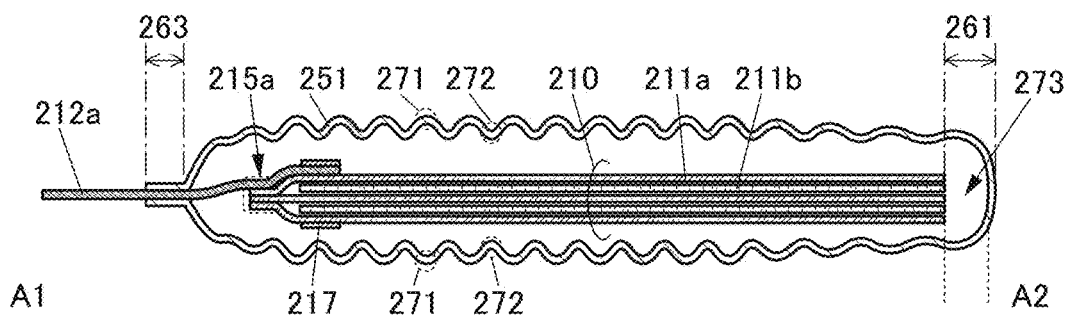
FIG. 26D
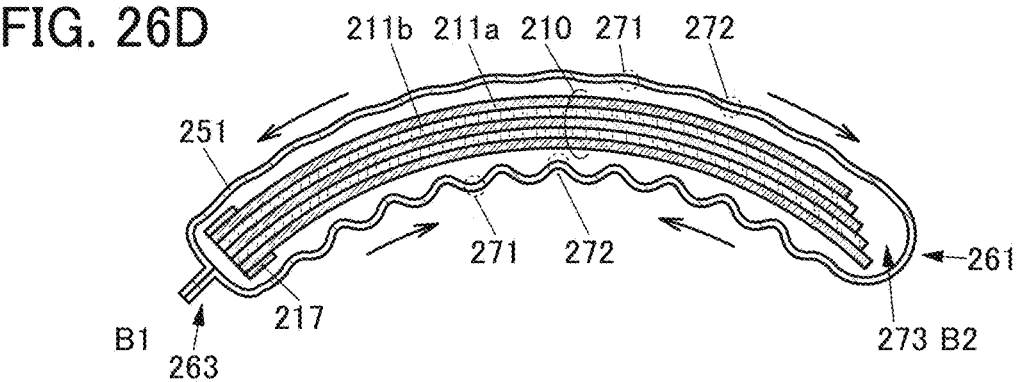

POSITIVE ELECTRODE ACTIVE MATERIAL AND SECONDARY BATTERY

CROSS REFERENCE TO RELATED APPLICATIONS

This application is a U.S. National Phase Application under 35 U.S.C. § 371 of International Application PCT/IB2019/059561, filed on Nov. 7, 2019, which is incorporated by reference and claims the benefit of a foreign priority application filed in Japan on Nov. 21, 2018, as Application No. 2018-218362.

TECHNICAL FIELD

One embodiment of the present invention relates to an object, a method, or a manufacturing method. Alternatively, the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used for a secondary battery, a secondary battery, and an electronic device including a secondary battery.

Note that in this specification, a power storage device refers to every element and device having a function of storing power. Examples of the power storage device include a storage battery (also referred to as a secondary battery) such as a lithium-ion secondary battery, a lithium-ion capacitor, and an electric double layer capacitor.

In addition, electronic devices in this specification and the like mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, tablets, and laptop computers; portable music players; digital cameras; medical equipment; next-generation clean energy vehicles (hybrid electric vehicles (HEV), electric vehicles (EV), plug-in hybrid electric vehicles (PHEV), and the like); and the like. Furthermore, the lithium-ion secondary batteries are essential as rechargeable energy supply sources for today's information society.

The performance required for lithium-ion secondary batteries includes much higher energy density, improved cycle performance, safety under a variety of environments, improved long-term reliability, and the like.

Thus, improvement of a positive electrode active material has been studied to improve the cycle performance and increase the capacity of lithium-ion secondary batteries (Patent Document 1 and Patent Document 2). In addition, a crystal structure of a positive electrode active material also has been studied (Non-Patent Document 1 to Non-Patent Document 3).

X-ray diffraction (XRD) is one of methods used for analysis of a crystal structure of a positive electrode active material. With the use of the ICSD (Inorganic Crystal Structure Database) described in Non-Patent Document 5, XRD data can be analyzed.

REFERENCE

Patent Document

[Patent Document 1] Japanese Patent Application Laid-Open No. 2002-216760
[Patent Document 2] Japanese Patent Application Laid-Open No. 2006-261132

Non-Patent Document

[Non-Patent Document 1] Toyoki Okumura et al., "Correlation of lithium ion distribution and X-ray absorption near-edge structure in O3- and O2-lithium cobalt oxides from first-principle calculation", *Journal of Materials Chemistry*, 2012, 22, pp. 17340-17348.
[Non-Patent Document 2] Motohashi, T. et al., "Electronic phase diagram of the layered cobalt oxide system $Li_xCoO_2$ (0.0≤x≤1.0)", *Physical Review B*, 80 (16); 165114.
[Non-Patent Document 3] Zhaohui Chen et al., "Staging Phase Transitions in $Li_xCoO_2$, *Journal of The Electrochemical Society*, 2002, 149 (12) A1604-A1609.
[Non-Patent Document 4] W. E. Counts et al., *Journal of the American Ceramic Society*, (1953), 36 [1] 12-17. FIG. 01471.
[Non-Patent Document 5] Belsky, A. et al., "New developments in the Inorganic Crystal Structure Database (ICSD): accessibility in support of materials research and design", *Acta Cryst.* (2002), B58, 364-369.

SUMMARY OF THE INVENTION

Problems to be Solved by the Invention

An object of one embodiment of the present invention is to provide a positive electrode active material with high capacity and excellent charging and discharging cycle performance for a lithium-ion secondary battery, and a manufacturing method thereof. Another object is to provide a manufacturing method of a positive electrode active material with high productivity. Another object of one embodiment of the present invention is to provide a positive electrode active material that suppresses a decrease in capacity in charging and discharging cycles when used for a lithium-ion secondary battery. Another object of one embodiment of the present invention is to provide a high-capacity secondary battery. Another object of one embodiment of the present invention is to provide a secondary battery with excellent charging and discharging characteristics. Another object is to provide a positive electrode active material in which elution of a transition metal such as cobalt is inhibited even when a state being charged with high voltage is held for a long time. Another object of one embodiment of the present invention is to provide a highly safe or reliable secondary battery.

Another object of one embodiment of the present invention is to provide a novel material, novel active material particles, a novel power storage device, or a manufacturing method thereof.

Note that the descriptions of these objects do not preclude the existence of other objects. One embodiment of the present invention does not have to achieve all these objects. Note that other objects can be taken from the descriptions of the specification, the drawings, and the claims.

Means for Solving the Problems

One embodiment of the present invention is a positive electrode active material containing lithium, cobalt, and oxygen, in which a spin density attributed to a bivalent cobalt ion and a tetravalent cobalt ion is greater than or equal to $2.0 \times 10^{17}$ spins/g and less than or equal to $1.0 \times 10^{18}$ spins/g.

It is preferable that the positive electrode active material further contain magnesium. The concentration of magnesium with respect to cobalt is preferably greater than or equal to 0.1 atomic % and less than or equal to 6.0 atomic %.

It is preferable that the positive electrode active material further contain fluorine.

In the positive electrode active material, it is preferable that the constant lattice of the a-axis be greater than or equal to $2.8155 \times 10^{-10}$ m and $2.8175 \times 10^{-10}$ m, and the constant lattice of the c-axis be greater than or equal to $14.045 \times 10^{-10}$ m and less than or equal to $14.065 \times 10^{-10}$ m.

One embodiment of the present invention is a secondary battery including a positive electrode containing the positive electrode active material and a negative electrode.

Effect of the Invention

According to one embodiment of the present invention, a positive electrode active material with high capacity and excellent charging and discharging cycle performance for a lithium-ion secondary battery, and a manufacturing method thereof can be provided. In addition, a manufacturing method of a positive electrode active material with high productivity can be provided. In addition, a positive electrode active material that suppresses a decrease in capacity in charging and discharging cycles when used for a lithium-ion secondary battery can be provided. In addition, a high-capacity secondary battery can be provided. In addition, a secondary battery with excellent charging and discharging characteristics can be provided. In addition, a positive electrode active material in which elution of a transition metal such as cobalt is inhibited even when a state being charged with high voltage is held for a long time can be provided. In addition, a highly safe or reliable secondary battery can be provided. In addition, a novel material, novel active material particles, a novel power storage device, or a manufacturing method thereof can be provided.

BRIEF DESCRIPTION OF THE DRAWINGS

FIG. 18A1, FIG. 18A2, FIG. 18B1, and FIG. 18B2 are diagrams each showing an example of a secondary battery.

FIG. 26A, FIG. 26B1, FIG. 26B2, FIG. 26C, and FIG. 26D are diagrams showing a bendable secondary battery.

MODE FOR CARRYING OUT THE INVENTION

Figure 1A:
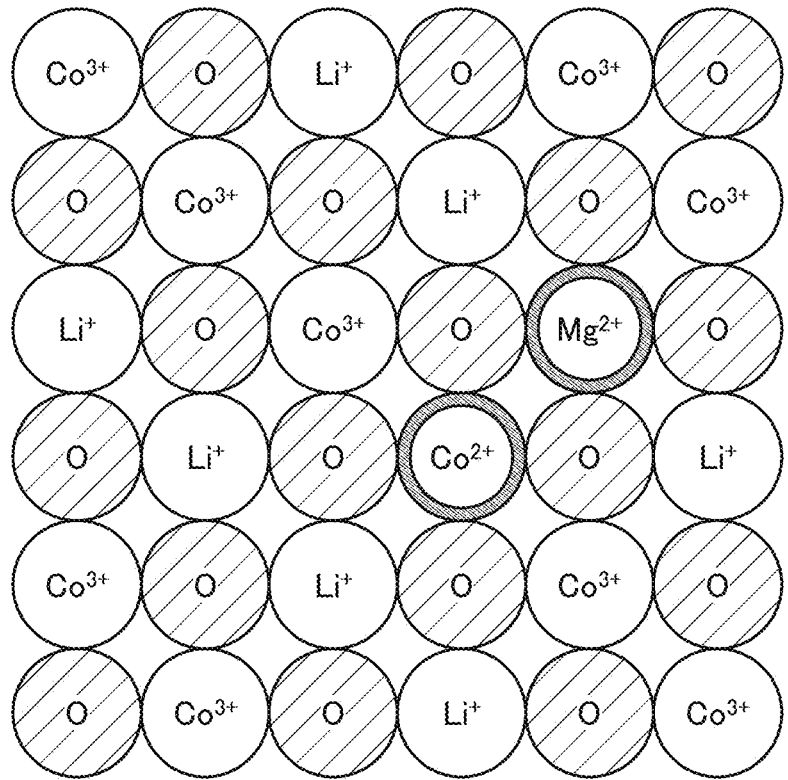
FIG. 1A and FIG. 1B are schematic views each showing a structure of a positive electrode active material.

Embodiments of the present invention are described in detail below with reference to the drawings. Note that the present invention is not limited to the following descriptions, and it is readily understood by those skilled in the art that modes and details of the present invention can be modified in various ways. In addition, the present invention should not be construed as being limited to the descriptions of the embodiments below.

In this specification and the like, crystal planes and orientations are indicated by the Miller index. In the crystallography, a bar is placed over a number in the expression of crystal planes and orientations; however, in this specification and the like, crystal planes and orientations are in some cases expressed by placing a minus sign (−) at the front of a number instead of placing the bar over the number because of patent expression limitations. Furthermore, an individual direction which shows an orientation in a crystal is denoted by "[ ]", a set direction which shows all of the equivalent orientations is denoted by "< >", an individual plane which shows a crystal plane is denoted by "O", and a set plane having equivalent symmetry is denoted by "{ }".

In this specification and the like, segregation refers to a phenomenon in which in a solid made of a plurality of elements (e.g., A, B, and C), a certain element (e.g., B) is spatially non-uniformly distributed.

In this specification and the like, a surface portion of a particle of an active material or the like refers to a region from a surface to a depth of approximately 10 nm. A plane generated by a crack may also be referred to as the surface. In addition, a region in a deeper position than a surface portion of a particle is referred to as an inner portion of the particle.

In this specification and the like, a layered rock-salt crystal structure of a composite oxide containing lithium and a transition metal refers to a crystal structure in which a rock-salt ion arrangement where cations and anions are alternately arranged is included and the transition metal and lithium are regularly arranged to form a two-dimensional plane, so that lithium can be two-dimensionally diffused. Note that a defect such as a cation or anion vacancy may exist.

Moreover, in the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, a pseudo-spinel crystal structure of a composite oxide containing lithium and a transition metal refers to a space group R-3m, which is not a spinel crystal structure but a crystal structure in which oxygen is hexacoordinated to ions such as cobalt and magnesium, and the cation arrangement has symmetry similar to that of the spinel crystal structure. Note that in the pseudo-spinel crystal structure, oxygen is tetracoordinated to a light element such as lithium in some cases, and in that case, the ion arrangement has symmetry similar to that of the spinel crystal structure.

The pseudo-spinel crystal structure can also be regarded as a crystal structure that contains lithium between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure generally.

Anions of a layered rock-salt crystal and anions of a rock-salt crystal have cubic closest packed structures (face-centered cubic lattice structures). Anions of a pseudo-spinel crystal are also presumed to have cubic closest packed structures. When the pseudo-spinel crystal is in contact with the layered rock-salt crystal and the rock-salt crystal, there is a crystal plane at which orientations of cubic closest packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic closest packed structures composed of anions in the layered rock-salt crystal, the pseudo-spinel crystal, and the rock-salt crystal are aligned is referred to as a state where crystal orientations are substantially aligned in some cases.

Substantial alignment of the crystal orientations in two regions can be judged from a transmission electron microscopy (TEM) image, a scanning transmission electron microscopy (STEM) image, a high-angle annular dark-field scanning transmission electron microscopy (HAADF-STEM) image, an annular bright-field scanning transmission electron microscopy (ABF-STEM) image, or the like. X-ray diffraction (XRD), electron diffraction, neutron diffraction, and the like can also be used for judging. In the TEM image and the like, alignment of cations and anions can be observed as repetition of bright lines and dark lines. When the orientations of cubic closest packed structures in the layered rock-salt crystal and the rock-salt crystal are aligned, a state where an angle made by the repetition of bright lines and dark lines in the layered rock-salt crystal and the rock-salt crystal is less than or equal to 5°, further preferably less than or equal to 2.5° can be observed. Note that in the TEM image and the like, a light element such as oxygen or fluorine cannot be clearly observed in some cases; however, in such a case, alignment of orientations can be judged by arrangement of metal elements.

In this specification and the like, the theoretical capacity of a positive electrode active material refers to the amount of electricity when all lithium that can be inserted and extracted are extracted from the positive electrode active material. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, charge depth obtained when all lithium that can be inserted and extracted is inserted is 0, and charge depth obtained when all lithium that can be inserted and extracted and is contained in a positive electrode active material is extracted is 1.

In this specification and the like, charging refers to transfer of lithium ions from a positive electrode to a negative electrode in a battery and transfer of electrons from a negative electrode to a positive electrode in an external circuit. For a positive electrode active material, extraction of lithium ions is called charging. Moreover, a positive electrode active material with a charge depth of greater than or equal to 0.74 and less than or equal to 0.9, more specifically, a charge depth of greater than or equal to 0.8 and less than or equal to 0.83 is referred to as a high-voltage charged positive electrode active material. Thus, for example, $LiCoO_2$ charged to 219.2 mAh/g is a high-voltage charged positive electrode active material. In addition, $LiCoO_2$ that is subjected to constant current charging in an environment at 25° C. and a charging voltage of higher than or equal to 4.525 V and lower than or equal to 4.65 V (in the case of a lithium counter electrode), and then subjected to constant voltage charging until the current value becomes 0.01 C or 1/5 to 1/100 of the current value at the time of the constant current charging is also referred to as a high-voltage charged positive electrode active material.

Similarly, discharging refers to transfer of lithium ions from a negative electrode to a positive electrode in a battery and transfer of electrons from a positive electrode to a negative electrode in an external circuit. Discharging of a positive electrode active material refers to insertion of lithium ions. Furthermore, a positive electrode active material with a charge depth of less than or equal to 0.06 or a positive electrode active material from which more than or equal to 90% of the charge capacity is discharged from a state where the positive electrode active material is charged with high voltage is referred to as a sufficiently discharged positive electrode active material. For example, $LiCoO_2$ with a charge capacity of 219.2 mAh/g is in a state of being charged with high voltage, and a positive electrode active material from which more than or equal to 197.3 mAh/g, which is 90% of the charge capacity, is discharged is a sufficiently discharged positive electrode active material. In addition, $LiCoO_2$ that is subjected to constant current discharging in an environment at 25° C. until the battery voltage becomes lower than or equal to 3 V (in the case of a lithium counter electrode) is also referred to as a sufficiently discharged positive electrode active material.

In this specification and the like, an unbalanced phase change refers to a phenomenon that causes a nonlinear change in physical quantity. For example, an unbalanced phase change might occur before and after peaks in a dQ/dV curve obtained by differentiating capacitance (Q) with voltage (V) (dQ/dV), which can largely change the crystal structure.

Embodiment 1

In this embodiment, a positive electrode active material of one embodiment of the present invention is described.

Figure 1B:
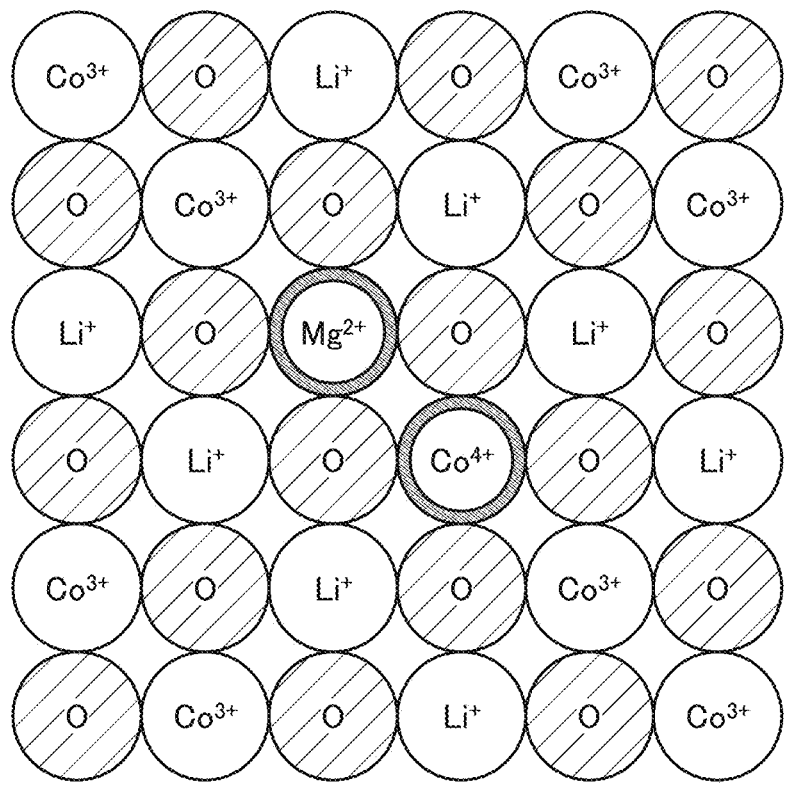
Figure 2A:
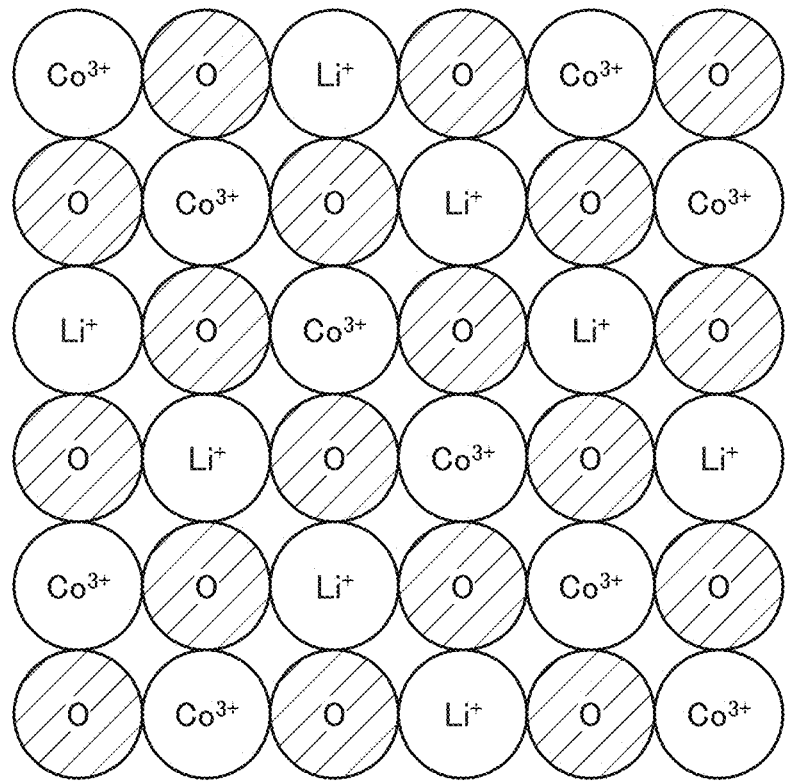
FIG. 2A and FIG. 2B are schematic views each showing a structure of a positive electrode active material.
Figure 2B:
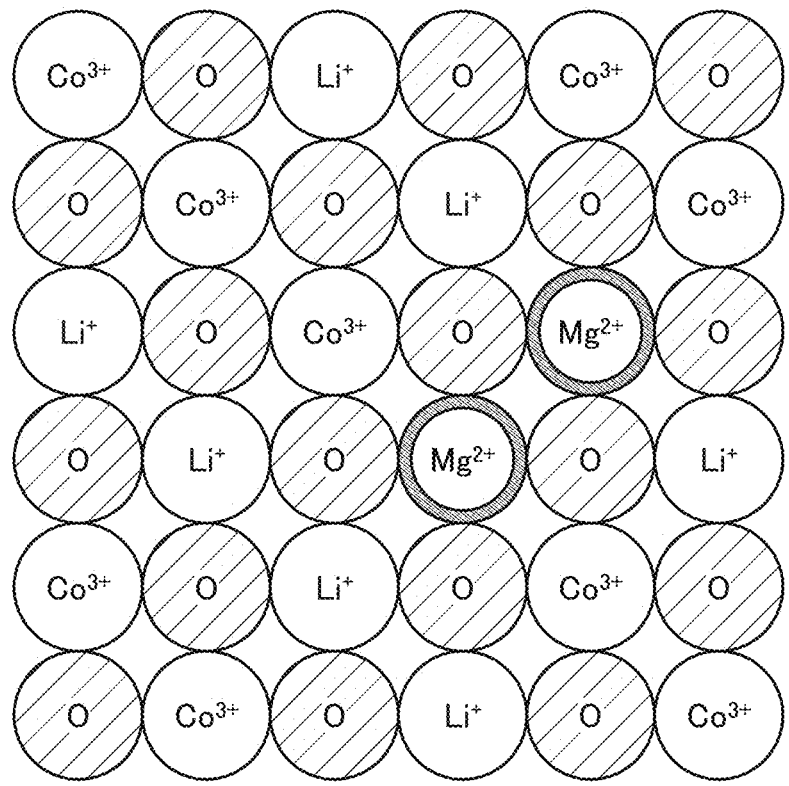

One embodiment of the present invention is a positive electrode active material containing lithium, cobalt, and oxygen. It is preferable that the positive electrode active material of one embodiment of the present invention further contain magnesium. A crystal structure containing magnesium is stable, which can inhibit breakage of the crystal structure due to repeated charging and discharging. In addition, in the positive electrode active material of one embodiment of the present invention, $Mg^{2+}$ is substituted for part of $Li^+$ in lithium cobalt oxide ($LiCoO_2$), and accordingly $Co^{3+}$ in the vicinity of $Mg^{2+}$ is reduced to be $Co^{2+}$ (see FIG. 1A and FIG. 2A). In addition, $Mg^{2+}$ is substituted for part of $Co^{3+}$, and accordingly $Co^{3+}$ in the vicinity of $Mg^{2+}$ is oxidized to be $Co^{4+}$ (see FIG. 1B and FIG. 2A). Thus, the positive electrode active material of one embodiment of the present invention contains one or both of $Co^{2+}$ and $Co^{4+}$. Moreover, the spin density attributed to $Co^{2+}$ and $Co^{4+}$ per weight of the positive electrode active material is preferably greater than or equal to $2.0\times10^{17}$ spins/g and less than or equal to $1.0\times10^{18}$ spins/g. The positive electrode active material preferably has the above spin density, in which case the crystal structure can be stable particularly in a charged state. Note that FIG. 2A is a schematic view illustrating a structure of a positive electrode active material not containing magnesium, and FIG. 1A and FIG. 1B are schematic views each illustrating a structure of the positive electrode active material containing magnesium, which is one embodiment of the present invention. In addition, the spin density attributed to $Co^{2+}$ and $Co^{4+}$ might decrease when the addition amount of magnesium is excessive (see FIG. 2B). The use of the positive electrode active material of one embodiment of the present invention for a secondary battery enables the secondary battery to have excellent cycle performance and rate characteristics.

The concentration of magnesium with respect to cobalt atoms in the positive electrode active material is preferably higher than or equal to 0.1 atomic % and lower than or equal to 6.0 atomic %, further preferably higher than or equal to 0.5 atomic % and lower than or equal to 5.0 atomic %, still further preferably higher than or equal to 1.0 atomic % and lower than or equal to 4.0 atomic %. Note that the above magnesium concentration represents the average value in the whole particle of the positive electrode active material.

The spin density of a positive electrode active material can be analyzed by electron spin resonance (ESR), for example. In addition, the average value of the magnesium concentration in the whole particle of the positive electrode active material can be analyzed by inductively coupled plasma mass spectrometry (ICP-MS), for example.

It is preferable that the positive electrode active material of one embodiment of the present invention further contain fluorine. With fluorine, corrosion resistance to hydrofluoric acid generated by electrolyte decomposition can be improved. The components of the positive electrode active material can be measured by X-ray photoelectron spectroscopy (XPS), for example. In addition, the average value of the fluorine concentration in the whole particle of the positive electrode active material can be analyzed by inductively coupled plasma spectrometry (ICP-MS), for example.

In the positive electrode active material of one embodiment of the present invention, it is preferable that the lattice constant of the a-axis be greater than or equal to $2.8155\times10^{-10}$ m and $2.8175\times10^{-10}$ m, and the lattice constant of the c-axis be greater than or equal to $14.045\times10^{-10}$ m and less than or equal to $14.065\times10^{-10}$ m.

[Structure of Positive Electrode Active Material]

Figure 3:
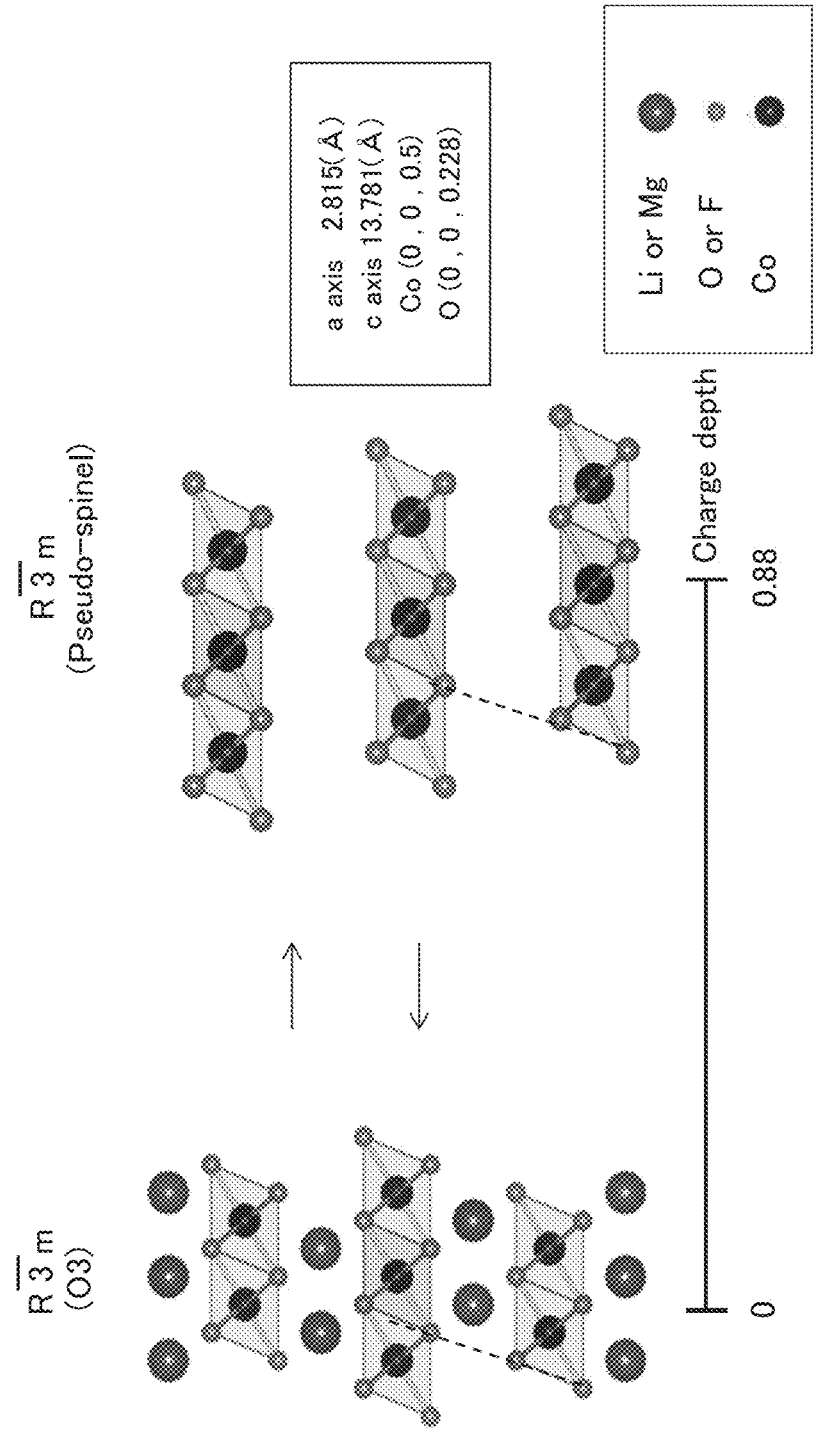
FIG. 3 is a diagram showing the charge depth and crystal structures of a positive electrode active material of one embodiment of the present invention.
Figure 4:
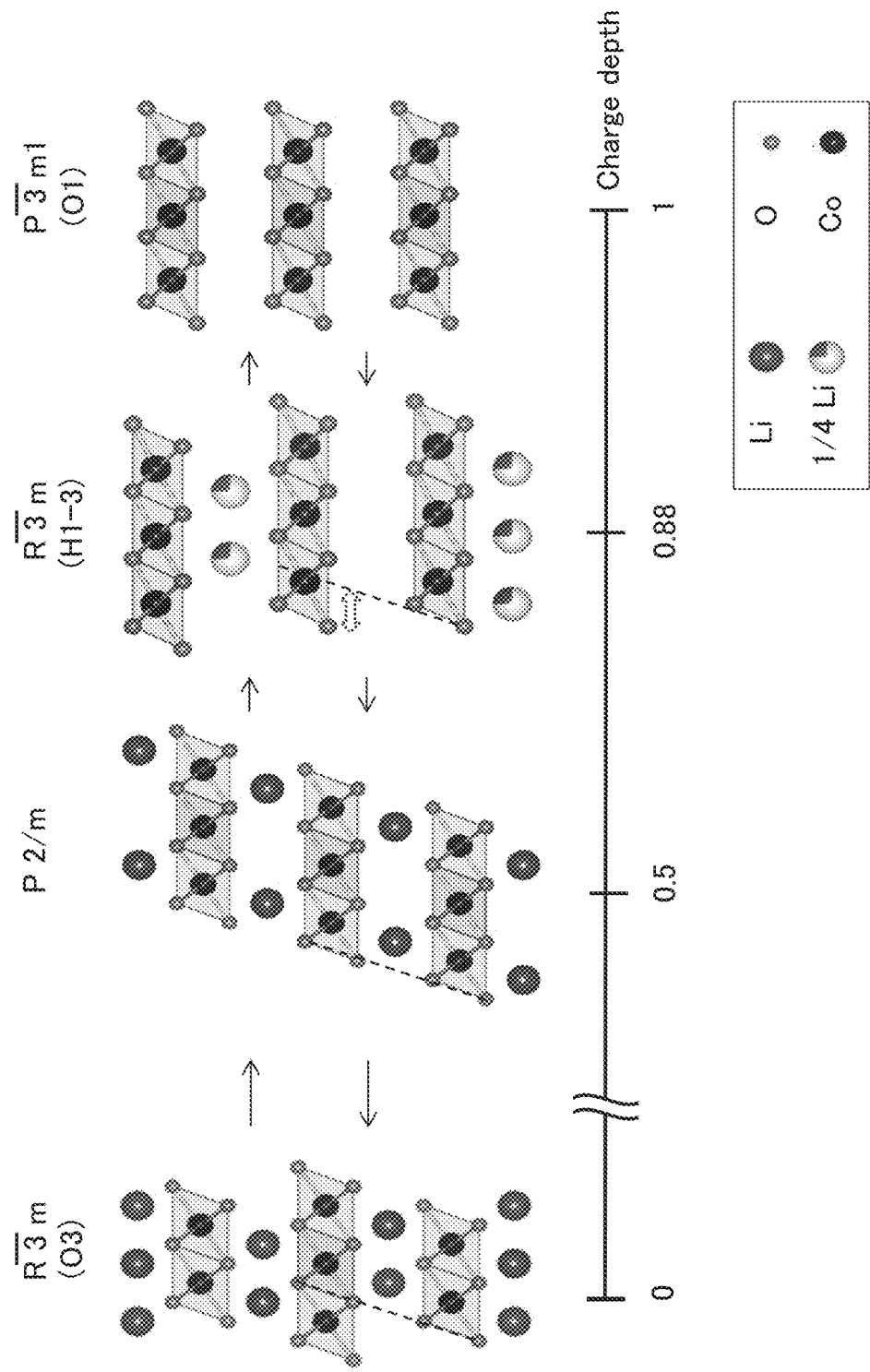
FIG. 4 is a diagram showing the charge depth and crystal structures of a conventional positive electrode active material.

A positive electrode active material 100 of one embodiment of the present invention and a conventional positive electrode active material are explained using FIG. 3 and FIG. 4, and then differences between the materials are described. With FIG. 3 and FIG. 4, the case of using cobalt as a transition metal contained in the positive electrode active material is described. FIG. 3 illustrates the positive electrode active material 100 of one embodiment of the present invention. FIG. 4 illustrates the conventional positive electrode active material. The conventional positive electrode active material described with FIG. 4 is simple lithium cobalt oxide ($LiCoO_2$) not subjected to processing such as adding an element other than lithium, cobalt, and oxygen to an inner portion of the positive electrode active material or coating a surface portion of a particle thereof with such an element.

<Conventional Positive Electrode Active Material>

As described in Non-Patent Document 1, Non-Patent Document 2, and the like, the crystal structure of lithium cobalt oxide $LiCoO_2$, which is one of the conventional positive electrode active materials, changes depending on the charge depth. FIG. 4 illustrates typical crystal structures of lithium cobalt oxide.

As illustrated in FIG. 4, lithium cobalt oxide with a charge depth of 0 (the discharged state) includes a region having the crystal structure of the space group R-3m, and includes three $CoO_2$ layers in a unit cell. Thus, this crystal structure is referred to as an O3-type crystal structure in some cases. Note that the $CoO_2$ layer has a structure in which octahedral geometry with oxygen atoms hexacoordinated to cobalt continues on a plane in the edge-sharing state.

When the charge depth is 1, $LiCoO_2$ has the crystal structure of the space group P-3m1, and one $CoO_2$ layer exists in a unit cell. Thus, this crystal structure is referred to as an O1-type crystal structure in some cases.

Lithium cobalt oxide when the charge depth is approximately 0.88 has the crystal structure of the space group R-3m. This structure can also be regarded as a structure in which $CoO_2$ structures such as P-3m1 (O1) and $LiCoO_2$ structures such as R-3m (O3) are alternately stacked. Thus, this crystal structure is referred to as an H1-3 type crystal structure in some cases. Note that the number of cobalt atoms per unit cell in the actual H1-3 type crystal structure is twice as large as that of cobalt atoms per unit cell in other structures. However, in this specification including FIG. 4, the c-axis of the H1-3 type crystal structure is described half that of the unit cell for easy comparison with the other structures.

When high-voltage charging with a charge depth of approximately 0.88 or more and discharging are repeated, the crystal structure of lithium cobalt oxide repeatedly changes between the H1-3 type crystal structure and the R-3m (O3) structure in the discharged state (i.e., an unbalanced phase change).

However, there is a large deviation in the position of the $CoO_2$ layer between these two crystal structures. As indicated by a dotted line and a two-headed arrow in FIG. 4, the $CoO_2$ layer in the H1-3 type crystal structure largely deviates from that in R-3m(O3). Such a dynamic structure change might adversely affect the stability of the crystal structure.

Furthermore, there is a big difference in volume between the H1-3 type crystal structure and the O3-type crystal structure. The difference in volume per the same number of cobalt atoms between the H1-3 type crystal structure and the O3-type crystal structure in the discharged state is 3.5% or more.

In addition, a structure in which $CoO_2$ layers are arranged in a successive manner, such as P-3m1 (O1), included in the H1-3 type crystal structure is highly likely to be unstable.

Thus, the repeated high-voltage charging and discharging break the crystal structure of lithium cobalt oxide. The breakage of the crystal structure degrades the cycle performance. This is probably because the breakage of the crystal structure reduces sites where lithium can stably exist and makes it difficult to insert and extract lithium.

<Positive Electrode Active Material of One Embodiment of the Present Invention>

<Inner Portion of Particle>

The positive electrode active material 100 of one embodiment of the present invention has a small crystal-structure change and a small volume difference per the same number of transition metal atoms between a sufficiently discharged state and a high-voltage charged state (with a charge depth greater than or equal to 0.8 and less than or equal to 0.83).

FIG. 3 illustrates the crystal structures of the positive electrode active material 100 before and after being charged and discharged. The positive electrode active material 100 of one embodiment of the present invention is a composite oxide containing lithium and cobalt. In addition to the above, the positive electrode active material 100 preferably contains magnesium. Furthermore, the positive electrode active material 100 preferably contains halogen such as fluorine or chlorine.

The crystal structure with a charge depth of 0 (the discharged state) illustrated in FIG. 3 is R-3m (O3), which is the same as that in FIG. 4. In contrast, the positive electrode active material 100 of one embodiment of the present invention has a crystal with a structure different from that in FIG. 4 when it is sufficiently charged to a charge depth of approximately 0.88. The crystal structure of the space group R-3m is referred to as a pseudo-spinel crystal structure in this specification and the like. Note that although the indication of lithium is omitted in the diagram of the pseudo-spinel crystal structure illustrated in FIG. 3 to explain the symmetry of cobalt atoms and the symmetry of oxygen atoms, approximately 12 atomic % lithium with respect to cobalt practically exists between the $CoO_2$ layers. In addition, in both the O3-type crystal structure and the pseudo-spinel crystal structure, magnesium preferably exists between the $CoO_2$ layers, i.e., in lithium sites, at a slight concentration. In addition, a slight amount of halogen such as fluorine preferably exists in oxygen sites at random.

The positive electrode active material 100 has a smaller crystal-structure change than conventional $LiCoO_2$ when releasing a large amount of lithium in high-voltage charging. As indicated by the dotted lines in FIG. 3, for example, there is a very little deviation in the $CoO_2$ layers between the crystal structures.

In the positive electrode active material 100, a difference in the volume per unit cell between the O3-type crystal structure with a charge depth of 0 and the pseudo-spinel crystal structure with a charge depth of 0.88 is less than or equal to 2.5%, more specifically, less than or equal to 2.2%.

Thus, in the positive electrode active material 100, the crystal structure is less likely to be broken even when charging and discharging are repeated at high voltage.

Note that in the unit cell of the pseudo-spinel crystal structure, coordinates of cobalt and oxygen can be represented by Co (0, 0, 0.5) and O (0, 0, x) within the range of 0.20≤x≤0.25.

A slight amount of magnesium existing between the $CoO_2$ layers, i.e., in lithium sites at random, has an effect of inhibiting a deviation in the $CoO_2$ layers. Thus, when magnesium exists between the $CoO_2$ layers, the pseudo-spinel crystal structure is likely to be formed. In addition, magnesium is preferably distributed over the whole particle of the positive electrode active material 100. To distribute magnesium over the whole particle, heat treatment is preferably performed in a manufacturing process of the positive electrode active material 100.

However, cation mixing occurs when the heat treatment temperature is excessively high, so that magnesium is highly likely to enter the cobalt sites. Magnesium in the cobalt sites results in a small effect of maintaining the R-3m structure in some cases. Furthermore, when the heat treatment temperature is excessively high, adverse effects such as instability of a layered rock-salt crystal structure and evaporation of lithium are concerned.

In view of the above, a halogen compound such as a fluorine compound is preferably added to lithium cobalt oxide before the heat treatment for distributing magnesium over the whole particle. The addition of the halogen compound decreases the melting point of lithium cobalt oxide. The decrease in the melting point makes it easier to distribute magnesium over the whole particle at a temperature at which the cation mixing is unlikely to occur. Here, hydrofluoric acid generated by electrolyte decomposition might corrode the positive electrode active material. The positive electrode active material 100 of one embodiment of the present invention containing fluorine can have higher corrosion resistance to hydrofluoric acid generated by electrolyte decomposition.

Note that in this specification and the like, an electrolyte means a substance having electric conductivity. The electrolyte is not limited to liquid and may be a gelled one or solid. An electrolyte in a liquid state is referred to as an electrolyte solution in some cases, and an electrolyte solution can be made by dissolving a solute in a solvent. An electrolyte in a solid state is referred to as a solid electrolyte in some cases.

Note that although the case where the positive electrode active material 100 is a composite oxide containing lithium, cobalt, and oxygen is described so far, nickel may be contained in addition to cobalt. In that case, the proportion of nickel atoms (Ni) in the sum of cobalt atoms and nickel atoms (Co+Ni) (Ni/(Co+Ni)) is preferably less than 0.1, further preferably less than or equal to 0.075.

When a high-voltage charged state is held for a long time, the transition metal dissolves in the electrolyte solution from the positive electrode active material, and the crystal structure might be broken. However, when nickel is contained at the above proportion, dissolution of the transition metal from the positive electrode active material 100 can be inhibited in some cases.

The addition of nickel decreases charging and discharging voltages, and thus, charging and discharging can be executed at a lower voltage in the case of the same capacity; as a result, dissolution of the transition metal and decomposition of the electrolyte solution might be inhibited. Here, the charging and discharging voltages are, for example, voltages within the range from a charge depth of 0 to a predetermined charge depth.

<Surface Portion of Particle>

Magnesium is preferably distributed over the whole particle of the positive electrode active material 100, and further preferably, the magnesium concentration in the surface portion of the particle is higher than the average in the whole particle. The magnesium concentration in the surface portion of the particle can be measured by X-ray photoelectron spectroscopy (XPS), for example. The average magnesium concentration in the whole particle can be measured by inductively coupled plasma mass spectrometry (ICP-MS) or glow discharge mass spectrometry (GDMS), for example. The entire surface of the particle is a kind of crystal defects and lithium is extracted from the surface of the particle during charging; thus, the lithium concentration in the surface of the particle tends to be lower than that in the inner portion of the particle. Therefore, the surface of the particle tends to be unstable and its crystal structure is likely to be broken. The higher the magnesium concentration in the surface portion of the particle is, the more effectively the crystal structure change can be inhibited. In addition, a high magnesium concentration in the surface portion of the particle expects to improve the corrosion resistance to hydrofluoric acid generated by the decomposition of the electrolyte solution.

In addition, the concentration of halogen such as fluorine in the surface portion of the particle of the positive electrode active material 100 is preferably higher than the average concentration of halogen such as fluorine in the particle. When halogen exists in the surface portion of the particle which is a region in contact with the electrolyte solution, the corrosion resistance to hydrofluoric acid can be effectively improved.

In this manner, the surface portion of the particle of positive electrode active material 100 preferably has higher concentrations of magnesium and fluorine than those in the inner portion of the particle and a composition different from that in the inner portion of the particle. In addition, the surface portion of the particle preferably has a composition that enables the crystal structure to be stable at normal temperature. Thus, the surface portion of the particle may have a crystal structure different from that of the inner portion of the particle. For example, at least part of the surface portion of the particle of the positive electrode active material 100 may have a rock-salt crystal structure. Furthermore, in the case where the surface portion of the particle and the inner portion of the particle have different crystal structures, the orientations of crystals in the surface portion of the particle and the inner portion of the particle are preferably substantially aligned.

Note that in the surface portion of the particle where only MgO is contained or MgO and CoO (II) form a solid solution, it is difficult to insert and extract lithium. Thus, the surface portion of the particle should contain at least cobalt, and further contain lithium in the discharged state to have a path through which lithium is inserted and extracted. In addition, the concentration of cobalt is preferably higher than that of magnesium.

<Crystal Grain Boundary>

A slight amount of magnesium or halogen contained in the positive electrode active material 100 may randomly exist in the inner portion of the particle, but part of the element is further preferably segregated at a crystal grain boundary.

In other words, the magnesium concentration in the crystal grain boundary and its vicinity of the positive electrode active material 100 is preferably higher than that in the other regions in the inner portion of the particle. In addition, the halogen concentration in the crystal grain boundary and its vicinity is also preferably higher than that in the other regions in the inner portion.

Like the particle surface, the crystal grain boundary is also a plane defect. Thus, the crystal grain boundary tends to be unstable and its crystal structure easily starts to change. Therefore, the higher the magnesium concentration in the crystal grain boundary and its vicinity is, the more effectively the change in the crystal structure can be inhibited.

Furthermore, even when cracks are generated along the crystal grain boundary of the particle of the positive electrode active material 100, high concentrations of magnesium and halogen in the crystal grain boundary and its vicinity increase the concentrations of magnesium and halogen in the vicinity of a surface generated by the cracks. Thus, the positive electrode active material after the cracks are generated can also have increased corrosion resistance to hydrofluoric acid.

Note that in this specification and the like, the vicinity of the crystal grain boundary refers to a region of approximately 10 nm from the crystal grain boundary.

<Particle Diameter>

A too large particle diameter of the particle of the positive electrode active material 100 causes problems such as difficulty in lithium diffusion and too much surface roughness of an active material layer in coating to a current collector. In contrast, a too small particle diameter of the particle causes problems such as difficulty in carrying the active material layer in coating to the current collector and overreaction with an electrolyte solution. Therefore, the average particle diameter (D50) is preferably greater than or equal to 1 µm and less than or equal to 100 µm, further preferably greater than or equal to 2 µm and less than or equal to 40 µm, still further preferably greater than or equal to 5 µm and less than or equal to 30 µm.

Note that the average particle diameter (D50) in this specification and the like means a particle diameter when the cumulative percentage reaches 50% on the volumetric basis. The average particle diameter (D50) is referred to as a median diameter in some cases.

<Analysis Method>

Whether or not a positive electrode active material is the positive electrode active material 100 of one embodiment of the present invention that has the pseudo-spinel crystal structure when charged with high voltage can be determined by analyzing a high-voltage charged positive electrode using XRD, electron diffraction, neutron diffraction, electron spin resonance (ESR), nuclear magnetic resonance (NMR), magnetization measurement, or the like. The XRD is particularly preferable because the symmetry of a transition metal such as cobalt contained in the positive electrode active material can be analyzed with high resolution, the degrees of crystallinity and the crystal orientations can be compared, the distortion of lattice periodicity and the crystallite size can be analyzed, and a positive electrode obtained by disassembling a secondary battery can be measured without any change with sufficient accuracy, for example.

As described so far, the positive electrode active material 100 of one embodiment of the present invention has a feature of a small crystal structure change between the high-voltage charged state and the discharged state. A material where 50 wt % or more of the crystal structure largely changes between the high-voltage charged state and the discharged state is not preferable because the material cannot withstand the high-voltage charging and discharging. In addition, it should be noted that an objective crystal structure is not obtained in some cases only by addition of elements. For example, although the positive electrode active material that is lithium cobalt oxide containing magnesium and fluorine is a commonality, the positive electrode active material has 60 wt % or more of the pseudo-spinel crystal structure in some cases, and has 50 wt % or more of the H1-3 type crystal structure in other cases, when charged with high voltage. Furthermore, at a predetermined voltage, the positive electrode active material has almost 100 wt % of the pseudo-spinel crystal structure, and with an increase in the predetermined voltage, the H1-3 type crystal structure is generated in some cases. Thus, analysis of the crystal structure, including XRD, is needed to determine whether or not the positive electrode active material is the positive electrode active material 100 of one embodiment of the present invention.

Note that a positive electrode active material in the high-voltage charged state or the discharged state sometimes causes a change in the crystal structure when exposed to the air. For example, the pseudo-spinel crystal structure changes into the H1-3 type crystal structure in some cases. Thus, all samples are preferably handled in an inert atmosphere such as an argon atmosphere.

<Charging Method>

High-voltage charging for determining whether or not a composite oxide is the positive electrode active material 100 of one embodiment of the present invention can be performed on a coin cell (CR2032 type with a diameter of 20 mm and a height of 3.2 mm) with a lithium counter electrode, for example.

More specifically, a positive electrode current collector made of aluminum foil that is coated with slurry in which a positive electrode active material, a conductive additive, and a binder are mixed can be used as a positive electrode.

A lithium metal can be used for the counter electrode. Note that when a material other than the lithium metal is used for the counter electrode, the potential of a secondary battery differs from the potential of the positive electrode. Unless otherwise specified, voltages and potentials in this specification and the like refer to the potentials of a positive electrode.

As an electrolyte contained in an electrolyte solution, 1 mol/L lithium hexafluorophosphate ($LiPF_6$) can be used, and as a solvent, a solution in which ethylene carbonate (EC) and diethyl carbonate (DEC) at EC:DEC=3:7 (volume ratio) and vinylene carbonate (VC) at 2 wt % are mixed can be used.

As a separator, 25-µm-thick polypropylene can be used.

A positive electrode can and a negative electrode can that are formed using stainless steel (SUS) can be used as a positive electrode can and a negative electrode can.

The coin cell formed under the above conditions is charged with constant current at 4.6 V and 0.5 C and then charged with constant voltage until the current value reaches 0.01 C. Note that here, 1 C is set to 137 mA/g. The temperature is set to 25° C. After the charging is performed in this manner, the coin cell is disassembled in a glove box with an argon atmosphere and the positive electrode is taken out, whereby the high-voltage charged positive electrode active material can be obtained. In order to inhibit reaction with components in the external world, the positive electrode active material is preferably hermetically sealed in an argon atmosphere when performing various analyses later. For example, XRD can be performed on the positive electrode active material enclosed in an airtight container with an argon atmosphere.

<XRD>

Figure 5:
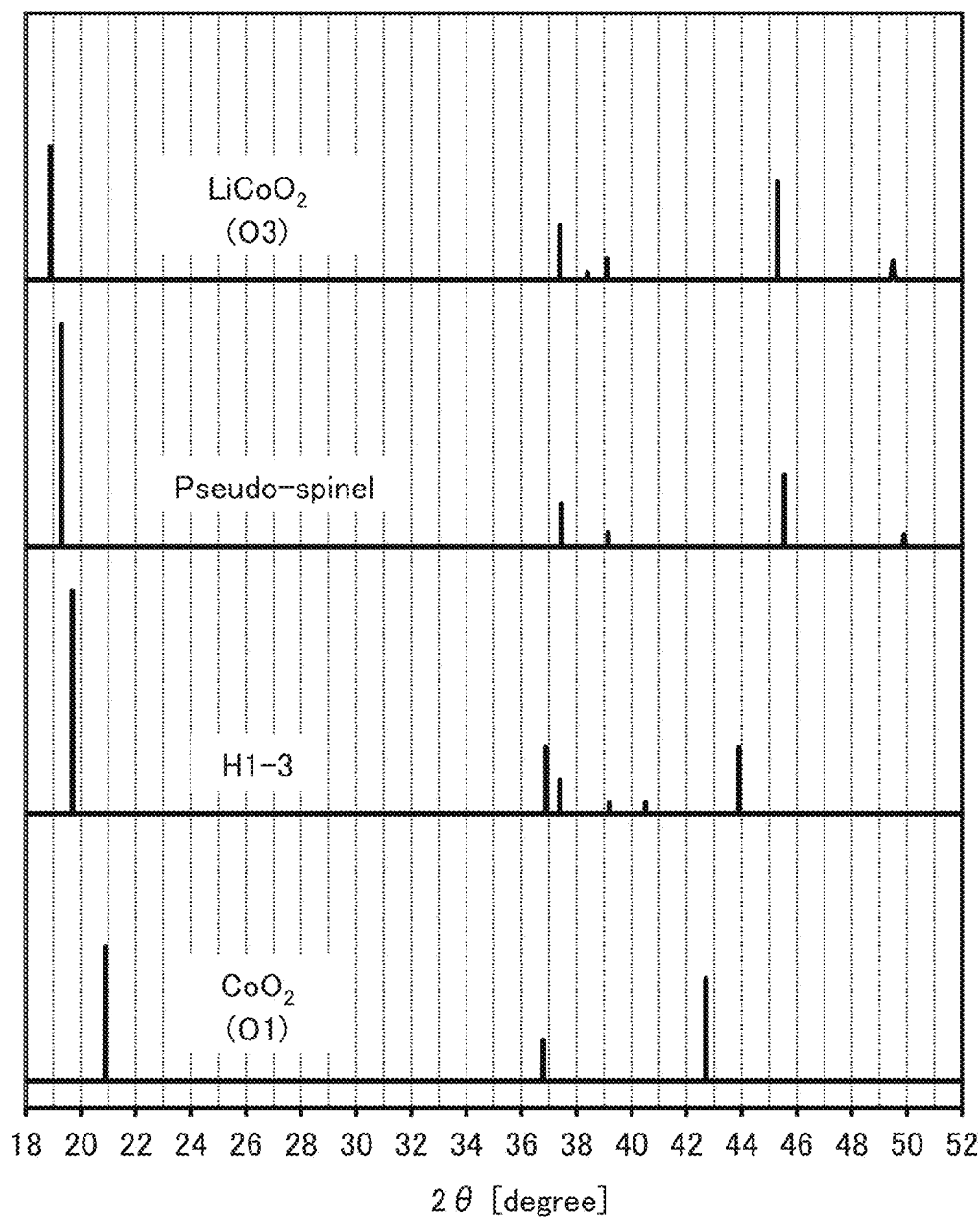
FIG. 5 shows XRD patterns calculated from crystal structures.

FIG. 5 shows ideal powder XRD patterns with CuKα1 rays that are calculated from models of a pseudo-spinel crystal structure and an H1-3 type crystal structure. In addition, for comparison, FIG. 5 also shows ideal XRD patterns calculated from the crystal structures of $LiCoO_2$ (O3) with a charge depth of 0 and $CoO_2$ (O1) with a charge depth of 1. Note that the patterns of $LiCoO_2$ (O3) and $CoO_2$ (O1) are made from crystal structure data obtained from ICSD (Inorganic Crystal Structure Database) (see Non- Patent Document 5) using Reflex Powder Diffraction, which is a module of Materials Studio (BIOVIA). The range of 2θ is from 15° to 75°, Step size is 0.01, the wavelength λ1 is $1.540562 \times 10^{-10}$ m, λ2 is not set, and Monochromator is a single monochromator. The pattern of the H1-3 type crystal structure is made from the crystal structure data described in Non-Patent Document 3 in a similar manner. The pattern of the pseudo-spinel crystal structure is estimated from the XRD pattern of the positive electrode active material of one embodiment of the present invention, the crystal structure is fitted with TOPAS ver. 3 (crystal structure analysis software manufactured by Bruker Corporation), and XRD patterns are made in a manner similar to those of other structures.

As shown in FIG. 5, in the pseudo-spinel crystal structure, diffraction peaks appear at 2θ of 19.30±0.20° (greater than or equal to 19.10° and less than or equal to 19.50°) and 2θ of 45.55±0.10° (greater than or equal to 45.45° and less than or equal to 45.65°). More specifically, sharp diffraction peaks appear at 2θ of 19.30±0.10° (greater than or equal to 19.20° and less than or equal to 19.40°) and 2θ of 45.55±0.05° (greater than or equal to 45.50° and less than or equal to 45.60°). However, in the H1-3 type crystal structure and $CoO_2$ (P-3m1, O1), peaks at these positions do not appear. Thus, the peaks at 2θ of 19.28±0.60° and 2θ of 45.55±0.20° in the high-voltage charged state can be the features of the positive electrode active material 100 of one embodiment of the present invention.

It can also be said that the positions where the XRD diffraction peaks appear are close in the crystal structure with a charge depth of 0 and the crystal structure in the high-voltage charged state. More specifically, a difference in the positions of two or more, further preferably three or more of the main diffraction peaks between both of the crystal structures is 2θ of less than or equal to 0.7, further preferably 2θ of less than or equal to 0.5.

Note that although the positive electrode active material 100 of one embodiment of the present invention has the pseudo-spinel crystal structure when being charged with high voltage, not all the particles necessarily have the pseudo-spinel crystal structure. The particles may have another crystal structure, or some of the particles may be amorphous. Note that when the XRD patterns are analyzed by the Rietveld analysis, the pseudo-spinel crystal structure preferably accounts for more than or equal to 50 wt %, further preferably more than or equal to 60 wt %, still further preferably more than or equal to 66 wt %. The positive electrode active material in which the pseudo-spinel crystal structure accounts for more than or equal to 50 wt %, further preferably more than or equal to 60 wt %, still further preferably more than or equal to 66 wt % can have sufficiently good cycle performance.

Furthermore, even after 100 or more cycles of charging and discharging, the pseudo-spinel crystal structure preferably accounts for more than or equal to 35 wt %, further preferably more than or equal to 40 wt %, still further preferably more than or equal to 43 wt % when the Rietveld analysis is performed.

The crystallite size of the pseudo-spinel structure included in the positive electrode active material particle does not decrease to less than approximately one-tenth that of $LiCoO_2$ (O3) in the discharged state. Thus, a clear peak of the pseudo-spinel crystal structure can be observed after the high-voltage charging even under the same XRD measurement conditions as those of a positive electrode before the charging and discharging. In contrast, simple $LiCoO_2$ has a small crystallite size and a broad small peak even when it can have a structure part of which is similar to the pseudo-spinel crystal structure. The crystallite size can be calculated from the half width of the XRD peak.

The layered rock-salt crystal structure included in the positive electrode active material particle in the discharged state, which can be estimated from the XRD patterns, preferably has a small lattice constant of the c-axis. The lattice constant of the c-axis increases when a foreign element is substituted at the lithium site or cobalt enters an oxygen-tetracoordinated site (A site), for example. For this reason, the positive electrode active material with excellent cycle performance probably can be manufactured by forming a composite oxide having a layered rock-salt crystal structure with few defects such as foreign element substitutions and $Co_3O_4$ having the spinel crystal structure and then mixing a magnesium source and a fluorine source with the composite oxide and inserting magnesium into the lithium site.

In the crystal structure of the positive electrode active material in a discharged state, it is preferable that the lattice constant of the a-axis be greater than or equal to $2.8155 \times 10^{-10}$ m and $2.8175 \times 10^{-10}$ m, and the lattice constant of the c-axis be greater than or equal to $14.045 \times 10^{-10}$ m and less than or equal to $14.065 \times 10^{-10}$ m.

In order to set the lattice constant of the c-axis within the above range, the amount of impurities is preferably as small as possible. In particular, the addition amount of transition metals other than cobalt, manganese, and nickel is preferably as small as possible; specifically, preferably less than or equal to 3000 ppm (wt), further preferably less than or equal to 1500 ppm (wt). In addition, cation mixing between lithium and cobalt, manganese, and nickel is preferably less likely to occur.

Note that features that are apparent from the XRD pattern are features of the inner structure of the positive electrode active material. In a positive electrode active material with an average particle diameter (D50) of approximately 1 μm to 100 μm, the volume of a surface portion of a particle is negligible compared with that of an inner portion; therefore, even when the surface portion of the particle of the positive electrode active material 100 has a crystal structure different from that of the inner portion of the particle, the crystal structure of the surface portion of the particle is highly unlikely to appear in the XRD pattern.

<ESR>

Figure 6A:
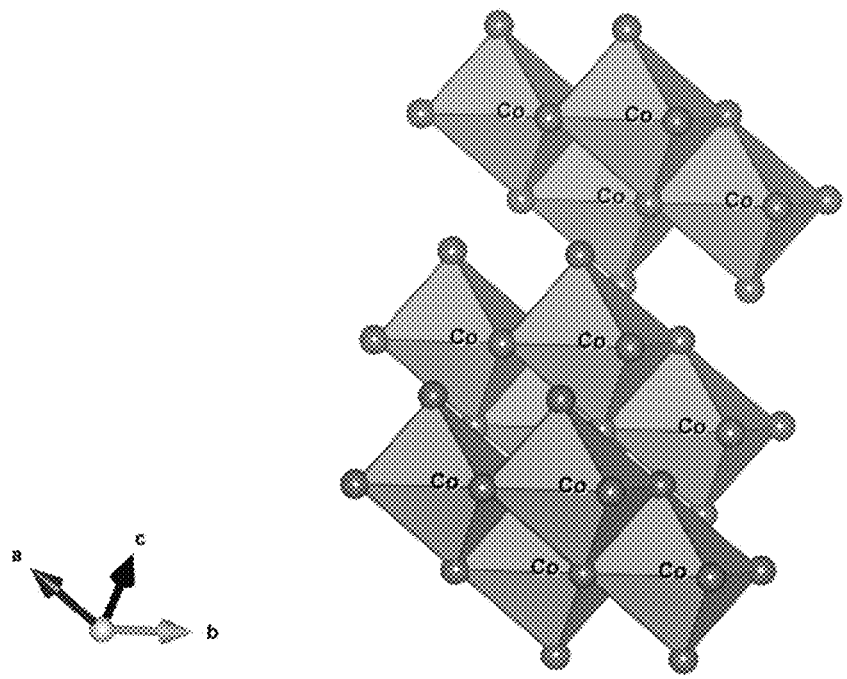
FIG. 6A is a diagram showing a crystal structure of a positive electrode active material of one embodiment of the present invention.
Figure 6B:
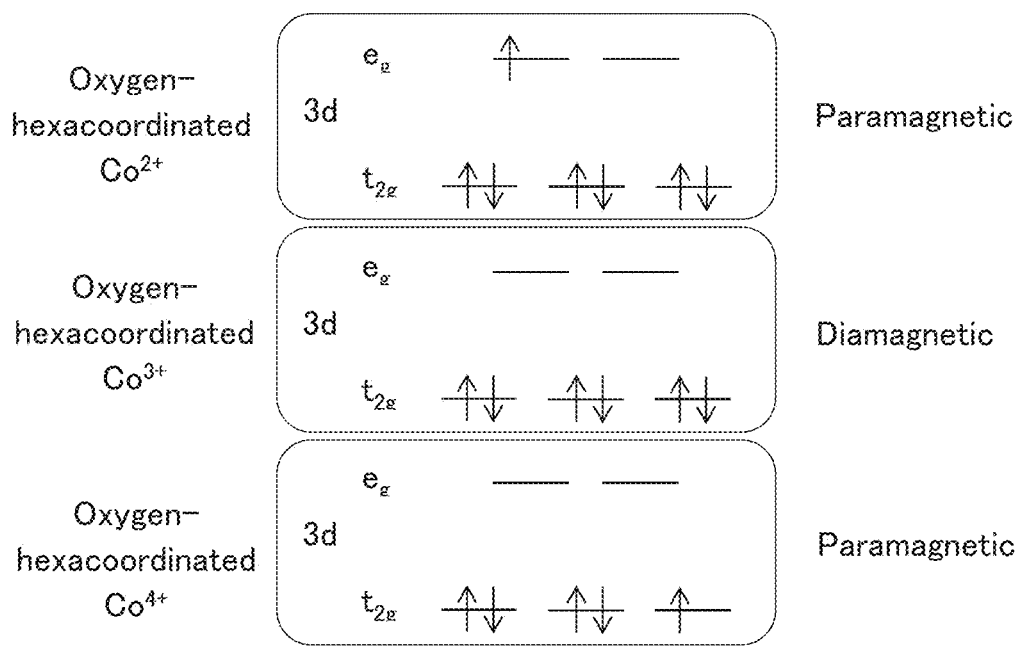
FIG. 6B is a diagram showing magnetism of the positive electrode active material of one embodiment of the present invention.
Figure 7A:
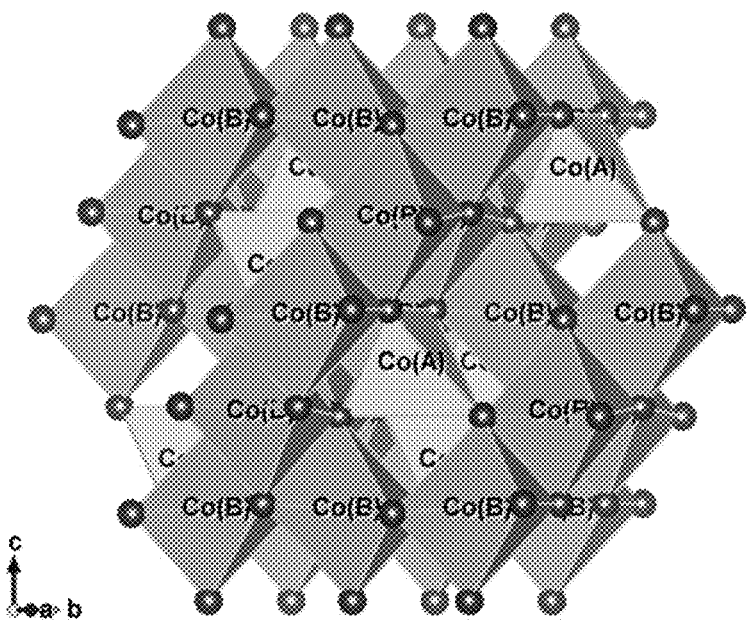
FIG. 7A is a diagram showing a crystal structure of a conventional positive electrode active material.

Here, the case in which the difference between the pseudo-spinel crystal structure and another crystal structure is determined using ESR is described using FIG. 6 and FIG. 7. In the pseudo-spinel crystal structure, cobalt exists in the hexacoordinated oxygen site, as illustrated in FIG. 3 and FIG. 6A. In oxygen-hexacoordinated cobalt, a 3d orbital is split into an $e_g$ orbital and a $t_{2g}$ orbital as shown in FIG. 6B. In the oxygen-hexacoordinated cobalt, the $t_{2g}$ orbital that is an orbital located aside from the direction in which oxygen exists has low energy compared with the $e_g$ orbital that is an orbital in the direction in which oxygen exists, and the $t_{2g}$ orbital is in the ground state. Part of cobalt existing in the oxygen-hexacoordinated site is $Co^+$, and $Co^{3+}$ in the ground state is diamagnetic $Co^{3+}$ in which the entire $t_{2g}$ orbital is filled (the spin quantum number S=0). However, the other part of cobalt existing in the oxygen-hexacoordinated site may be $Co^{2+}$ or $Co^{4+}$, and $Co^{2+}$ or $Co^{4+}$ in the ground state is paramagnetic (the spin quantum number S=½). $Co^{2+}$ and $Co^{4+}$ of the paramagnetic cobalt both have one unpaired electron (the spin quantum number S=½), and thus cannot be distinguished by ESR.

In contrast, some documents report that a conventional positive electrode active material can have a spinel crystal structure that does not contain lithium in the surface portion of the particle in the charged state. In that case, the positive electrode active material contains $Co_3O_4$ having a spinel crystal structure illustrated in FIG. 7A.

When the spinel is represented by a general formula $A[B_2]O_4$, the element A is oxygen-tetracoordinated and the element B is oxygen-hexacoordinated. Thus, in this specification and the like, the oxygen-tetracoordinated site is referred to as an A site, and the oxygen-hexacoordinated site is referred to as a B site in some cases.

Figure 7B:
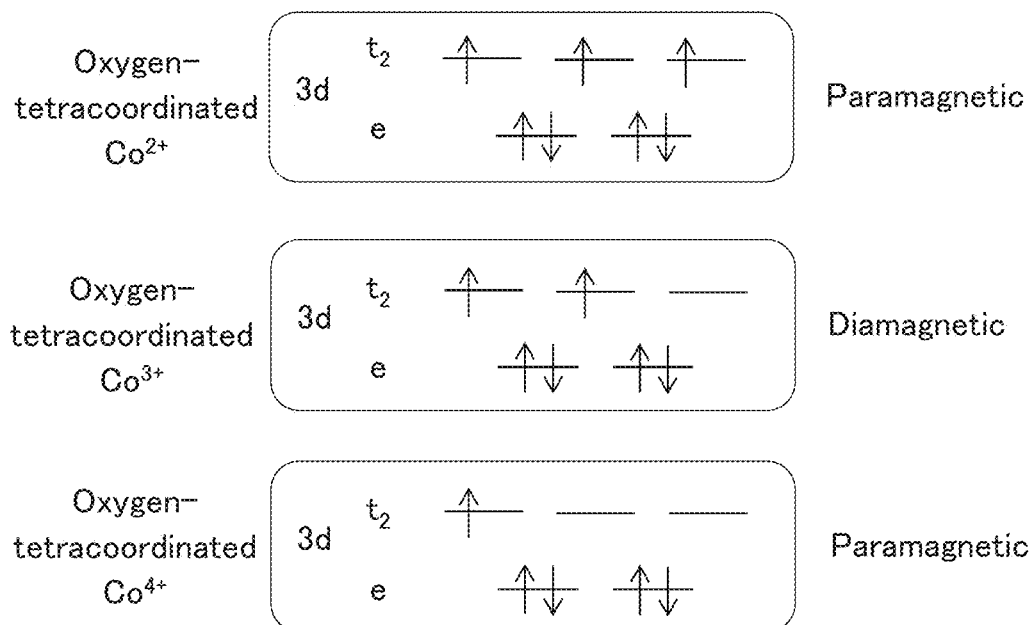
FIG. 7B is a diagram showing magnetism of the conventional positive electrode active material.

In $Co_3O_4$ having the spinel crystal structure, cobalt exists not only in the oxygen-hexacoordinated B site but also in the oxygen-tetracoordinated A site. As shown in FIG. 7B, of the $e_g$ orbital and the $t_{2g}$ orbital split from the 3d orbital of the oxygen-tetracoordinated cobalt, the $e_g$ orbital has lower energy, and the $e_g$ orbital is in the ground state. Thus, oxygen-tetracoordinated $Co^{3+}$, $Co^{3+}$, and $Co^{3+}$ each include an unpaired electron in the ground state and thus are paramagnetic. Accordingly, when the particles that contain a sufficient amount of $Co_3O_4$ having the spinel crystal structure are analyzed by ESR or the like, signals attributed to paramagnetic oxygen-tetracoordinated $Co^{2+}$ (the spin quantum number S=3/2), $Co^{2+}$ (the spin quantum number S=1), or $Co^{4+}$ (the spin quantum number S=½) should be observed.

However, in the positive electrode active material 100 of one embodiment of the present invention, signals attributed to paramagnetic cobalt in the tetracoordinated oxygen site are too small to observe. Thus, unlike the spinel crystal structure, the pseudo-spinel crystal structure in this specification and the like does not contain a sufficient amount of oxygen-tetracoordinated cobalt to be detected by ESR. Therefore, signals that are attributed to $Co_3O_4$ having the spinel crystal structure and can be analyzed by ESR or the like in the positive electrode active material 100 of one embodiment of the present invention are lower than those in a conventional positive electrode active material, or too small to observe, in some cases. $Co_3O_4$ having the spinel crystal structure does not contribute to the charging and discharging reaction; thus, the amount of $Co_3O_4$ having the spinel crystal structure is preferably as small as possible. It can be determined also from the ESR analysis that the positive electrode active material 100 is different from the conventional positive electrode active material.

The positive electrode active material of one embodiment of the present invention contains one or both of $Co^{2+}$ and $Co^{4+}$. In addition, in the positive electrode active material of one embodiment of the present invention, the spin density attributed to $Co^{2+}$ and $Co^{4+}$ is preferably greater than or equal to $2.0\times10^{17}$ spins/g and less than or equal to $1.0\times10^{18}$ spins/g, further preferably greater than or equal to $2.5\times10^{17}$ spins/g and less than or equal to $9.5\times10^{17}$ spins/g, still further preferably greater than or equal to $3.0\times10^{17}$ spins/g and less than or equal to $9.0\times10^{17}$ spins/g, yet still further preferably greater than or equal to $3.5\times10^{17}$ spins/g and less than or equal to $8.5\times10^{17}$ spins/g. The spin density of the positive electrode active material can be evaluated by ESR analysis, for example. In addition, the ESR signal attributed to $Co^{2+}$ and $Co^{4+}$ is observed at a g-factor of around 2.15. The above spin density represents a value obtained from ESR analysis at room temperature, and is the number of spins per weight of the positive electrode active material. The above spin density can be calculated by dividing the number of spins obtained from ESR analysis by the weight of a sample used for the ESR analysis.

In the positive electrode active material of one embodiment of the present invention, the spin density attributed to $Co^{2+}$ and $Co^{4+}$ is preferably greater than or equal to $3.3\times10^{-5}$ spins/Co atom and less than or equal to $1.6\times10^{-4}$ spins/Co atom, further preferably greater than or equal to $4.1\times10^{-5}$ spins/Co atom and less than or equal to $1.5\times10^{-4}$ spins/Co atom, still further preferably greater than or equal to $4.9\times10^{-5}$ spins/Co atom and less than or equal to $1.5\times10^{-4}$ spins/Co atom, yet still further preferably greater than or equal to $5.7\times10^{-5}$ spins/Co atom and less than or equal to $1.4\times10^{-4}$ spins/Co atom. The above spin density represents a value obtained from ESR analysis at room temperature, and is the number of spins per cobalt atom of the positive electrode active material. The above spin density can be calculated by dividing the number of spins obtained from ESR analysis by the number of cobalt atoms in the positive electrode active material used for the ESR analysis. The number of cobalt atoms in the positive electrode active material in the case of, for example, lithium cobalt oxide with a composition of $LiCoO_2$ can be calculated from the molecular weight of 97.87 and the weight of the positive electrode active material used for the ESR analysis.

The positive electrode active material having the above spin density has a stable crystal structure, which can inhibit breakage of the crystal structure due to repeated charging and discharging. In addition, the use of the positive electrode active material of one embodiment of the present invention for a secondary battery enables the secondary battery to have excellent cycle performance and rate characteristics. Furthermore, the positive electrode active material having the above spin density sometimes has the pseudo-spinel crystal structure in a charged state.

<XPS>

A region from the surface to a depth of approximately 2 nm to 8 nm (normally, approximately 5 nm) can be analyzed by X-ray photoelectron spectroscopy (XPS); thus, the concentration of each element in approximately half of the surface portion of the particle can be quantitatively analyzed. In addition, the bonding states of the elements can be analyzed by narrow scanning analysis. Note that the quantitative accuracy of XPS is approximately ±1 atomic % in many cases, and the detection lower limit depends on the element but is approximately 1 atomic %.

When the positive electrode active material 100 is analyzed by XPS and the cobalt concentration is set to 1, the relative value of the magnesium concentration is preferably greater than or equal to 0.4 and less than or equal to 1.5, further preferably greater than or equal to 0.45 and less than 1.00. Furthermore, the relative value of the concentration of halogen such as fluorine is preferably greater than or equal to 0.05 and less than or equal to 1.5, further preferably greater than or equal to 0.3 and less than or equal to 1.00.

When the positive electrode active material 100 is analyzed by XPS, a peak indicating the bonding energy of fluorine with another element is preferably higher than or equal to 682 eV and lower than 685 eV, further preferably approximately 684.3 eV. This value is different from both of the bonding energy of lithium fluoride, which is 685 eV, and the bonding energy of magnesium fluoride, which is 686 eV. That is, when the positive electrode active material 100 contains fluorine, bonding other than bonding of lithium fluoride and magnesium fluoride is preferable.

Furthermore, when the positive electrode active material 100 is analyzed by XPS, a peak indicating the bonding energy of magnesium with another element is preferably higher than or equal to 1302 eV and lower than 1304 eV, further preferably approximately 1303 eV. This value is different from the bonding energy of magnesium fluoride, which is 1305 eV, and is close to the bonding energy of magnesium oxide. That is, when the positive electrode active material 100 contains magnesium, bonding other than bonding of magnesium fluoride is preferable.

<EDX>

The concentrations of the elements in the inner portion of the particle, in the surface portion of the particle, and in the vicinity of a crystal grain boundary can be evaluated using energy dispersive X-ray spectroscopy (EDX), for example. In the EDX measurement, to measure a region while scanning the region and evaluate two-dimensionally is referred to as EDX plane analysis in some cases. In addition, to extract data of a linear region from EDX plane analysis and evaluate the atomic concentration distribution in a positive electrode active material particle is referred to as linear analysis in some cases.

The concentrations of magnesium and fluorine in the inner portion of the particle, the surface portion of the particle, and the vicinity of the crystal grain boundary can be quantitatively analyzed by the EDX area analysis (e.g., element mapping). In addition, peaks of the concentrations of magnesium and fluorine can be analyzed by the EDX linear analysis.

When the positive electrode active material 100 is analyzed by the EDX linear analysis, a peak of the magnesium concentration in the surface portion of the particle preferably exists in a region from the surface of the positive electrode active material 100 to a depth of 3 nm toward the center, further preferably to a depth of 1 nm, still further preferably to a depth of 0.5 nm.

A distribution of fluorine in the positive electrode active material 100 preferably overlaps with a distribution of magnesium. Thus, when the EDX line analysis is performed, a peak of the fluorine concentration in the surface portion of the particle preferably exists in a region from the surface of the positive electrode active material 100 to a depth of 3 nm toward the center, further preferably to a depth of 1 nm, still further preferably to a depth of 0.5 nm.

When the linear analysis or the plane analysis is performed on the positive electrode active material 100, the atomic ratio of magnesium to cobalt (Mg/Co) in the vicinity of the crystal grain boundary is preferably greater than or equal to 0.020 and less than or equal to 0.50. It is further preferably greater than or equal to 0.025 and less than or equal to 0.30. It is still further preferably greater than or equal to 0.030 and less than or equal to 0.20.

<dQ/dVvsV Curve>

Moreover, when the positive electrode active material of one embodiment of the present invention is discharged at a low rate of, for example, 0.2 C or less after high-voltage charging, a characteristic change in voltage appears just before the end of discharging, in some cases. This change can be clearly observed by the fact that at least one peak appears within the range of 3.5 V to 3.9 V in a dQ/dVvsV curve calculated from a discharge curve.

Embodiment 2

In this embodiment, an example of a manufacturing method of the positive electrode active material of one embodiment of the present invention is described.

[Manufacturing Method 1 of Positive Electrode Active Material]

Figure 8:
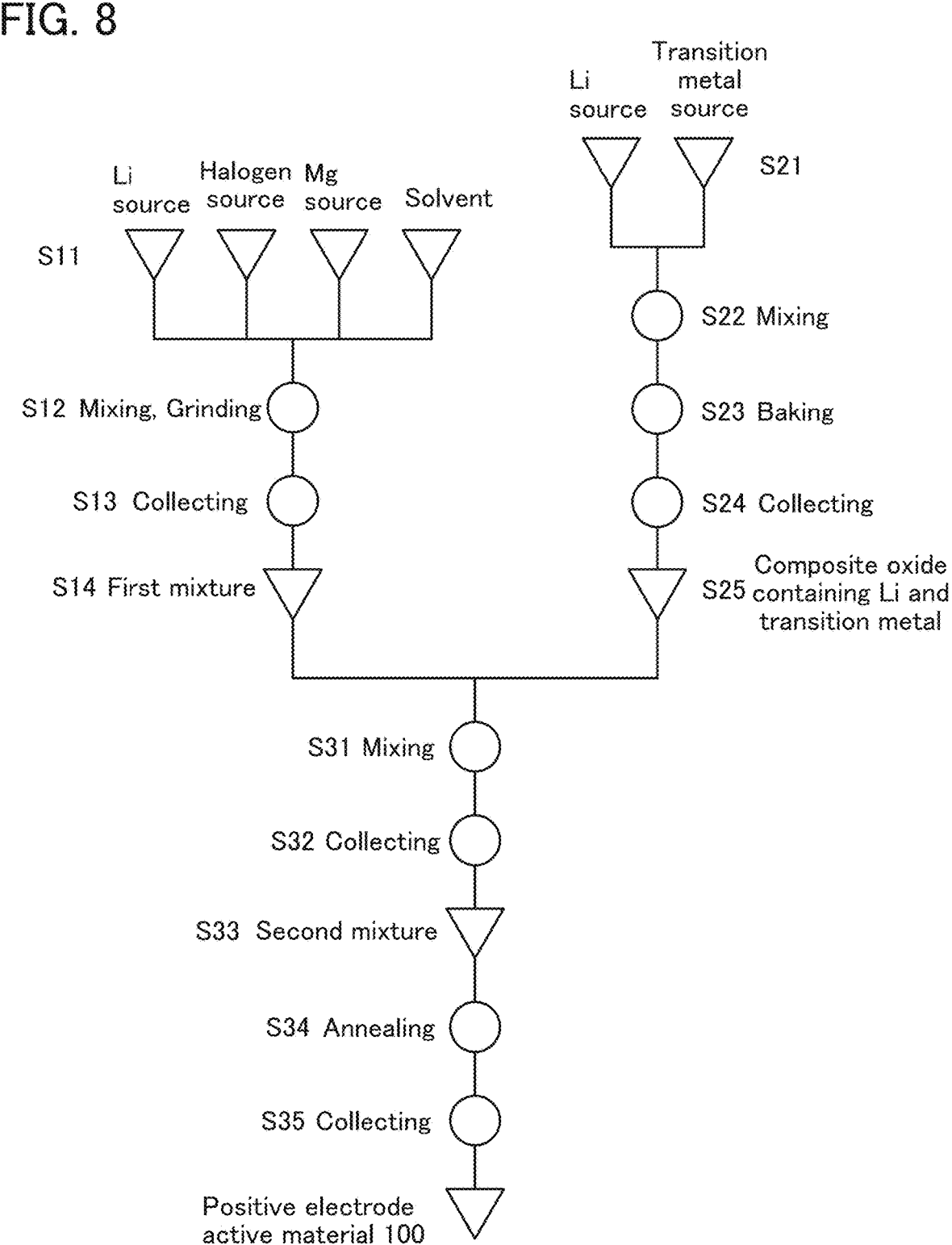
FIG. 8 is a diagram showing an example of a manufacturing method of a positive electrode active material of one embodiment of the present invention.
Figure 9:
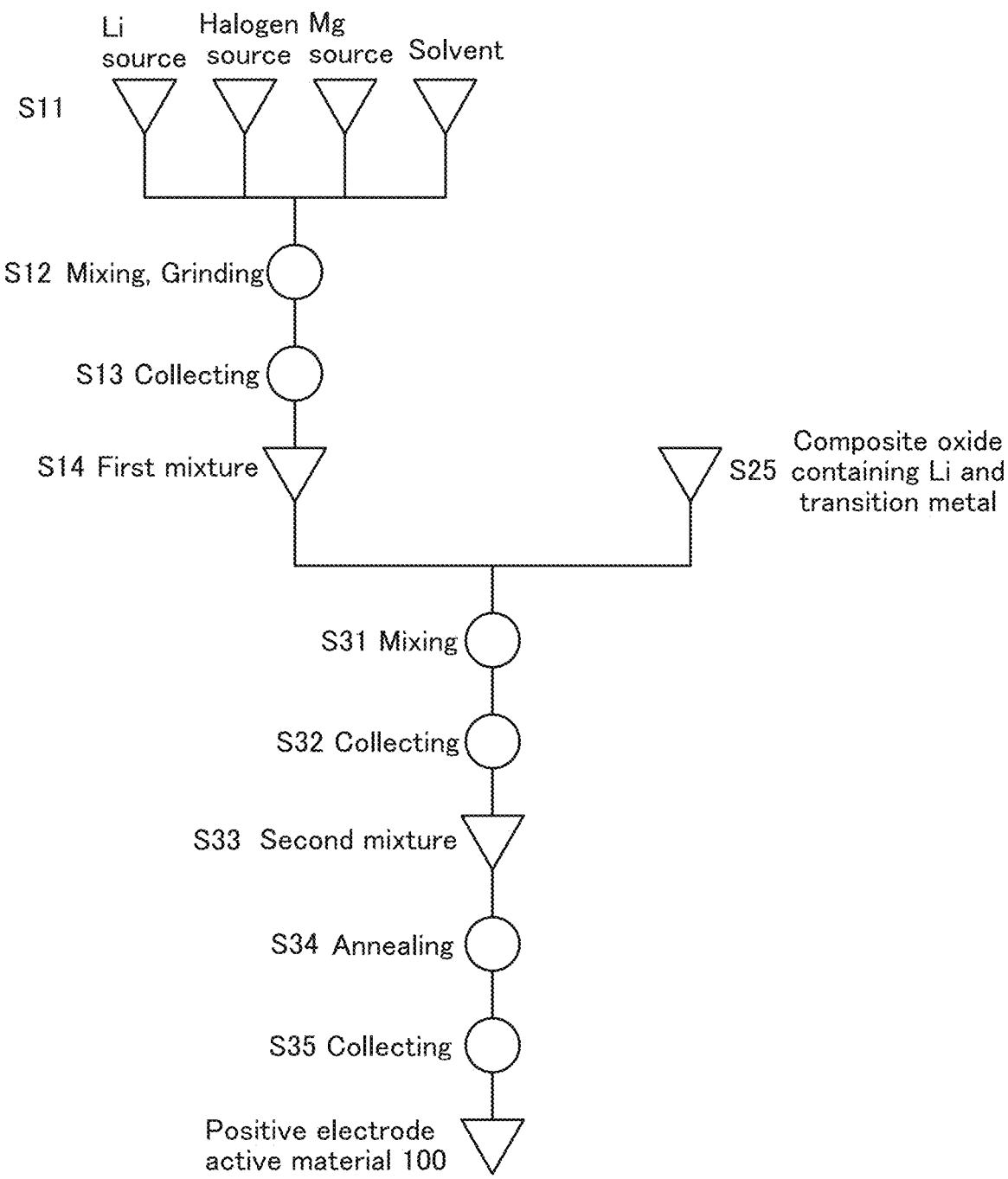
FIG. 9 is a diagram showing an example of a manufacturing method of a positive electrode active material of one embodiment of the present invention.

An example of a manufacturing method of the positive electrode active material 100 of one embodiment of the present invention is described using FIG. 8 and FIG. 9.

<Step S11>

In Step S11, a halogen source and a magnesium source that are materials for a first mixture are prepared (Step S11 in FIG. 8 and FIG. 9). In addition, a lithium source is preferably prepared as well. Furthermore, in the case where the following mixing and grinding steps are performed by a wet process, a solvent is prepared.

As the magnesium source, for example, magnesium fluoride, magnesium oxide, magnesium hydroxide, or magnesium carbonate can be used. As the lithium source, for example, lithium fluoride or lithium carbonate can be used.

As the halogen source, a material containing fluorine, chlorine, or the like can be used. A material containing halogen and magnesium may be used as the halogen source and the magnesium source. In addition, a material containing halogen and lithium may be used as the halogen source and the lithium source. As a lithium source and a halogen source containing fluorine, lithium fluoride can be used, for example. As a magnesium source and a halogen source containing fluorine, magnesium fluoride can be used, for example. In particular, lithium fluoride can be suitably used as the halogen source and the lithium source because it has a relatively low melting point of 848° C. and thus is easily melted in an annealing step described later. As a lithium source and a halogen source containing chlorine, lithium chloride can be used, for example. As a magnesium source and a halogen source containing chlorine, magnesium chloride can be used, for example.

As the solvent, ketone such as acetone; alcohol such as ethanol or isopropanol; ether; dioxane; acetonitrile; N-methyl-2-pyrrolidone (NMP); or the like can be used. An aprotic solvent that does not easily react with lithium is preferably used, and acetone can be suitably used, for example.

Specific description is made using an example where lithium fluoride (LiF) is used as the halogen source and the lithium source and magnesium fluoride ($MgF_2$) is used as the halogen source and the magnesium source. When lithium fluoride and magnesium fluoride are mixed at approximately LiF:$MgF_2$=65:35 (molar ratio), the effect of reducing the melting point becomes the highest (Non-Patent Document 4). On the other hand, when the amount of lithium fluoride increases, cycle performance might deteriorate because of a too large amount of lithium. Therefore, the molar ratio of lithium fluoride LiF to magnesium fluoride $MgF_2$ is preferably LiF: $MgF_2$=x:1 (0≤x≤1.9), further preferably LiF: $MgF_2$=x:1 (0.1×0.5), still further preferably LiF: $MgF_2$=x:1 (x=the vicinity of 0.33). Note that in this specification and the like, the vicinity means a value greater than 0.9 times and smaller than 1.1 times a certain value.

<Step S12>

Next, in Step S12, the materials and the solvent prepared in Step S11 are mixed and ground (Step S12 in FIG. 8 and FIG. 9). Although the mixing can be performed by a dry process or a wet process, the wet process is preferable because the materials can be ground to the smaller size. For the mixing, a ball mill, a bead mill, or the like can be used. In the case where the ball mill is used, a zirconia ball is preferably used as media, for example. The mixing step and the grinding step are preferably performed sufficiently to pulverize the materials.

<Step S13 and Step S14>

The materials mixed and ground in Step S12 are collected (Step S13 in FIG. 8 and FIG. 9), whereby the first mixture is obtained (Step S14 in FIG. 8 and FIG. 9).

As for the particle diameter of the first mixture, for example, the average particle diameter (D50) is preferably greater than or equal to 600 nm and less than or equal to 20

μm, further preferably greater than or equal to 1 μm and less than or equal to 10 μm. When mixed with a composite oxide containing lithium and a transition metal in the later step, the first mixture pulverized to such a small size is easily attached to surfaces of composite oxide particles uniformly. The first mixture is preferably attached to the surfaces of the composite oxide particles uniformly because both halogen and magnesium are easily distributed to the surface portion of the particles of the composite oxide by heat treatment. When there is a region containing neither halogen nor magnesium in the surface portion of the particle, a pseudo-spinel crystal structure, which is described later, might be less likely to be obtained in the charged state.

<Step S21>

In Step S21, a lithium source and a transition metal source that are materials for a composite oxide containing lithium and a transition metal are prepared (Step S21 in FIG. 8).

As the lithium source, for example, lithium carbonate or lithium fluoride can be used.

As the transition metal, cobalt can be favorably used. In addition, one or both of aluminum and nickel may be further contained.

As the transition metal source, an oxide or a hydroxide of the transition metal, or the like can be used. As a cobalt source, for example, cobalt oxide or cobalt hydroxide can be used. As a manganese source, manganese oxide, manganese hydroxide, or the like can be used. As a nickel source, nickel oxide, nickel hydroxide, or the like can be used. As an aluminum source, aluminum oxide, aluminum hydroxide, or the like can be used.

<Step S22>

Next, in Step S22, the lithium source and the transition metal source prepared in Step S21 are mixed (Step S22 in FIG. 8). The mixing can be performed by a dry process or a wet process. For the mixing, a ball mill, a bead mill, or the like can be used. In the case where the ball mill is used, a zirconia ball is preferably used as media, for example.

<Step S23>

Then, in Step S23, heat treatment is performed on the materials mixed in Step S22 (Step S23 in FIG. 8). This step is sometimes referred to as baking or first heat treatment to distinguish this step from heat treatment performed later. The heat treatment is preferably performed at higher than or equal to 800° C. and lower than 1100° C., further preferably at higher than or equal to 900° C. and lower than or equal to 1000° C., still further preferably at approximately 950° C. The heat treatment at excessively low temperature might result in insufficient decomposition and melting of starting materials. In contrast, the heat treatment at excessively high temperature might cause a defect due to excessive reduction of the transition metal, evaporation of lithium, or the like.

The duration of the heat treatment is preferably longer than or equal to 2 hours and shorter than or equal to 20 hours. The heat treatment is preferably performed in an atmosphere with few moisture, such as dry air (e.g., a dew point is lower than or equal to −50° C., further preferably lower than or equal to −100° C.). For example, heating can be performed at 1000° C. for 10 hours at a temperature rising rate of 200° C./h. In addition, the flow rate of the dry air is preferably set so that a gas released from the materials by the heat treatment has sufficiently low partial pressure. When the flow rate is set so that the released gas has sufficiently low partial pressure, reaction in the materials can be promoted.

After the heat treatment, the materials can be cooled to room temperature. The temperature decreasing time from the specified temperature to room temperature is preferably longer than or equal to 10 hours and shorter than or equal to 50 hours, for example. Note that the cooling to room temperature in Step S23 is not essential. As long as later steps of Step S24, Step S25, and Step S31 to Step S34 are performed without problems, the cooling may be performed to a temperature higher than room temperature.

<Step S24 and Step S25>

Next, the materials baked in Step S23 are collected (Step S24 in FIG. 8), whereby the composite oxide containing lithium and the transition metal is obtained (Step S25 in FIG. 8). Specifically, lithium cobalt oxide or lithium cobalt oxide containing aluminum or nickel is obtained.

Note that a composite oxide containing lithium and a transition metal which is synthesized in advance may be used in Step S25 (Step S25 in FIG. 9). In this case, Step S21 to Step S24 can be omitted.

In the case where the composite oxide containing lithium and the transition metal which is synthesized in advance is used, a composite oxide with few impurities is preferably used. In this specification and the like, lithium, cobalt, nickel, manganese, aluminum, and oxygen are the main components of the composite oxide containing lithium and the transition metal and the positive electrode active material, and elements other than the main components are regarded as impurities. For example, when analyzed by a glow discharge mass spectroscopy method, the total impurity element concentration is preferably less than or equal to 10,000 ppm (wt), further preferably less than or equal to 5,000 ppm (wt).

For example, as lithium cobalt oxide synthesized in advance, a lithium cobalt oxide particle (product name: CELLSEED C-10N) manufactured by NIPPON CHEMICAL INDUSTRIAL CO., LTD. can be used. This is lithium cobalt oxide in which the average particle diameter (D50) is approximately 12 μm, and in the impurity analysis by a glow discharge mass spectroscopy method (GD-MS), the magnesium concentration and the fluorine concentration are less than or equal to 50 ppm (wt), the calcium concentration, the aluminum concentration, and the silicon concentration are less than or equal to 100 ppm (wt), the nickel concentration is less than or equal to 150 ppm (wt), the sulfur concentration is less than or equal to 500 ppm (wt), the arsenic concentration is less than or equal to 1,100 ppm (wt), and the concentrations of elements other than lithium, cobalt, and oxygen are less than or equal to 150 ppm (wt).

As lithium cobalt oxide synthesized in advance, a lithium cobalt oxide particle (product name: CELLSEED C-5H) manufactured by NIPPON CHEMICAL INDUSTRIAL CO., LTD. can also be used. This is lithium cobalt oxide in which the average particle diameter (D50) is approximately 6.5 μm, and the concentrations of elements other than lithium, cobalt, and oxygen are approximately equal to or less than those of C-10N in the impurity analysis by GD-MS.

The composite oxide containing lithium and the transition metal in Step S25 preferably has a layered rock-salt crystal structure with few defects and distortions. Therefore, the composite oxide is preferably a composite oxide with few impurities. In the case where the composite oxide containing lithium and the transition metal includes a lot of impurities, the crystal structure is highly likely to have a lot of defects or distortions.

<Step S31>

Next, in Step S31, the first mixture obtained in Step S14 and the composite oxide containing lithium and the transition metal obtained in Step S25 are mixed (Step S31 in FIG. 8 and FIG. 9). The atomic ratio of the transition metal TM in the composite oxide containing lithium and the transition metal to magnesium $Mg_{Mix1}$ contained in the first mixture Mix1 is preferably TM: $Mg_{Mix1}$=1:y (0.0005≤y≤0.03), further preferably TM: $Mg_{Mix1}$=1:y (0.001≤y≤0.01), still further preferably approximately TM: $Mg_{Mix1}$=1:0.005.

The condition of the mixing in Step S31 is preferably milder than that of the mixing in Step S12 not to damage the particles of the composite oxide. For example, a condition with a lower rotation frequency or shorter time than the mixing in Step S12 is preferable. In addition, it can be said that the dry process has a milder condition than the wet process. For the mixing, a ball mill, a bead mill, or the like can be used. In the case where the ball mill is used, a zirconia ball is preferably used as media, for example.

<Step S32 and Step S33>

Next, the materials mixed in Step S31 are collected (Step S32 in FIG. 8 and FIG. 9), whereby a second mixture is obtained (Step S33 in FIG. 8 and FIG. 9).

Note that this embodiment describes a method for adding the mixture of lithium fluoride and magnesium fluoride to lithium cobalt oxide with few impurities; however, one embodiment of the present invention is not limited thereto. Mixture obtained through baking after addition of a magnesium source and a fluorine source to the starting material of lithium cobalt oxide may be used instead of the second mixture in Step S33. In this case, there is no need to separate steps of Step S11 to Step S14 and steps of Step S21 to Step S25, which is simple and productive.

Alternatively, lithium cobalt oxide to which magnesium and fluorine are added in advance may be used. When lithium cobalt oxide to which magnesium and fluorine are added is used, the process can be simpler because the steps up to Step S32 can be omitted.

In addition, a magnesium source and a fluorine source may be further added to the lithium cobalt oxide to which magnesium and fluorine are added in advance.

<Step S34>

Next, in Step S34, heat treatment is performed on the second mixture obtained in Step S33 (Step S34 in FIG. 8 and FIG. 9). This step can be referred to as annealing or second heat treatment to distinguish this step from the heat treatment performed before.

The annealing is preferably performed at an appropriate temperature for an appropriate time. The appropriate temperature and time vary depending on the conditions such as the particle size and the composition of the composite oxide containing lithium and the transition metal in Step S25. In the case where the particle size is small, the annealing is preferably performed at a lower temperature or for a shorter time than the case where the particle size is large, in some cases.

In the case where the average particle diameter (D50) of the particles in Step S25 is approximately 12 μm, for example, the annealing temperature is preferably higher than or equal to 600° C. and lower than or equal to 950° C., for example. The annealing time is preferably longer than or equal to 3 hours, further preferably longer than or equal to 10 hours, still further preferably longer than or equal to 60 hours, for example.

On the other hand, when the average particle diameter (D50) of the particles in Step S25 is approximately 5 μm, the annealing temperature is preferably higher than or equal to 600° C. and lower than or equal to 950° C., for example. The annealing time is preferably longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

It is considered that when the second mixture is annealed, a material having a low melting point (e.g., lithium fluoride, which has a melting point of 848° C.) in the first mixture is melted first and distributed to the surface portion of the particle of the composite oxide. Next, the existence of the melted material decreases the melting points of other materials, presumably resulting in melting of the other materials. For example, magnesium fluoride (melting point: 1263° C.) is presumably melted and distributed to the surface portion of the particle of the composite oxide.

Then, the elements that are contained in the first mixture and are distributed to the surface portion of the particle are probably entered a solid solution in the composite oxide containing lithium and the transition metal.

The elements contained in the first mixture diffuse faster in the surface portion of the particle and the vicinity of the crystal grain boundary than in the inner portion of the particle of the composite oxide. Therefore, the concentrations of magnesium and halogen in the surface portion of the particle and the vicinity of the crystal grain boundary are higher than those of magnesium and halogen inside the particle. As described later, the higher the magnesium concentration in the surface portion of the particle and the vicinity of the crystal grain boundary is, the more effectively the crystal structure change can be suppressed.

<Step S35>

Then, in Step S35, the materials annealed in Step S34 are collected, whereby the positive electrode active material 100 of one embodiment of the present invention is obtained.

When manufactured by a method shown in FIG. 8 and FIG. 9, the positive electrode active material 100 having the pseudo-spinel crystal structure with few defects in high-voltage charging can be manufactured. Furthermore, the use of the positive electrode active material 100 of one embodiment of the present invention for a secondary battery enables the secondary battery to have excellent cycle performance and rate characteristics. For example, with the positive electrode active material in which the proportion of the pseudo-spinel crystal structure is 50% or higher, the secondary battery can have excellent cycle performance and rate characteristics. The proportion of the pseudo-spinel crystal structure in the positive electrode active material can be checked by, for example, performing the Rietveld analysis in XRD measurement.

To contain magnesium and fluorine in the positive electrode active material and to anneal the positive electrode active material at an appropriate temperature for an appropriate time are effective in manufacturing the positive electrode active material having the pseudo-spinel crystal structure after high-voltage charging. A magnesium source and a fluorine source may be added to the starting material of the composite oxide. However, when the melting points of the magnesium source and the fluorine source are higher than the baking temperature, the magnesium source and the fluorine source added to the starting material of the composite oxide might not be melted, resulting in insufficient diffusion. Then, there is a high possibility that the layered rock-salt crystal structure has a lot of defects or distortions. As a result, the pseudo-spinel crystal structure after high-voltage charging also might have defects or distortions.

Thus, it is preferable that a composite oxide having a layered rock-salt crystal structure with few impurities, defects, or distortions be obtained first. Then, the composite oxide, the magnesium source, and the fluorine source are preferably mixed and annealed in the later step to form a solid solution of magnesium and fluorine in the surface portion of the particles of the composite oxide. In this matter, the positive electrode active material having the pseudo-spinel crystal structure with few defects or distortions after high-voltage charging can be manufactured.

In addition, the positive electrode active material 100 manufactured through the above steps may be further covered with another material. In addition, heat treatment may be further performed.

For example, the positive electrode active material 100 and a compound containing phosphoric acid can be mixed and heated after the mixing. In addition, heat treatment can be performed after the mixing. When the compound containing phosphoric acid is mixed, it is possible to obtain the positive electrode active material 100 where elution of a transition metal such as cobalt is inhibited even when a state being charged with high voltage is held for a long time. Moreover, heat treatment after the mixing enables more uniform coverage with phosphoric acid.

As the compound containing phosphoric acid, for example, lithium phosphate, ammonium dihydrogen phosphate, or the like can be used. The mixing can be performed by a solid phase method, for example. The heating can be performed at higher than or equal to 800° C. for two hours, for example.

[Manufacturing Method 2 of Positive Electrode Active Material]

A manufacturing method of the positive electrode active material 100 which is different from [Manufacturing method 1 of positive electrode active material] described above is described using FIG. 10.

<Step S41>

Figure 10:
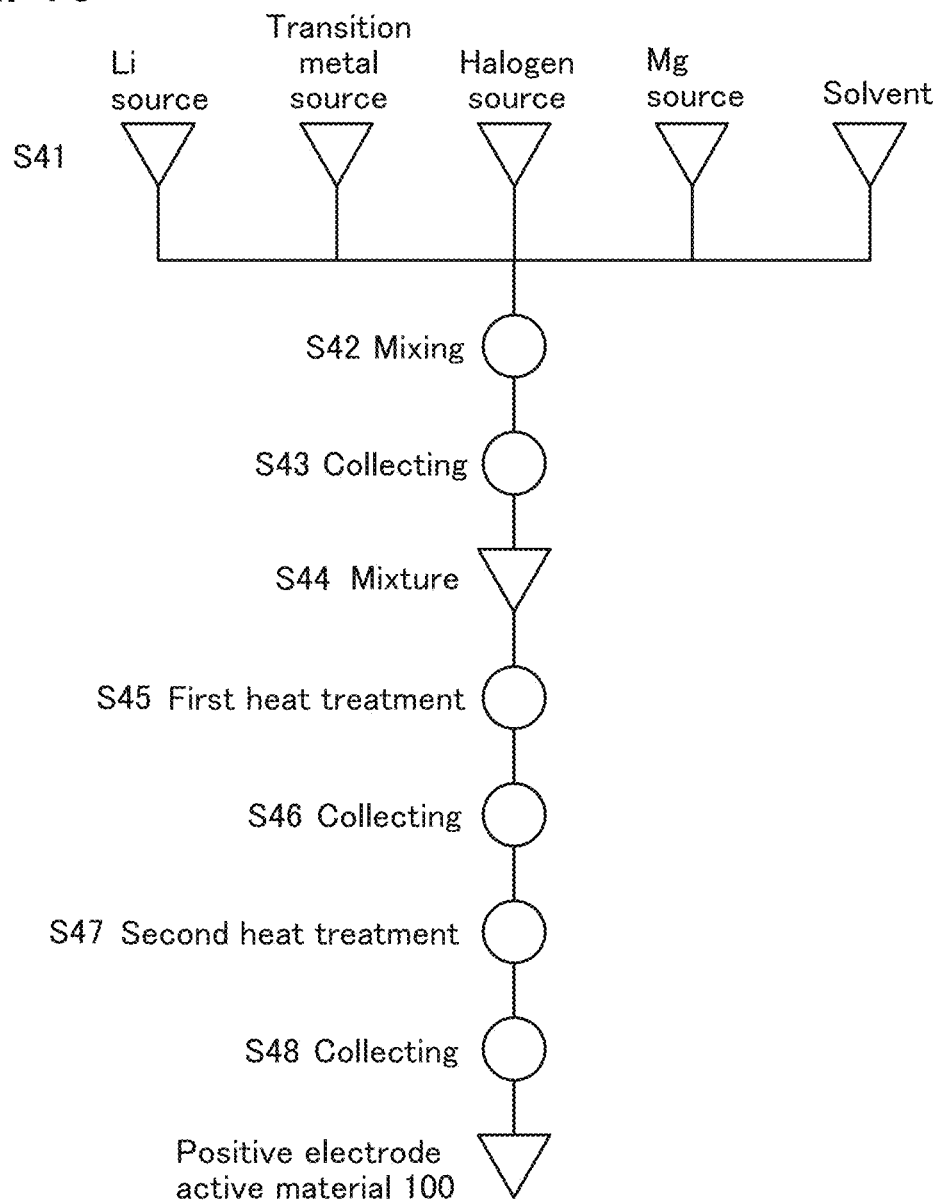
FIG. 10 is a diagram showing an example of a manufacturing method of a positive electrode active material of one embodiment of the present invention.

In Step S41, a lithium source, a transition metal source, a halogen source, and a magnesium source that are materials for a mixture are prepared (Step S41 in FIG. 10). In addition, in the case where the following mixing and grinding steps are performed by a wet process, a solvent is prepared.

Since the description of [Manufacturing method 1 of positive electrode active material] described above can be referred to for the lithium source, the transition metal source, the halogen source, the magnesium source, and the solvent, the detailed description is omitted.

<Step S42>

Next, in Step S42, the materials and the solvent prepared in Step S41 are mixed and ground (Step S42 in FIG. 10). Since the description of [Manufacturing method 1 of positive electrode active material] described above can be referred to for the mixing and the grinding, the detailed description is omitted.

<Step S43 and Step S44>

The materials mixed and ground in Step S42 are collected (Step S43 in FIG. 10), whereby the mixture is obtained (Step S44 in FIG. 10).

<Step S45>

Next, in Step S45, first heat treatment is performed on the mixture obtained in Step S44 (Step S45 in FIG. 10). First heat treatment is preferably performed at higher than or equal to 800° C. and lower than 1100° C., further preferably at higher than or equal to 900° C. and lower than or equal to 1000° C., still further preferably at approximately 950° C. The first heat treatment at excessively low temperature might result in insufficient decomposition and melting of starting materials. In contrast, the first heat treatment at excessively high temperature might cause a defect due to excessive reduction of the transition metal, evaporation of lithium, or the like.

The duration of the first heat treatment is preferably longer than or equal to 2 hours and shorter than or equal to 20 hours. The first heat treatment is preferably performed in an atmosphere with few moisture, such as dry air (e.g., a dew point is lower than or equal to −50° C., further preferably lower than or equal to −100° C.). For example, it is preferable that the heating be performed at 1000° C. for 10 hours, the temperature rising rate be 200° C./h, and the flow rate of dry air be 10 L/min.

After the first heat treatment, the materials can be cooled to room temperature. The temperature decreasing time from the specified temperature to room temperature is preferably longer than or equal to 10 hours and shorter than or equal to 50 hours, for example. Note that the cooling to room temperature in Step S45 is not essential. As long as later steps of Step S46, Step S47 are performed without problems, the cooling may be performed to a temperature higher than room temperature.

<Step S46>

Next, the baked mixture is collected in Step S46 (Step S46 in FIG. 10).

<Step S47>

Then, in Step S47, heat treatment is performed on a second mixture obtained in Step S46 (Step S47 in FIG. 10).

Second heat treatment is preferably performed at an appropriate temperature for an appropriate time. The appropriate temperature and time vary depending on conditions such as the particle size and the composition of the mixture. In the case where the particle size is small, the heat treatment is preferably performed at a lower temperature or for a shorter time than the case where the particle size is large, in some cases.

In the case where the average particle diameter (D50) of the particles of the mixture is approximately 12 μm, for example, the temperature of the second heat treatment is preferably higher than or equal to 600° C. and lower than or equal to 950° C., for example. The duration of the second heat treatment is preferably longer than or equal to 3 hours, further preferably longer than or equal to 10 hours, still further preferably longer than or equal to 60 hours, for example.

On the other hand, in the case where the average particle diameter (D50) of the particles of the mixture is approximately 5 μm, the temperature of the second heat treatment is preferably higher than or equal to 600° C. and lower than or equal to 950° C., for example. The duration of the second heat treatment is preferably longer than or equal to 1 hour and shorter than or equal to 10 hours, further preferably approximately 2 hours, for example.

The temperature decreasing time after the second heat treatment is, for example, preferably longer than or equal to 10 hours and shorter than or equal to 50 hours.

<Step S48>

Next, in Step S48, the materials annealed in Step S34 are collected, whereby the positive electrode active material 100 of one embodiment of the present invention is obtained.

The above is the manufacturing method of the positive electrode active material 100 of one embodiment of the present invention.

Embodiment 3

In this embodiment, examples of materials that can be used for a secondary battery containing the positive electrode active material 100 described in the above embodiments are described. In this embodiment, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer includes at least a positive electrode active material. The positive electrode active material layer may include, in addition to the positive electrode active material, other materials such as a coating film of the active material surface, a conductive additive, and a binder.

As the positive electrode active material, the positive electrode active material 100 described in the above embodiments can be used. A secondary battery including the positive electrode active material 100 described in the above embodiments can have high capacity and excellent cycle performance.

As the conductive additive, a carbon material, a metal material, and a conductive ceramic material can be used, for example. Alternatively, a fiber material may be used as the conductive additive. The content of the conductive additive to the total amount of the active material layer is preferably greater than or equal to 1 wt % and less than or equal to 10 wt %, further preferably greater than or equal to 1 wt % and less than or equal to 5 wt %.

A network for electric conduction can be formed in the active material layer by the conductive additive. The conductive additive also allows the maintenance of a path for electric conduction between the positive electrode active materials. The addition of the conductive additive to the active material layer can achieve an active material layer having high electric conductivity.

As the conductive additive, natural graphite, artificial graphite such as mesocarbon microbeads, or carbon fiber can be used, for example. As carbon fiber, carbon fiber such as mesophase pitch-based carbon fiber or isotropic pitch-based carbon fiber can be used, for example. Alternatively, as carbon fiber, carbon nanofiber, carbon nanotube, or the like can be used. Carbon nanotube can be formed by, for example, a vapor deposition method. Alternatively, a carbon material such as carbon black (acetylene black (AB) or the like), graphite (black lead) particles, graphene, or fullerene can be used as the conductive additive, for example. Alternatively, metal powder or metal fibers of copper, nickel, aluminum, silver, gold, or the like, a conductive ceramic material, or the like can be used.

A graphene compound may be used as the conductive additive.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. Thus, a graphene compound is preferably used as the conductive additive, in which case the area where the active material and the conductive additive are in contact with each other can be increased. The graphene compound that is the conductive additive is preferably formed using a spray dry apparatus as a coating film to cover the entire surface of the active material. In addition, the graphene compound is preferable because electrical resistance can be reduced in some cases. Here, it is particularly preferable to use, for example, graphene, multi graphene, or RGO as a graphene compound. Note that RGO refers to a compound obtained by reducing graphene oxide (GO), for example.

In the case where an active material with a small particle size (e.g., 1 µm or less) is used, the specific surface area of the active material is large and thus more conductive paths for the active material particles are needed. Thus, the amount of the conductive additive tends to increase and the carried amount of the active material tends to decrease relatively. When the carried amount of the active material decreases, the capacity of the secondary battery also decreases. In such a case, a graphene compound that can efficiently form a conductive path even with a small amount is particularly preferably used as the conductive additive because the carried amount of the active material does not decrease.

A cross-sectional structure example of an active material layer 200 in which a graphene compound is used as a conductive additive is described below as an example.

Figure 11A:
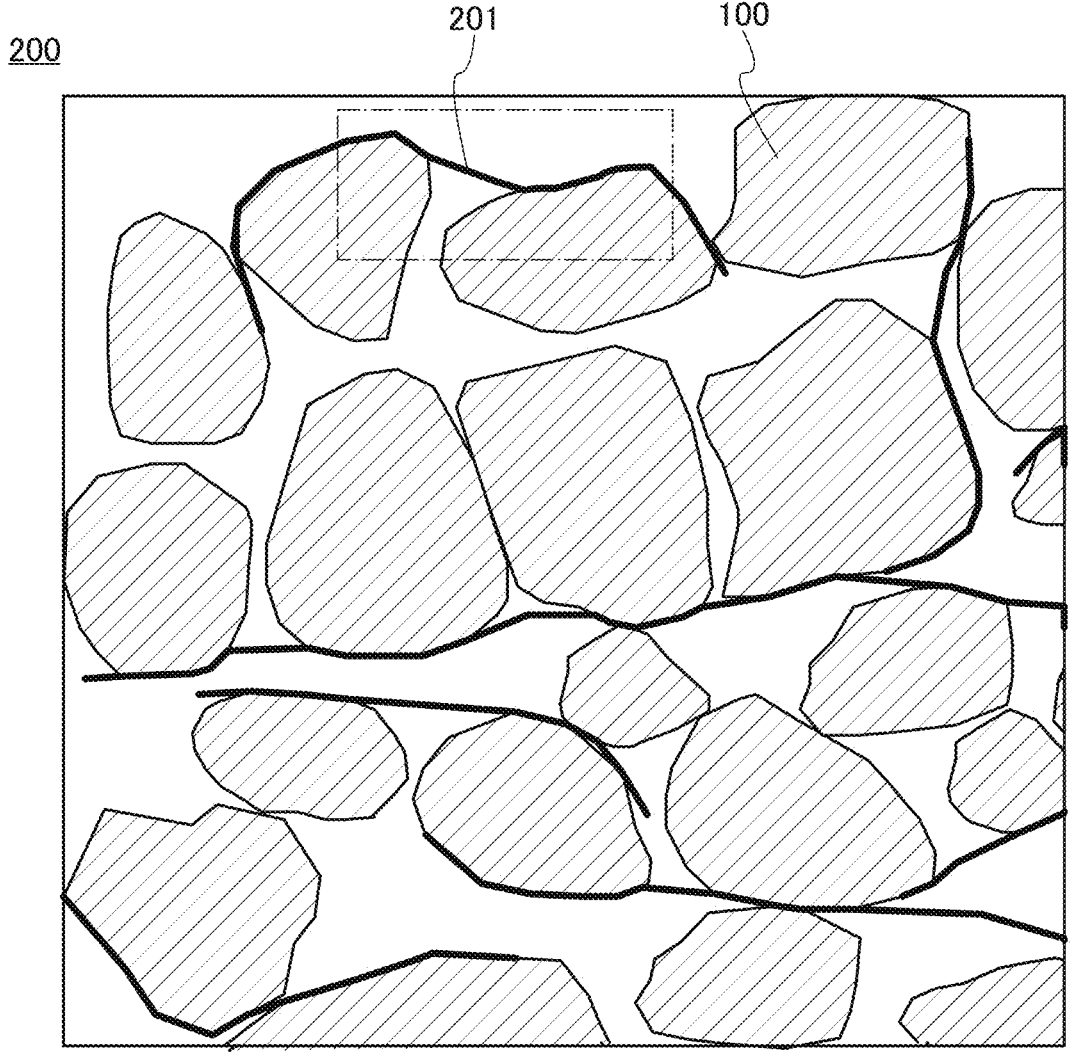
FIG. 11A and FIG. 11B are cross-sectional views of an active material layer in the case where a graphene compound is used as a conductive additive.

FIG. 11A is a longitudinal cross-sectional view of the active material layer 200. The active material layer 200 includes particles of the positive electrode active material 100, a graphene compound 201 serving as a conductive additive, and a binder (not illustrated). Here, graphene or multi graphene may be used as the graphene compound 201, for example. The graphene compound 201 preferably has a sheet-like shape. The graphene compound 201 may have a sheet-like shape formed of a plurality of sheets of multi graphene and/or a plurality of sheets of graphene that partly overlap with each other.

Figure 11B:
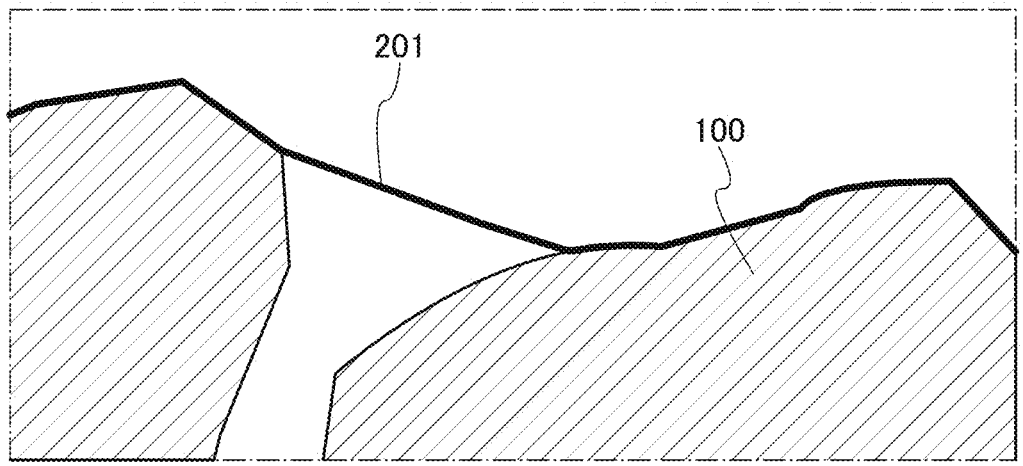

The longitudinal cross section of the active material layer 200 in FIG. 11B shows substantially uniform dispersion of the sheet-like graphene compounds 201 among the particles in the active material layer 200. The graphene compounds 201 are schematically shown by thick lines in FIG. 11B but are actually thin films each having a thickness corresponding to the thickness of a single layer or a multi-layer of carbon molecules. The plurality of graphene compounds 201 are formed to partly coat or adhere to the surfaces of the plurality of particles of the positive electrode active material 100, so that the graphene compounds 201 make surface contact with the particles of the positive electrode active material 100.

Here, the plurality of graphene compounds are bonded to each other to form a net-like graphene compound sheet (hereinafter, referred to as a graphene compound net or a graphene net). The graphene net covering the active material can function as a binder for bonding active materials. The amount of binder can thus be reduced, or the binder does not have to be used, which can increase the proportion of the active material in the electrode volume or the electrode weight. That is, the capacity of the secondary battery can be increased.

Here, it is preferable to perform reduction after a layer to be the active material layer 200 is formed by mixing active materials and the graphene compounds 201 that use graphene oxide. When graphene oxide with extremely high dispersibility in a polar solvent is used for the formation of the graphene compounds 201, the graphene compounds 201 can be substantially uniformly dispersed among the particles in the active material layer 200. The solvent is removed by volatilization from a dispersion medium containing the uniformly-dispersed graphene oxide to reduce the graphene oxide; hence, the graphene compounds 201 remaining in the active material layer 200 are partly overlap with each other and are dispersed such that surface contact is made, thereby forming a three-dimensional conduction path. Note that graphene oxide can be reduced either by heat treatment or with the use of a reducing agent, for example.

Unlike a particle of conductive additive such as acetylene black, which makes point contact with an active material, the graphene compound 201 is capable of making low-resistance surface contact; accordingly, the electrical conduction between the particles of the positive electrode active material 100 and the graphene compound 201 can be improved with a smaller amount of the graphene compound 201 than that of a normal conductive additive. This can increase the proportion of the positive electrode active material 100 in the active material layer 200. Accordingly, the discharge capacity of the secondary battery can be increased.

With a spray dry apparatus, a graphene compound serving as a conductive additive as a coating film can be formed to cover the entire surface of the active material in advance and a conductive path can be formed between the active materials using the graphene compound.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, for example, a polysaccharide can be used. As the polysaccharide, for example, a cellulose derivative such as carboxymethyl cellulose (CMC), methyl cellulose, ethyl cellulose, hydroxypropyl cellulose, diacetyl cellulose, and regenerated cellulose or starch can be used. It is further preferable that such water-soluble polymers be used in combination with any of the above rubber materials.

As the binder, a material such as polystyrene, poly(methyl acrylate), poly(methyl methacrylate) (polymethyl methacrylate, PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

A fluorine-based resin has an advantage in high mechanical strength, high chemical resistance, high heat resistance, and the like. Note that PVDF that is a fluorine-based resin particularly has excellent characteristics among fluorine-based resins; it has high mechanical strength, is easy to process, and has high heat resistance.

Meanwhile, when the slurry formed in coating the active material layer is alkaline, PVDF might be gelled. Alternatively, PVDF might be insolubilized. Gelling or insolubilization of a binder might decrease adhesion between a current collector and an active material layer. The use of the positive electrode active material of one embodiment of the present invention can decrease pH of the slurry and accordingly can inhibit gelling or insolubilization in some cases, which is preferable.

The thickness of the positive electrode active material layer is, for example, greater than or equal to 10 μm and less than or equal to 200 μm. Alternatively, the thickness is greater than or equal to 50 μm and less than or equal to 150 μm. The carried amount of the positive electrode active material layer in the case where the positive electrode active material contains a material having a layered rock-salt crystal structure containing cobalt, for example, is greater than or equal to 1 mg/cm$^2$ and less than or equal to 50 mg/cm$^2$. Alternatively, the carried amount is greater than or equal to 5 mg/cm$^2$ and less than or equal to 30 mg/cm$^2$. The density of the positive electrode active material layer in the case where the positive electrode active material contains a material having a layered rock-salt crystal structure containing cobalt, for example, is greater than or equal to 2.2 g/cm$^3$ and less than or equal to 4.9 g/cm$^3$. Alternatively, the density is greater than or equal to 3.8 g/cm$^3$ and less than or equal to 4.5 g/cm$^3$.

<Positive Electrode Current Collector>

The positive electrode current collector can be formed using a material that has high conductivity, such as a metal like stainless steel, gold, platinum, aluminum, and titanium, or an alloy thereof. It is preferable that a material used for the positive electrode current collector not dissolve at the potential of the positive electrode. Alternatively, the positive electrode current collector can be formed using an aluminum alloy to which an element that improves heat resistance, such as silicon, titanium, neodymium, scandium, or molybdenum, is added. Still alternatively, a metal element that forms silicide by reacting with silicon may be used. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector used preferably has a thickness of greater than or equal to 5 μm and less than or equal to 30 μm.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element that enables charge-discharge reaction by alloying reaction and dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon, and in particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reaction by alloying reaction and dealloying reaction with lithium and a compound containing the element, for example, may be referred to as an alloy-based material.

In this specification and the like, SiO refers, for example, to silicon monoxide. Alternatively, SiO can be expressed as $SiO_x$. Here, x preferably has an approximate value of 1. For example, x is preferably 0.2 or more and 1.5 or less, further preferably 0.3 or more and 1.2 or less.

As the carbon-based material, graphite, graphitizing carbon (soft carbon), non-graphitizing carbon (hard carbon), carbon nanotube, graphene, carbon black, and the like may be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it is relatively easy to have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into graphite (when a lithium-graphite intercalation compound is formed). For this reason, a lithium-ion secondary battery can have a high operating voltage. In addition, graphite is preferable because of its advantages such as a relatively high capacity per unit volume, relatively small volume expansion, low cost, and higher level of safety than that of a lithium metal.

For the negative electrode active material, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

For the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charging and discharging capacity (900 mAh/g and 1890 mAh/$cm^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

A material which causes conversion reaction can also be used for the negative electrode active material. For example, a transition metal oxide which does not form an alloy with lithium, such as cobalt oxide (CoO), nickel oxide (NiO), or iron oxide (FeO), may be used for the negative electrode active material. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material which is not alloyed with carrier ions such as lithium is preferably used for the negative electrode current collector.

[Electrolyte Solution]

The electrolyte solution contains a solvent and an electrolyte. As the solvent of the electrolyte solution, an aprotic organic solvent is preferable; for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

The use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharging or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains small numbers of dust particles and elements other than the constituent elements of the electrolyte solution (hereinafter, also simply referred to as "impurities"). Specifically, the weight ratio of impurities to the electrolyte solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of a material to be added in the whole solvent is, for example, higher than or equal to 0.1 wt % and lower than or equal to 5 wt %.

A polymer gelled electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. In addition, the formed polymer may have a porous shape.

Instead of the electrolyte solution, a solid electrolyte including an inorganic material such as a sulfide-based inorganic material or an oxide-based inorganic material, or a solid electrolyte including a high-molecular material such as a PEO (polyethylene oxide)-based high-molecular material may be used. In the case where the solid electrolyte is used, a separator and a spacer need not be provided. Furthermore, the battery can be entirely solidified; therefore, there is no possibility of liquid leakage and thus the safety is dramatically increased.

[Separator]

The secondary battery preferably includes a separator. As the separator, for example, paper; nonwoven fabric; glass fiber; ceramics; or synthetic fiber containing nylon (polyamide), vinylon (polyvinyl alcohol-based fiber), polyester, acrylic, polyolefin, or polyurethane can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. As the ceramic-based material, aluminum oxide particles or silicon oxide particles can be used, for example. As of the fluorine-based material, PVDF or polytetrafluoroethylene can be used, for example. As the polyamide-based material, nylon or aramid (meta-based aramid and para-based aramid) can be used, for example.

The separator coated with the ceramic-based material can have higher oxidation resistance and thus can be inhibited from deteriorating in high-voltage charging and discharging, leading to higher reliability of the secondary battery. In addition, the separator coated with the fluorine-based material is easily brought into close contact with an electrode, resulting in high output characteristics. The separator coated with the polyamide-based material, in particular, aramid, can have higher heat resistance, leading to improvement in the safety of the secondary battery.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. An exterior body in the form of a film can also be used. As the film, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

[Charging and Discharging Methods]

The secondary battery can be charged and discharged in the following manner, for example.

<CC Charging>

Figure 12A:
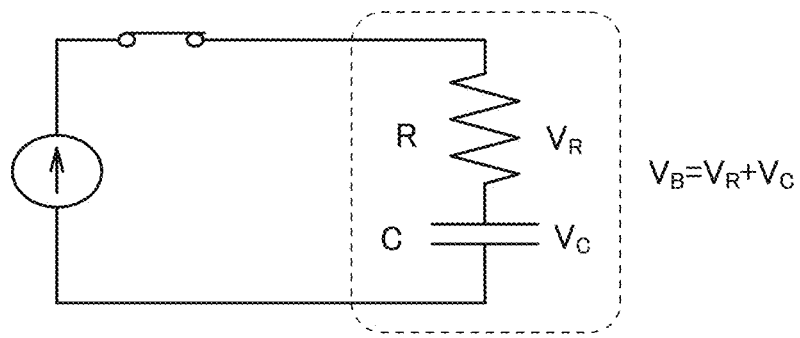
FIG. 12A, FIG. 12B, and FIG. 12C are diagrams showing a charging method of a secondary battery.

First, constant current (CC) charging is described as one of the charging methods. CC charging is a charging method in which a constant current is made to flow to a secondary battery in the whole charging period and charging is stopped when the voltage reaches a predetermined voltage. The secondary battery is assumed to be an equivalent circuit with internal resistance R and secondary battery capacitance C as illustrated in FIG. 12A. In this case, a secondary battery voltage $V_B$ is the sum of a voltage $V_R$ applied to the internal resistance R and a voltage $V_C$ applied to the secondary battery capacitance C.

While the CC charging is performed, a switch is on as illustrated in FIG. 12A, so that a constant current I flows to the secondary battery. During the period, the current I is constant; thus, in accordance with the Ohm's law ($V_R=R \times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 12B:
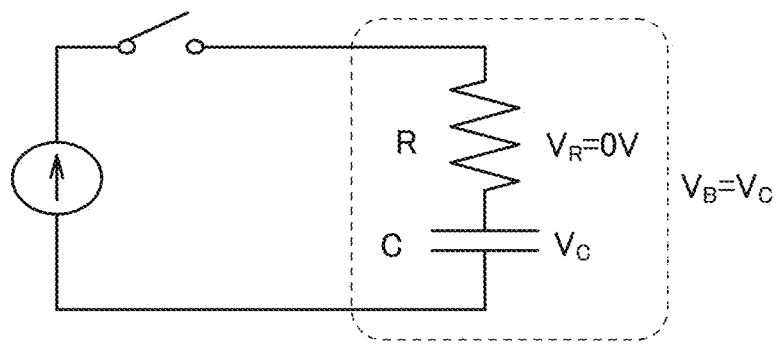

When the secondary battery voltage $V_B$ reaches a predetermined voltage, e.g., 4.3 V, the charging is stopped. When the CC charging is stopped, the switch is turned off as illustrated in FIG. 12B, and the current I becomes 0. Thus, the voltage $V_R$ applied to the internal resistance R becomes 0 V. Consequently, the secondary battery voltage $V_B$ is decreased.

Figure 12C:
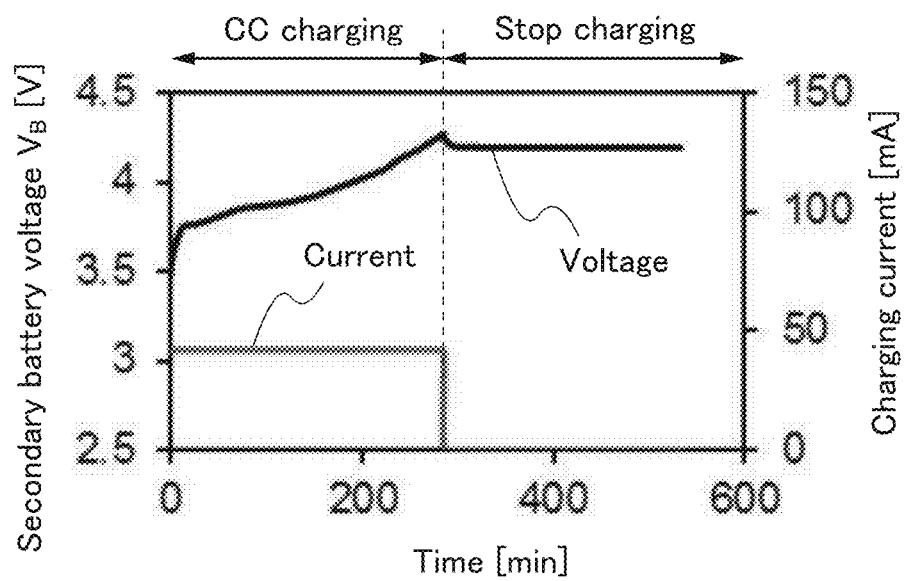

FIG. 12C shows an example of the secondary battery voltage $V_B$ and charging current during a period in which the CC charging is performed and after the CC charging is stopped. The state is shown in which the secondary battery voltage $V_B$, which increases while the CC charging is performed, slightly decreases after the CC charging is stopped.

<CCCV Charging>
Next, constant current constant voltage (CCCV) charging, which is a charging method different from the above method, is described. CCCV charging is a charging method in which CC charging is performed until the voltage reaches a predetermined voltage and then CV (constant voltage) charging is performed until the amount of current flow becomes small, specifically, a termination current value.

Figure 13A:
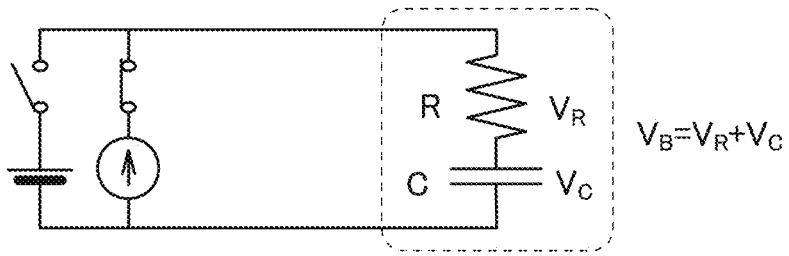
FIG. 13A, FIG. 13B, FIG. 13C, and FIG. 13D are diagrams showing a charging method of a secondary battery.

While the CC charging is performed, a switch of a constant current power source is on and a switch of a constant voltage power source is off as illustrated in FIG. 13A, so that the constant current I flows to the secondary battery. During the period, the current I is constant; thus, in accordance with the Ohm's law ($V_R=R \times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 13B:
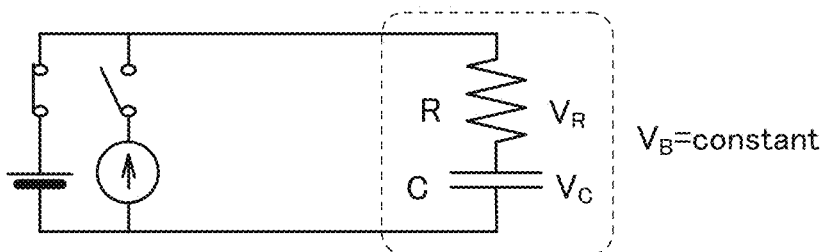

When the secondary battery voltage $V_B$ reaches a predetermined voltage, e.g., 4.3 V, switching is performed from the CC charging to the CV charging. While the CV charging is performed, the switch of the constant voltage power source is on and the switch of the constant current power source is off as illustrated in FIG. 13B; thus, the secondary battery voltage $V_B$ is constant. In contrast, the voltage $V_C$ applied to the secondary battery capacitance C increases over time. Since $V_B=V_R \; V_C$ is satisfied, the voltage $V_R$ applied to the internal resistance R decreases over time. As the voltage $V_R$ applied to the internal resistance R decreases, the current I flowing to the secondary battery also decreases in accordance with the Ohm's law ($V_R=R \times I$).

Figure 13C:
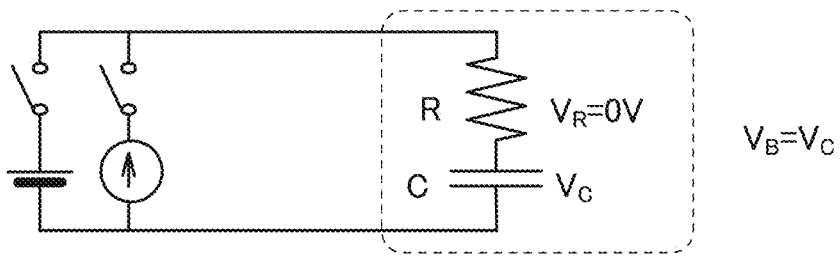

When the current I flowing to the secondary battery reaches a predetermined current, e.g., approximately 0.01 C, charging is stopped. When the CCCV charging is stopped, all the switches are turned off as illustrated in FIG. 13C, so that the current I becomes 0. Thus, the voltage $V_R$ applied to the internal resistance R becomes 0 V. However, the voltage $V_R$ applied to the internal resistance R becomes sufficiently small by the CV charging; thus, even when a voltage drop no longer occurs in the internal resistance R, the secondary battery voltage $V_B$ hardly decreases.

Figure 13D:
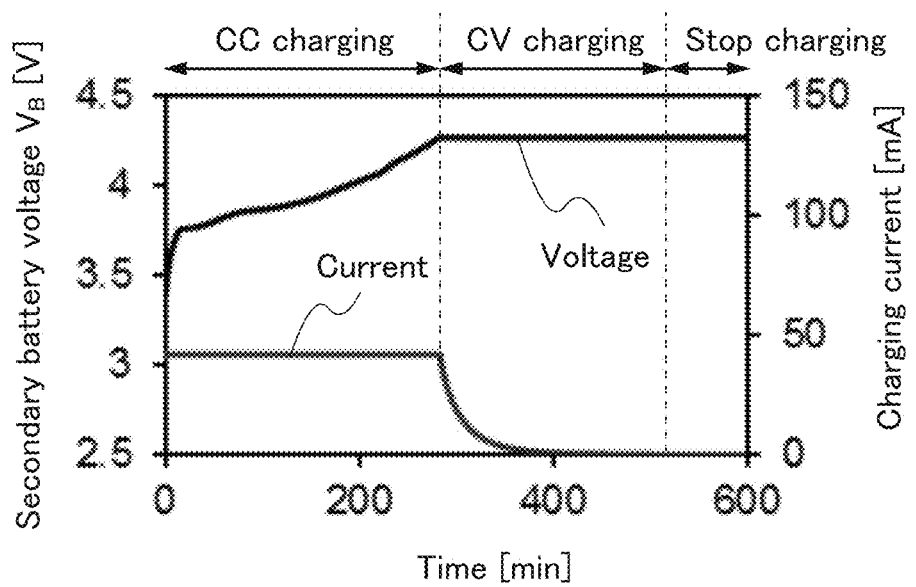

FIG. 13D shows an example of the secondary battery voltage $V_B$ and charging current while the CCCV charging is performed and after the CCCV charging is stopped. The state is shown in which the secondary battery voltage $V_B$ hardly decreases even after the CCCV charging is stopped.

<CC Discharging>
Next, CC discharging, which is one of discharging methods, is described. CC discharging is a discharging method in which a constant current is made to flow from the secondary battery in the whole discharging period, and discharging is stopped when the secondary battery voltage $V_B$ reaches a predetermined voltage, e.g., 2.5 V.

Figure 14:
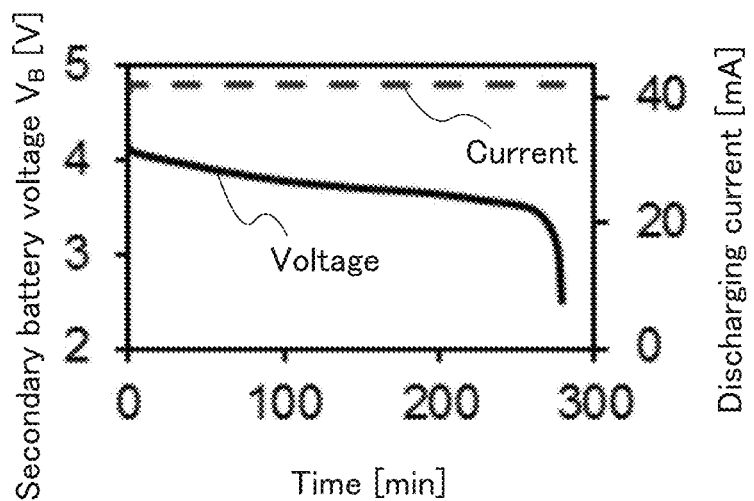
FIG. 14 is a diagram showing a discharging method of a secondary battery.

FIG. 14 shows examples of the secondary battery voltage $V_B$ and discharging current while the CC discharging is performed. As discharging proceeds, the secondary battery voltage $V_B$ decreases.

Next, a discharging rate and a charging rate are described. The discharging rate refers to the relative ratio of discharging current to battery capacity and is expressed in a unit C. A current corresponding to 1 C in a battery with a rated capacity X [Ah] is X [A]. The case where discharging is performed at a current of 2X [A] is rephrased as to perform discharging at 2 C, and the case where discharging is performed at a current of 0.2X [A] is rephrased as to perform discharging at 0.2 C. The same applies to the charging rate; the case where charging is performed at a current of 2X [A] is rephrased as to perform charging at 2 C, and the case where charging is performed at a current of 0.2X [A] is rephrased as to perform charging at 0.2 C.

Embodiment 4

In this embodiment, examples of a shape of a secondary battery containing the positive electrode active material 100 described in the above embodiment are described. For the materials used for the secondary battery described in this embodiment, the description of the above embodiment can be referred to.

Figure 15A:
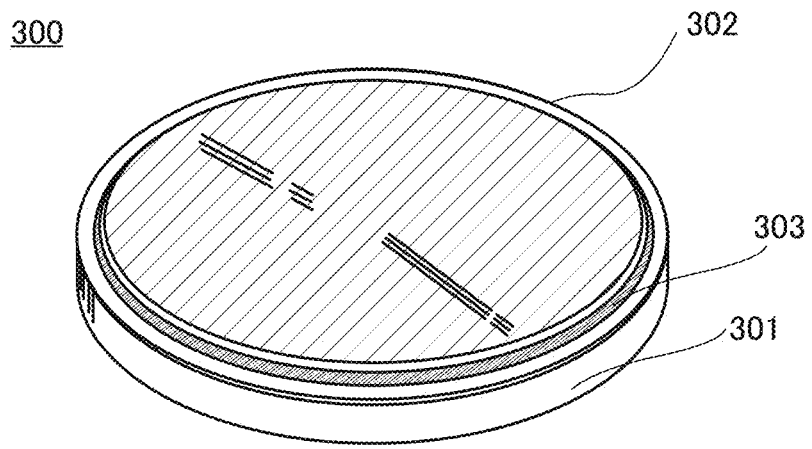
FIG. 15A, FIG. 15B, and FIG. 15C are diagrams showing a coin-type secondary battery.
Figure 15B:
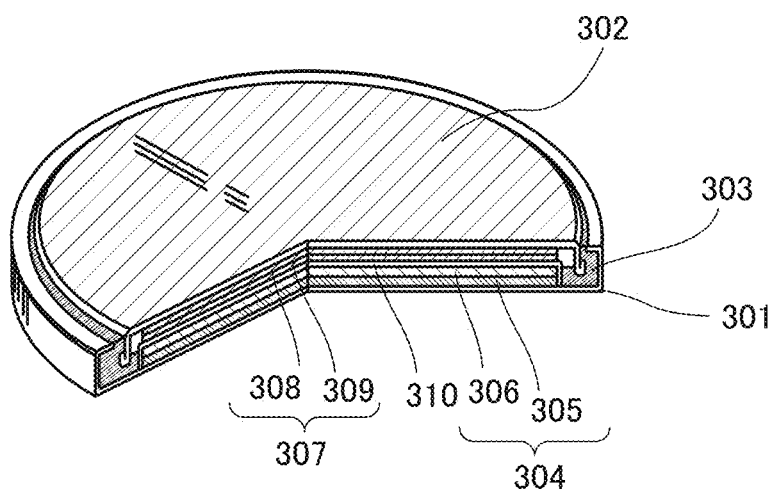

[Coin-Type Secondary Battery]
First, an example of a coin-type secondary battery is described. FIG. 15A is an external view of a coin-type (single-layer flat type) secondary battery, and FIG. 15B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. The positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The coin-type secondary battery 300 is manufactured in the following manner: the negative electrode 307, the positive electrode 304, and a separator 310 are immersed in the electrolyte solution; as illustrated in FIG. 15B, the positive electrode 304, the separator 310, the negative electrode 307, and the negative electrode can 302 are stacked in this order with the positive electrode can 301 positioned at the bottom; and then the positive electrode can 301 and the negative electrode can 302 are subjected to pressure bonding with the gasket 303 located therebetween.

When the positive electrode active material described in the above embodiment is used in the positive electrode 304, the coin-type secondary battery 300 with high capacity and excellent cycle performance can be obtained.

Here, a current flow in charging the secondary battery is described with reference to FIG. 15C. When a secondary battery using lithium is regarded as a closed circuit, lithium ions transfer and a current flows in the same direction. Note that in the secondary battery using lithium, an anode and a cathode change places in charging and discharging, and an oxidation reaction and a reduction reaction occur on the corresponding sides; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charging is performed, discharging is performed, a reverse pulse current is supplied, and a charge current is supplied. The use of terms an "anode" and a "cathode" related to oxidation reaction and reduction reaction might cause confusion because the anode and the cathode interchange in charging and in discharging. Thus, the terms "anode" and "cathode" are not used in this specification. If the term the "anode" or the "cathode" is used, it should be clearly mentioned that the anode or the cathode is which of the one in charging or in discharging and corresponds to which of the positive electrode (plus electrode) or the negative electrode (minus electrode).

Figure 15C:
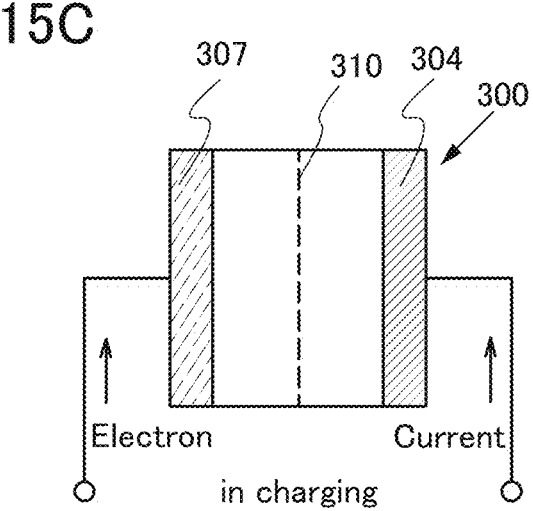

Two terminals illustrated in FIG. 15C are connected to a charger, and the secondary battery 300 is charged. As the charging of the secondary battery 300 proceeds, a potential difference between electrodes increases.

[Cylindrical Secondary Battery]

Figure 16A:
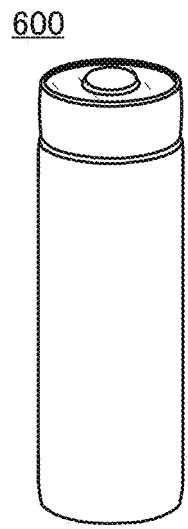
FIG. 16A, FIG. 16B, FIG. 16C, and FIG. 16D are diagrams showing cylindrical secondary batteries.
Figure 16B:
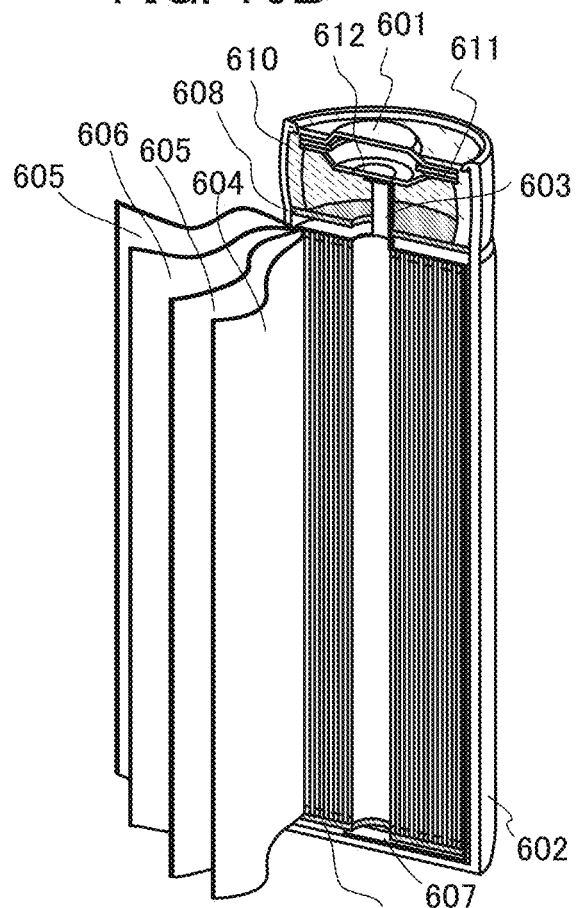

Next, an example of a cylindrical secondary battery is described with reference to FIG. 16. FIG. 16A illustrates an external view of a cylindrical secondary battery 600. FIG. 16B is a diagram schematically illustrating a cross section of the cylindrical secondary battery 600. As illustrated in FIG. 16B, the cylindrical secondary battery 600 includes a positive electrode cap (battery lid) 601 on a top surface and a battery can (outer can) 602 on a side surface and a bottom surface. The positive electrode cap and the battery can (outer can) 602 are insulated from each other by a gasket (insulating packing) 610.

Inside the battery can 602 having a hollow cylindrical shape, a battery element in which a belt-like positive electrode 604 and a belt-like negative electrode 606 are wound with a separator 605 located therebetween is provided. Although not illustrated, the battery element is wound centering around a center pin. One end of the battery can 602 is closed and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is sandwiched between a pair of insulating plates 608 and 609 that face each other. Furthermore, a nonaqueous electrolyte (not illustrated) is injected inside the battery can 602 provided with the battery element. As the nonaqueous electrolyte, a nonaqueous electrolyte that is similar to that for the coin-type secondary battery can be used.

Since a positive electrode and a negative electrode that are used for a cylindrical storage battery are wound, active materials are preferably formed on both surfaces of a current collector. A positive electrode terminal (positive electrode current collector lead) 603 is connected to the positive electrode 604, and a negative electrode terminal (negative electrode current collector lead) 607 is connected to the negative electrode 606. For both the positive electrode terminal 603 and the negative electrode terminal 607, a metal material such as aluminum can be used. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC element (Positive Temperature Coefficient) 611. The safety valve mechanism 612 cuts off electrical connection between the positive electrode cap 601 and the positive electrode 604 when the internal pressure of the battery exceeds a predetermined threshold value. In addition, the PTC element 611 is a thermally sensitive resistor whose resistance increases as temperature rises, and limits the amount of current by increasing the resistance to prevent abnormal heat generation. Barium titanate ($BaTiO_3$)-based semiconductor ceramics or the like can be used for the PTC element.

Figure 16C:
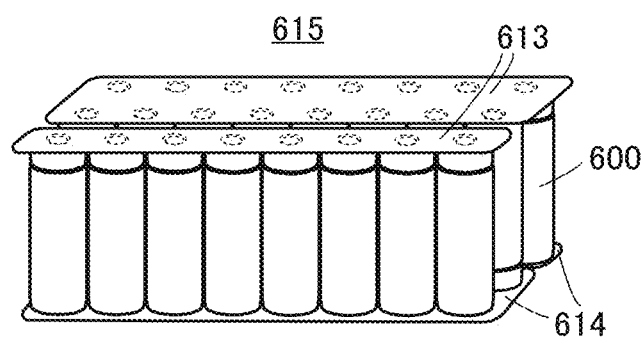

As illustrated in FIG. 16C, a plurality of secondary batteries 600 may be sandwiched between a conductive plate 613 and a conductive plate 614 to form a module 615. The plurality of secondary batteries 600 may be connected in parallel, connected in series, or connected in series after being connected in parallel. By forming the module 615 including the plurality of secondary batteries 600, large power can be extracted.

Figure 16D:
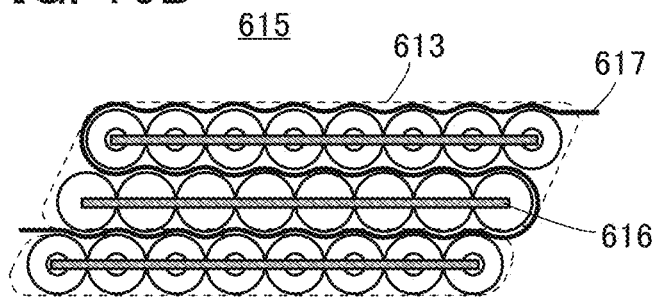

FIG. 16D is a top view of the module 615. The conductive plate 613 is shown by a dotted line for clarity of the drawing. As illustrated in FIG. 16D, the module 615 may include a wiring 616 which electrically connects the plurality of secondary batteries 600 to each other. It is possible to provide the conductive plate over the wiring 616 to overlap with each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

When the positive electrode active material described in the above embodiment is used in the positive electrode 604, the cylindrical secondary battery 600 with high capacity and excellent cycle performance can be obtained.

[Structure Examples of Secondary Battery]

Other structure examples of secondary batteries are described using FIG. 17 to FIG. 21.

Figure 17A:
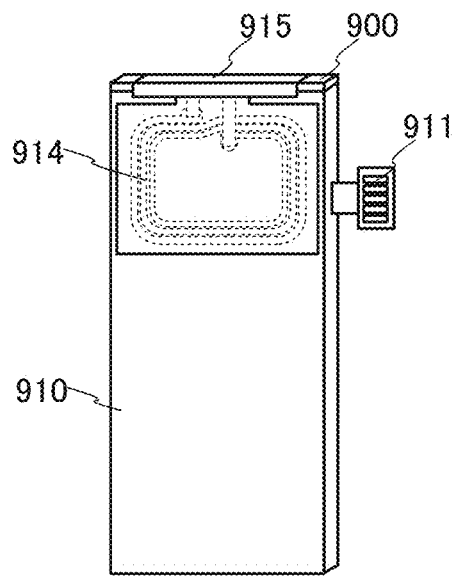
FIG. 17A and FIG. 17B are diagrams showing an example of a secondary battery.
Figure 17B:
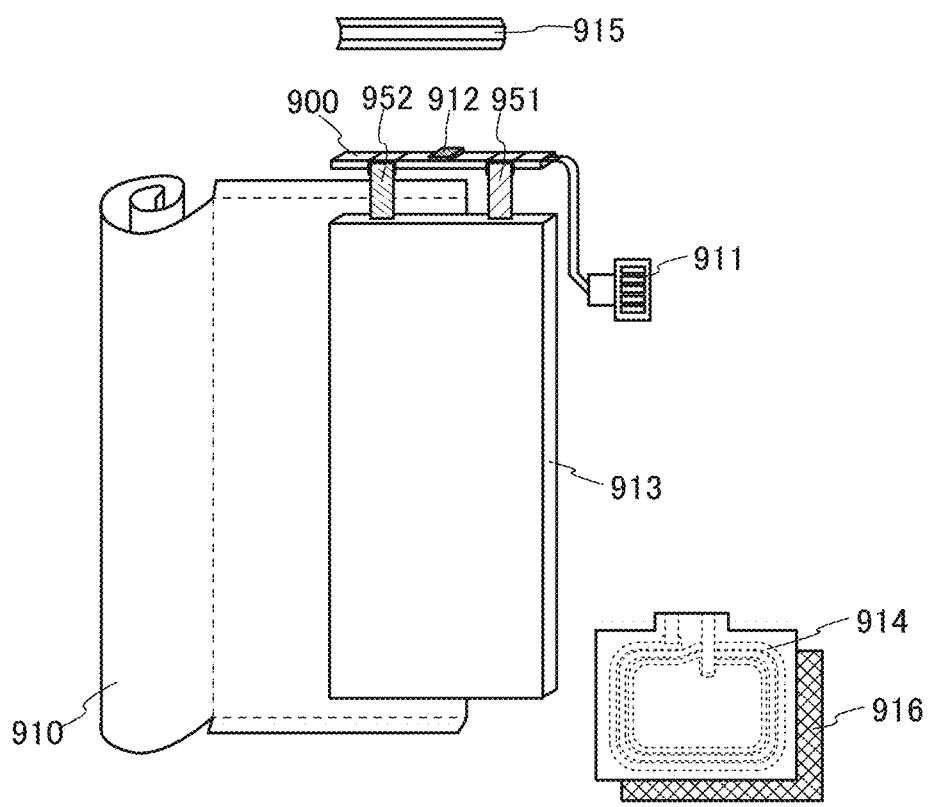

FIG. 17A and FIG. 17B are external views of a battery pack. A secondary battery 913 is connected to an antenna 914 through a circuit board 900. A label 910 is attached to the secondary battery 913. The circuit board 900 is fixed to the label 910 with a seal 915. Moreover, as illustrated in FIG. 17B, the secondary battery 913 is connected to a terminal 951 and a terminal 952.

The circuit board 900 includes a terminal 911 and a circuit 912. The terminal 911 is connected to the terminal 951, the terminal 952, the antenna 914, and the circuit 912. Note that a plurality of terminals 911 serving as a control signal input terminal, a power supply terminal, and the like may be provided.

The circuit 912 may be provided on the rear surface of the circuit board 900. Note that the shape of the antenna 914 is not limited to a coil shape and may be a linear shape or a plate shape. An antenna such as a planar antenna, an aperture antenna, a traveling-wave antenna, an EH antenna, a magnetic-field antenna, or a dielectric antenna may be used. Alternatively, the antenna 914 may be a flat-plate conductor. This flat-plate conductor can serve as one of conductors for electric field coupling. That is, the antenna 914 can serve as one of two conductors of a capacitor. Thus, electric power can be transmitted and received not only by an electromagnetic field or a magnetic field but also by an electric field.

The battery pack includes a layer 916 between the antenna 914 and the secondary battery 913. The layer 916 has a function of preventing an influence on an electromagnetic field by the secondary battery 913, for example. As the layer 916, for example, a magnetic body can be used.

Note that the structure of the battery pack is not limited to that illustrated in FIG. 17.

For example, as illustrated in FIG. 18A1 and FIG. 18A2, an antenna may be provided for each of a pair of opposite surfaces of the secondary battery 913 illustrated in FIG. 17A and FIG. 17B. FIG. 18A1 is an external view illustrating one of the pair of surfaces, and FIG. 18A2 is an external view seen illustrating the other of the pair of surfaces. Note that for portions similar to those in FIG. 17A and FIG. 17B, the description of the secondary battery illustrated in FIG. 17A and FIG. 17B can be appropriately referred to.

As illustrated in FIG. 18A1, the antenna 914 is provided on one of the pair of surfaces of the secondary battery 913 with the layer 916 located therebetween, and as illustrated in FIG. 18A2, an antenna 918 is provided on the other of the pair of surfaces of the secondary battery 913 with a layer 917 located therebetween. The layer 917 has a function of blocking an electromagnetic field by the secondary battery 913, for example. As the layer 917, for example, a magnetic body can be used.

With the above structure, both of the antenna 914 and the antenna 918 can be increased in size. The antenna 918 has a function of communicating data with an external device, for example. An antenna with a shape that can be applied to the antenna 914, for example, can be used as the antenna 918. As a system for communication using the antenna 918 between the secondary battery and another device, a response method that can be used between the secondary battery and another device, such as near field communication (NFC), can be employed.

Alternatively, as illustrated in FIG. 18B1, the secondary battery 913 illustrated in FIG. 17A and FIG. 17B may be provided with a display device 920. The display device 920 is electrically connected to the terminal 911. Note that the label 910 is not necessarily provided in a portion where the display device 920 is provided. Note that for portions similar to those in FIG. 17A and FIG. 17B, the description of the secondary battery illustrated in FIG. 17A and FIG. 17B can be appropriately referred to.

The display device 920 can display, for example, an image showing whether or not charging is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Alternatively, as illustrated in FIG. 18B2, the secondary battery 913 illustrated in FIG. 17A and FIG. 17B may be provided with a sensor 921. The sensor 921 is electrically connected to the terminal 911 via a terminal 922. Note that for portions similar to those in FIG. 17A and FIG. 17B, the description of the secondary battery illustrated in FIG. 17A and FIG. 17B can be appropriately referred to.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With provision of the sensor 921, for example, data on an environment where the secondary battery is placed (e.g., temperature or the like) can be detected and stored in a memory inside the circuit 912.

Figure 19A:
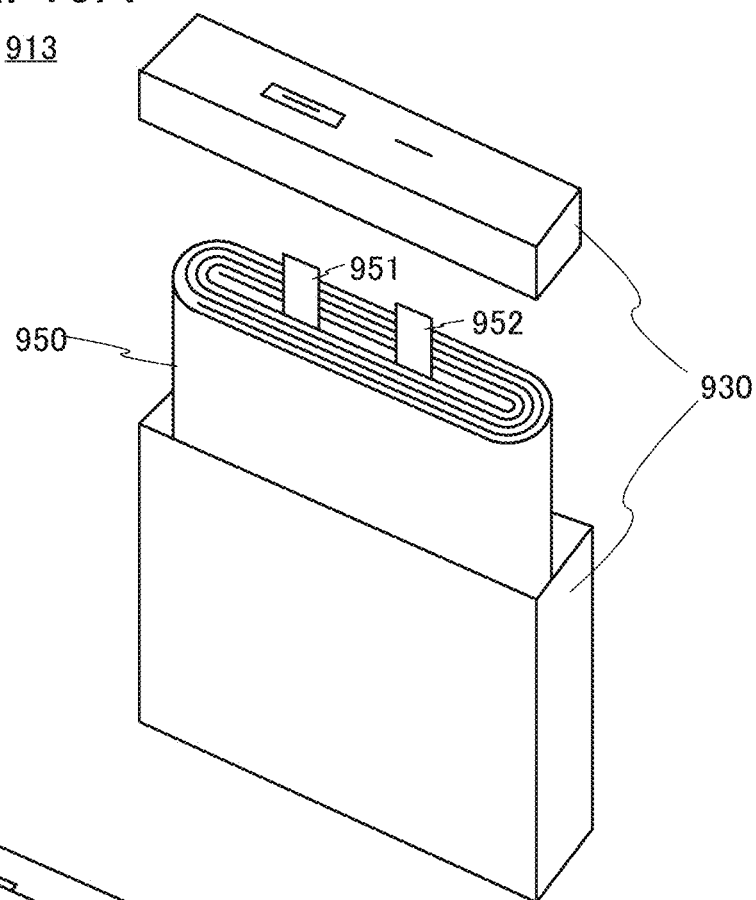
FIG. 19A and FIG. 19B are diagrams each showing an example of a secondary battery.
Figure 19B:
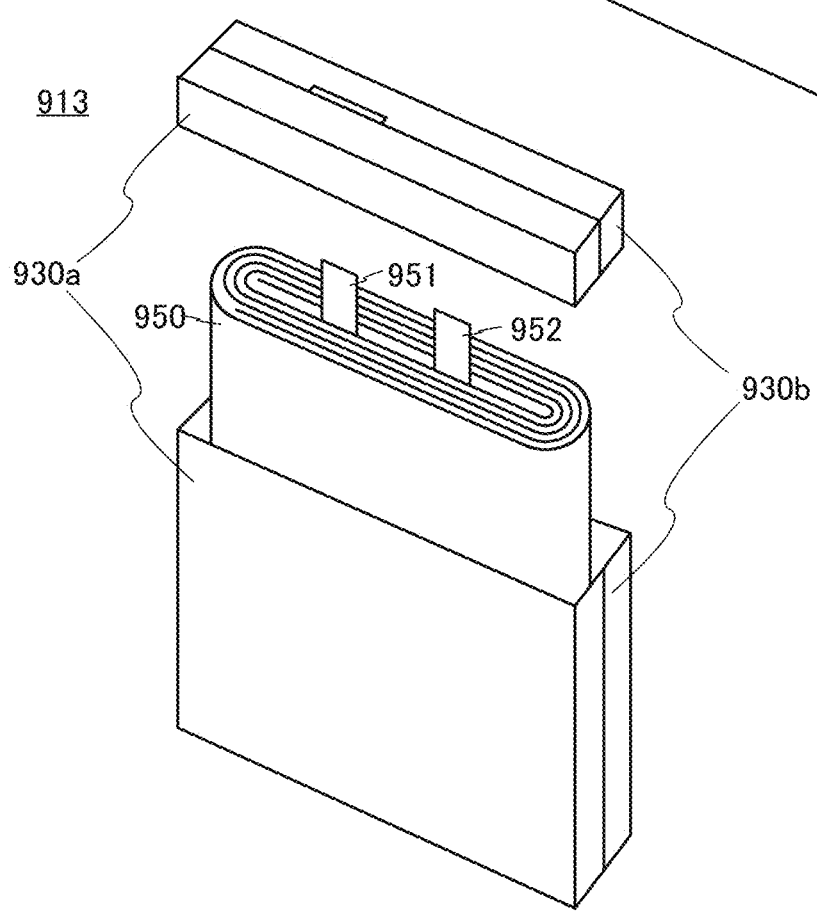
Figure 20:
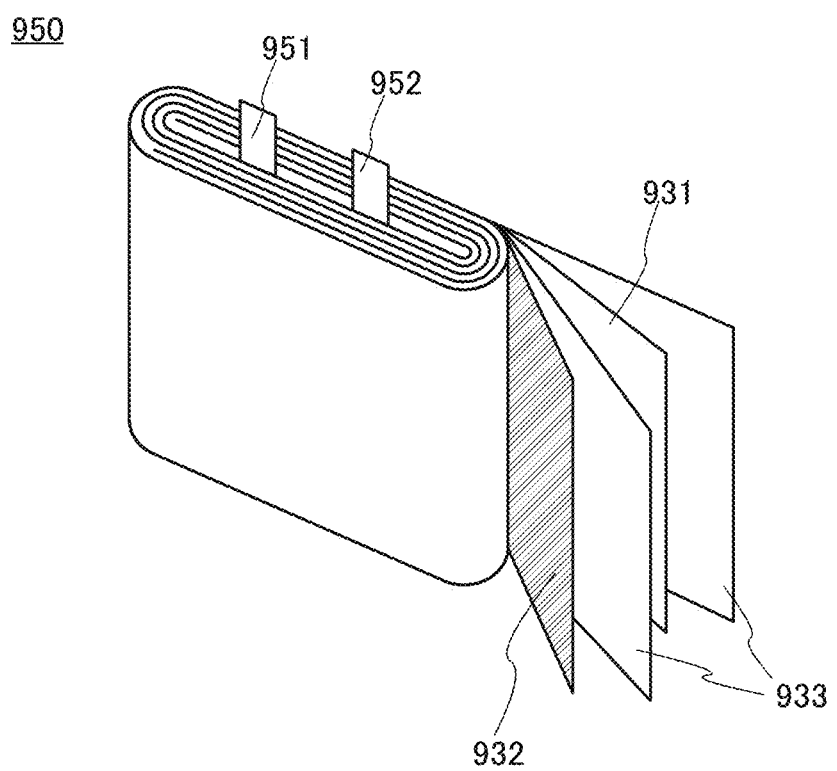
FIG. 20 is a diagram showing an example of a secondary battery.

Furthermore, structure examples of the secondary battery 913 is described using FIG. 19 and FIG. 20.

The secondary battery 913 illustrated in FIG. 19A includes a wound body 950 provided with the terminal 951 and the terminal 952 inside a housing 930. The wound body 950 is immersed in an electrolyte solution inside the housing 930. The terminal 952 is in contact with the housing 930, and the use of an insulator or the like inhibits contact between the terminal 951 and the housing 930. Note that for convenience, FIG. 19A illustrates the housing 930 divided into pieces; however, in reality, the wound body 950 is covered with the housing 930 and the terminal 951 and the terminal 952 extend to the outside of the housing 930. For the housing 930, a metal material (e.g., aluminum) or a resin material can be used.

Note that as illustrated in FIG. 19B, the housing 930 illustrated in FIG. 19A may be formed using a plurality of materials. For example, in the secondary battery 913 illustrated in FIG. 19B, a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna such as the antenna 914 may be provided inside the housing 930a. For the housing 930b, a metal material can be used, for example.

In addition, FIG. 20 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 sandwiched therebetween. Note that a plurality of stacks each including the negative electrode 931, the positive electrode 932, and the separator 933 may be stacked.

The negative electrode 931 is connected to the terminal 911 illustrated in FIG. 17 via one of the terminal 951 and the terminal 952. The positive electrode 932 is connected to the terminal 911 illustrated in FIG. 17 via the other of the terminal 951 and the terminal 952.

When the positive electrode active material described in the above embodiment is used in the positive electrode 932, the secondary battery 913 with high capacity and excellent cycle performance can be obtained.

[Laminated Secondary Battery]

Next, examples of a laminated secondary battery are described with reference to FIG. 21 to FIG. 27. When the laminated secondary battery has flexibility and is incorporated in an electronic device that has a flexible portion at least partly, the secondary battery can be bent along the deformed electronic device.

Figure 21A:
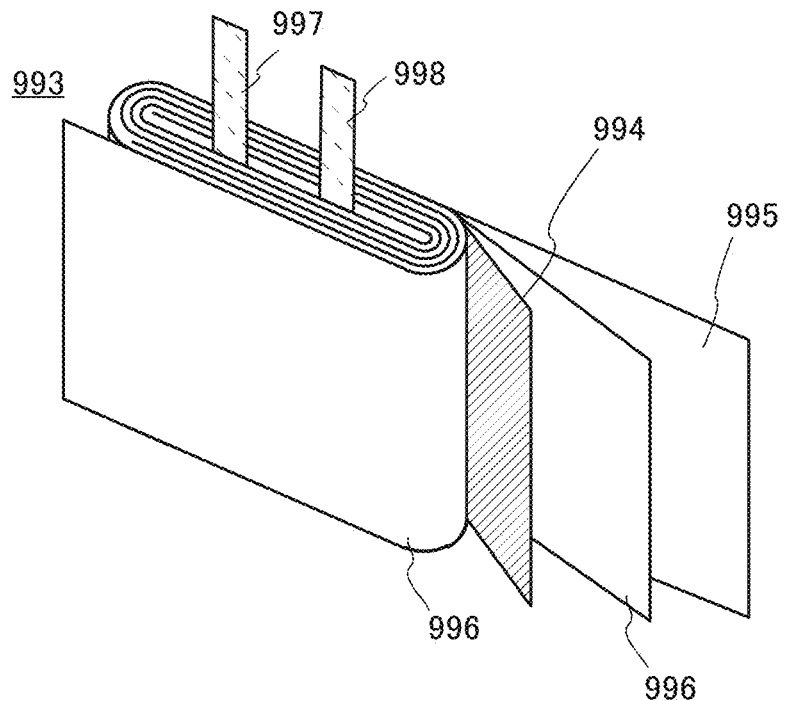
FIG. 21A, FIG. 21B, and FIG. 21C are diagrams showing a laminated secondary battery.

A laminated secondary battery 980 is described using FIG. 21. The laminated secondary battery 980 includes a wound body 993 illustrated in FIG. 21A. The wound body 993 includes a negative electrode 994, a positive electrode 995, and separators 996. Like the wound body 950 illustrated in FIG. 20, the wound body 993 is obtained by winding a sheet of a stack in which the negative electrode 994 overlaps with the positive electrode 995 with the separator 996 sandwiched therebetween.

Note that the number of stacked layers including the negative electrode 994, the positive electrode 995, and the separator 996 may be designed as appropriate depending on required capacity and element volume. The negative electrode 994 is connected to a negative electrode current collector (not illustrated) via one of a lead electrode 997 and a lead electrode 998, and the positive electrode 995 is connected to a positive electrode current collector (not illustrated) via the other of the lead electrode 997 and the lead electrode 998.

Figure 21B:
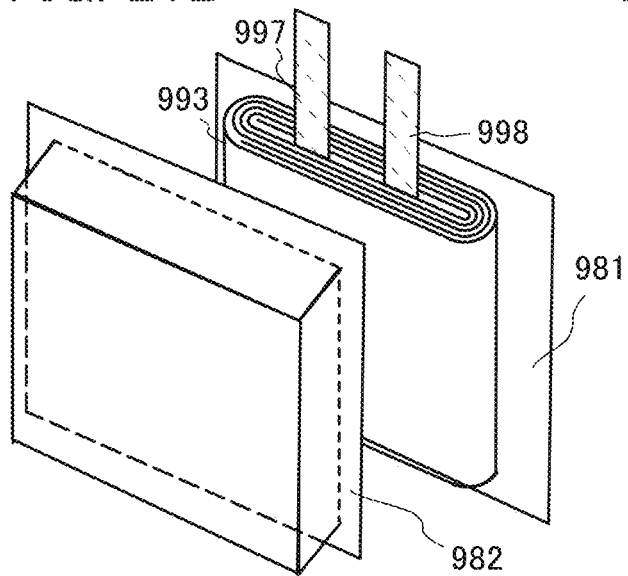
Figure 21C:
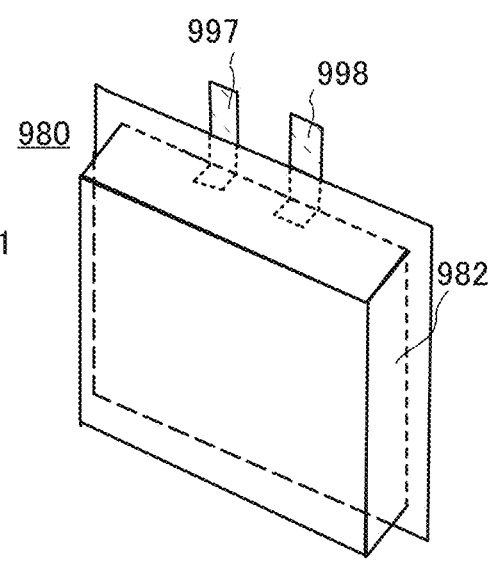

As illustrated in FIG. 21B, the wound body 993 is packed in a space formed by bonding a film 981 and a film 982 having a depressed portion that serve as exterior bodies by thermocompression bonding or the like, whereby the secondary battery 980 illustrated in FIG. 21C can be fabricated. The wound body 993 includes the lead electrode 997 and the lead electrode 998, and is immersed in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIG. 21B and FIG. 21C illustrate an example of using two films, a space may be formed by bending one film and the wound body 993 may be packed in the space.

When the positive electrode active material described in the above embodiment is used in the positive electrode 995, the secondary battery 980 with high capacity and excellent cycle performance can be obtained.

FIG. 21 illustrates an example in which the secondary battery 980 includes a wound body in a space formed by films serving as exterior bodies; however, as illustrated in FIG. 22, for example, a secondary battery may include a plurality of strip-shaped positive electrodes, separators, and negative electrodes in a space formed by films serving as exterior bodies.

Figure 22A:
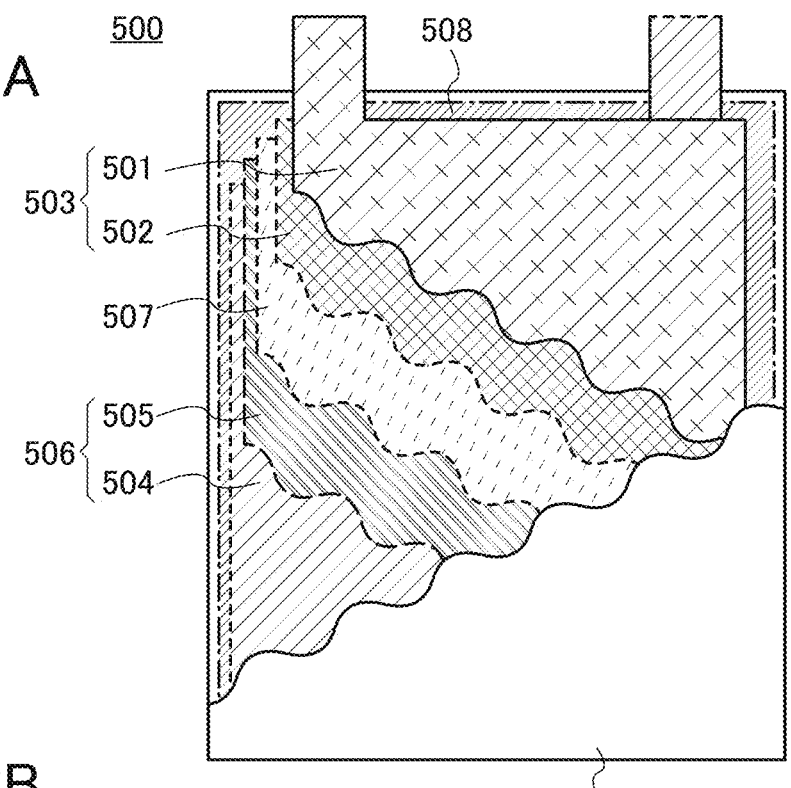
FIG. 22A and FIG. 22B are diagrams showing a laminated secondary battery.

A laminated secondary battery 500 illustrated in FIG. 22A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 that are provided in the exterior body 509. The exterior body 509 is filled with the electrolyte solution 508. The electrolyte solution described in Embodiment 2 can be used as the electrolyte solution 508.

In the laminated secondary battery 500 illustrated in FIG. 22A, the positive electrode current collector 501 and the negative electrode current collector 504 also serve as terminals for electrical contact with the outside. For this reason, the positive electrode current collector 501 and the negative electrode current collector 504 may be arranged so that parts of the positive electrode current collector 501 and the negative electrode current collector 504 are exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

Figure 22B:
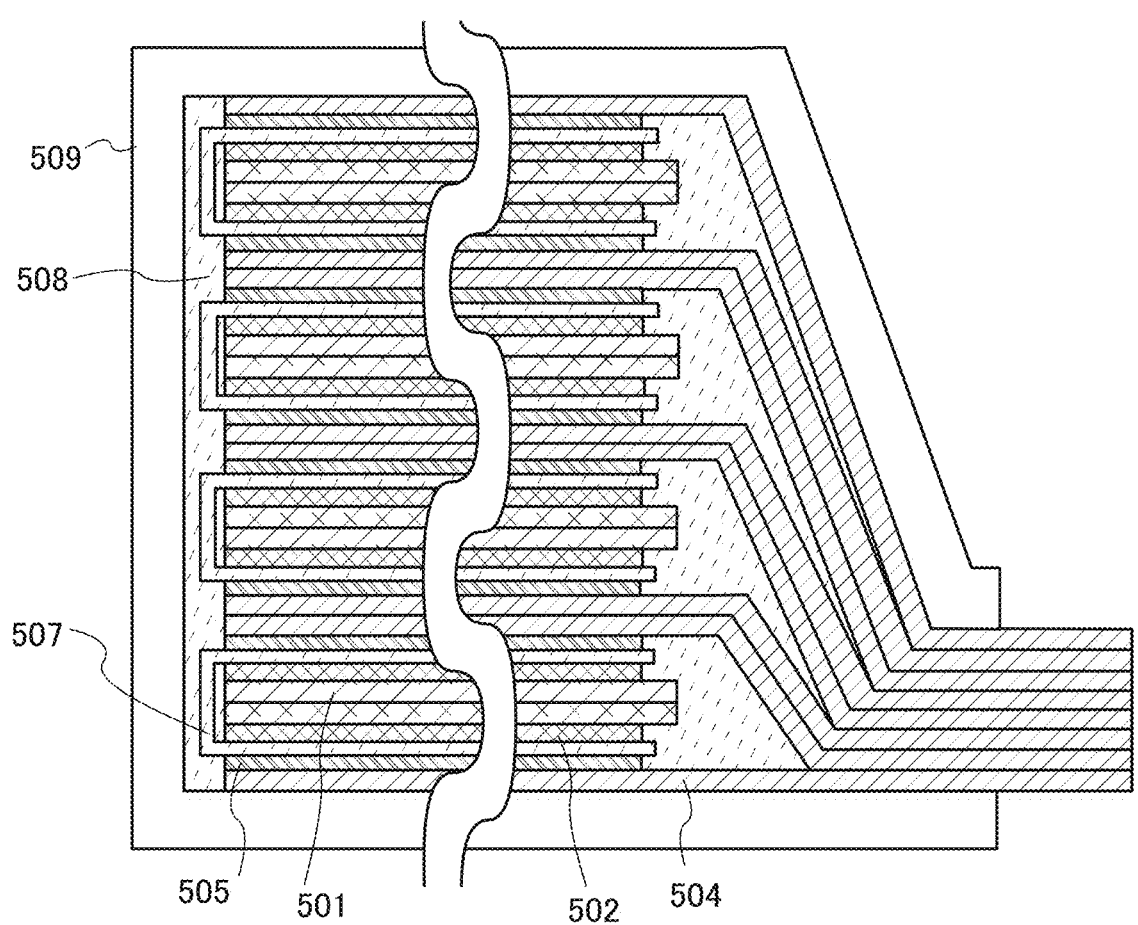

FIG. 22B illustrates an example of a cross-sectional structure of the laminated secondary battery 500. FIG. 22A illustrates an example in which only two current collectors are included for simplicity, but actually, a plurality of electrode layers are included as illustrated in FIG. 22B.

In FIG. 22B, the number of electrode layers is 16, for example. Note that the laminated secondary battery 500 has flexibility even though including 16 electrode layers. FIG. 22B illustrates a structure including 8 layers of negative electrode current collectors 504 and 8 layers of positive electrode current collectors 501, i.e., 16 layers in total. Note that FIG. 22B illustrates a cross section of the lead portion of the negative electrode, and the 8 layers of the negative electrode current collectors 504 are bonded to each other by ultrasonic welding. It is needless to say that the number of electrode layers is not limited to 16, and may be more than 16 or less than 16. In the case of a large number of electrode layers, the secondary battery can have higher capacity. In the case of a small number of electrode layers, the secondary battery can have smaller thickness and high flexibility.

Figure 23:
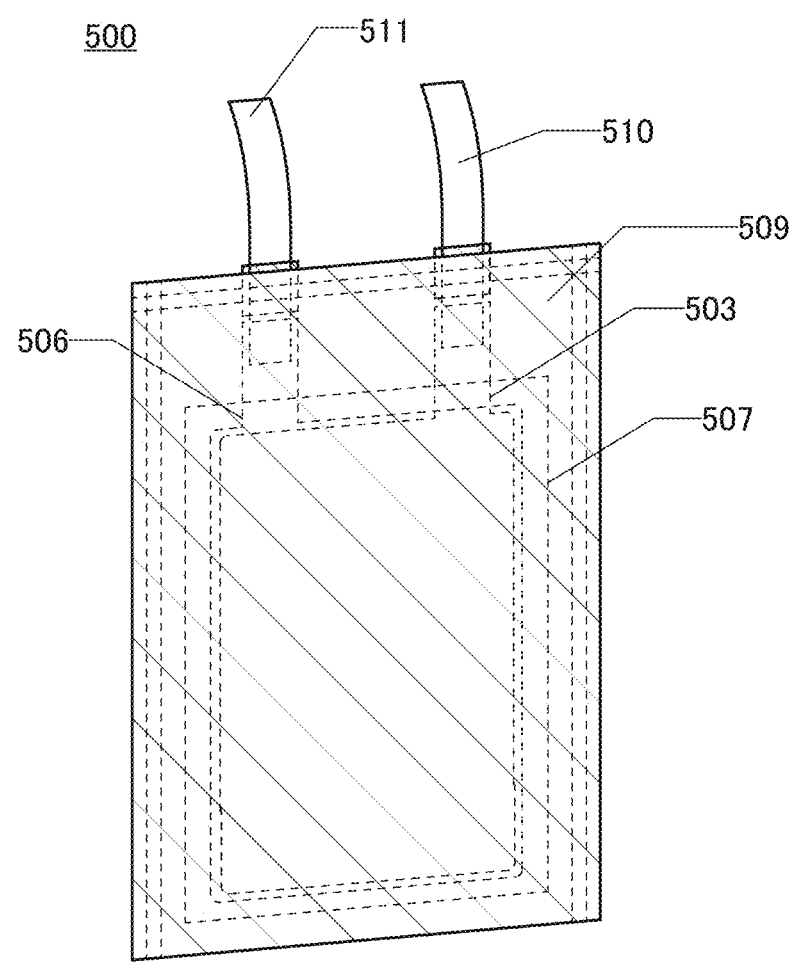
FIG. 23 is a diagram showing an external appearance of a secondary battery.
Figure 24:
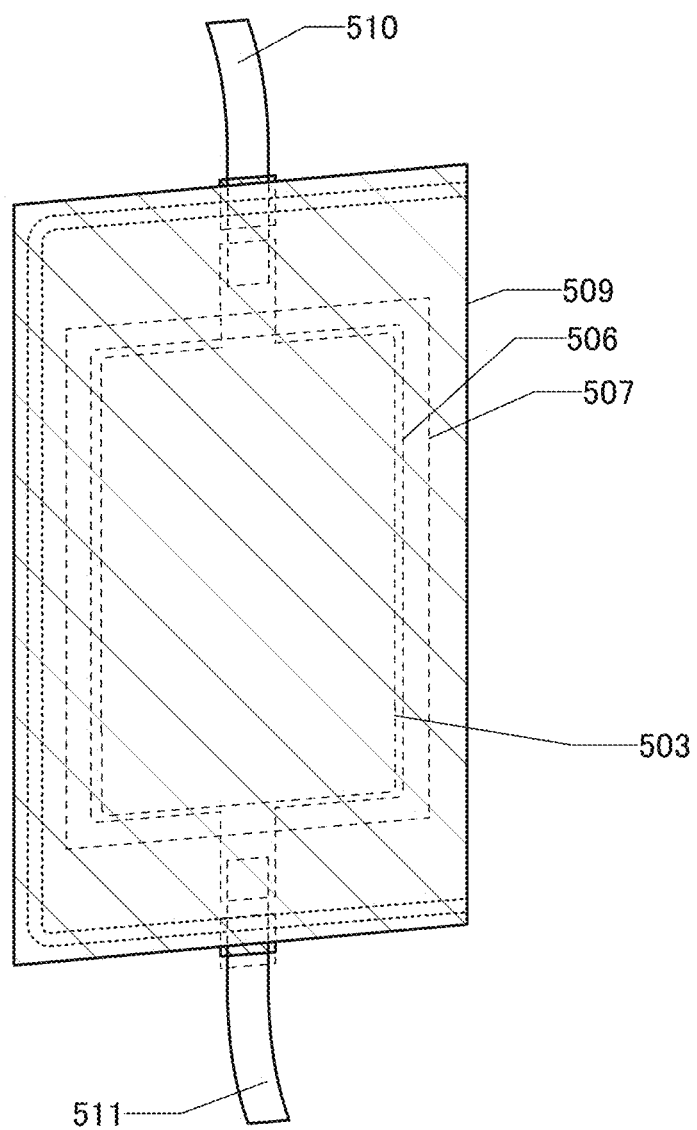
FIG. 24 is a diagram showing an external appearance of a secondary battery.

FIG. 23 and FIG. 24 each illustrate an example of the external view of the laminated secondary battery 500. In FIG. 23 and FIG. 24, the laminated secondary battery 500 includes the positive electrode 503, the negative electrode 506, the separator 507, the exterior body 509, a positive electrode lead electrode 510, and a negative electrode lead electrode 511.

Figure 25A:
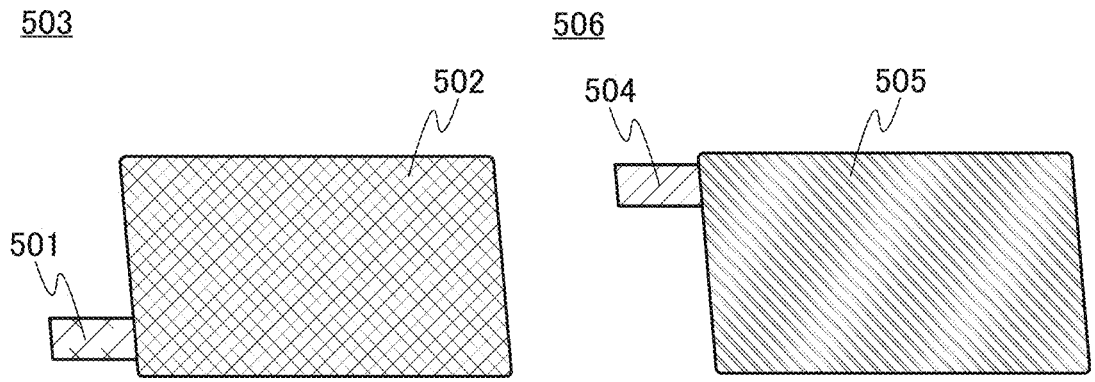
FIG. 25A, FIG. 25B, and FIG. 25C are diagrams showing a manufacturing method of a secondary battery.

FIG. 25A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to the examples illustrated in FIG. 25A.

[Method for Manufacturing Laminated Secondary Battery]

Figure 25B:
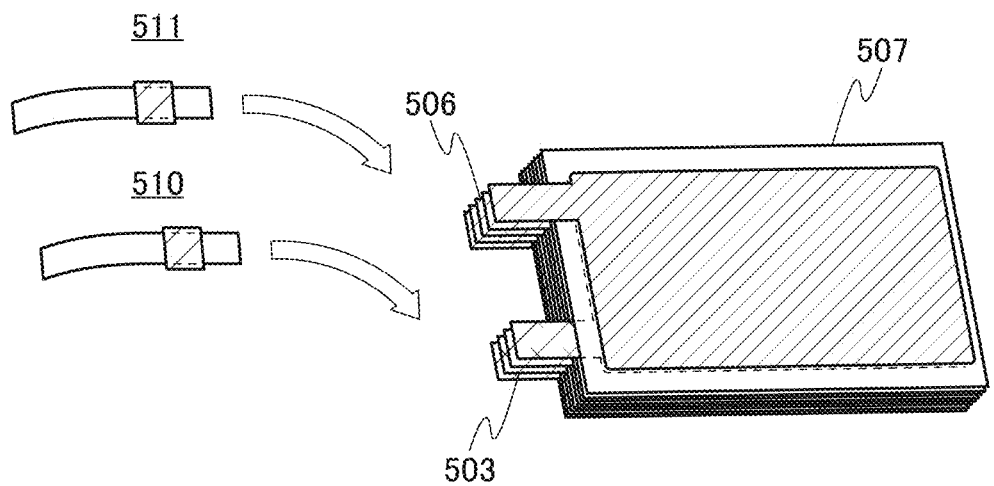
Figure 25C:
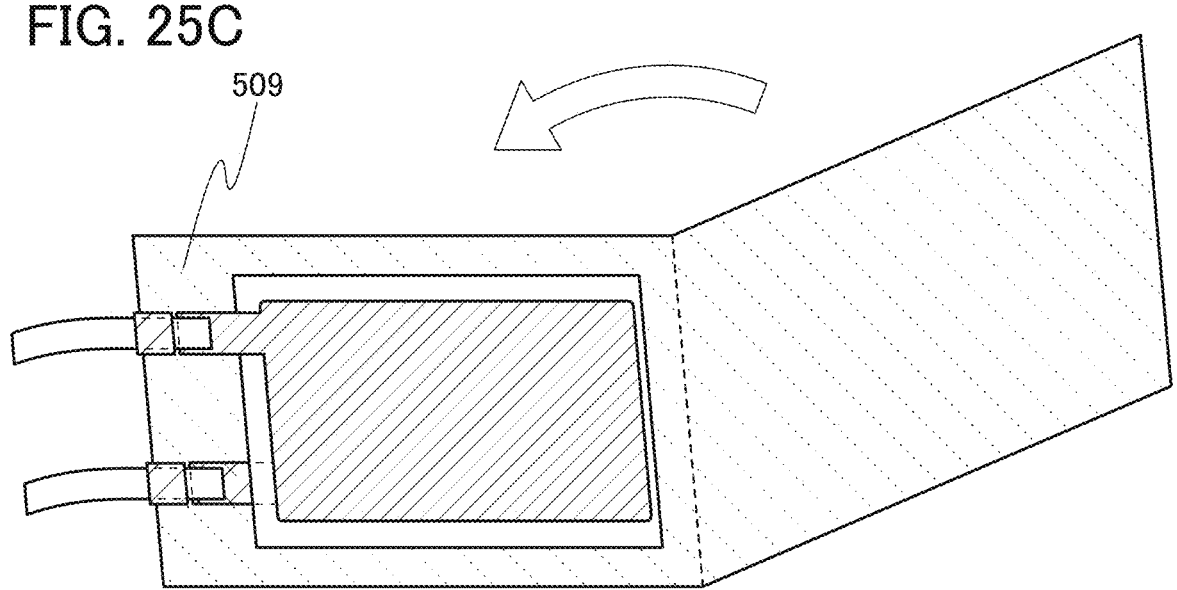

Here, an example of a method for manufacturing the laminated secondary battery whose external view is illustrated in FIG. 23 is described using FIG. 25B and FIG. 25C.

First, the negative electrode 506, the separator 507, and the positive electrode 503 are stacked. FIG. 25B illustrates the stack of the negative electrode 506, the separator 507, and the positive electrode 503. An example of using five sets of negative electrodes and four sets of positive electrodes is described here. Next, the tab regions of the positive electrodes 503 are bonded to each other, and the tab region of the positive electrode on the outermost surface and the positive electrode lead electrode 510 are bonded to each other. For the bonding, ultrasonic welding can be used, for example. In a similar manner, the tab regions of the negative electrodes 506 are bonded to each other, and the tab region of the negative electrode on the outermost surface and the negative electrode lead electrode 511 are bonded to each other.

After that, the negative electrode 506, the separator 507, and the positive electrode 503 are placed over the exterior body 509.

Subsequently, the exterior body 509 is folded along a portion shown by a dashed line, as illustrated in FIG. 25C. Then, the outer portions of the exterior body 509 are bonded. For the bonding, thermocompression can be used, for example. At this time, an unbonded region (hereinafter referred to as an inlet) is provided for part (or one side) of the exterior body 509 so that the electrolyte solution 508 can be introduced later.

Next, the electrolyte solution 508 (not illustrated) is introduced into the exterior body 509 through the inlet provided for the exterior body 509. The electrolyte solution 508 is preferably introduced in a reduced pressure atmosphere or in an inert gas atmosphere. Lastly, the inlet is bonded. In the above manner, the laminated secondary battery 500 can be manufactured.

When the positive electrode active material described in the above embodiment is used in the positive electrode 503, the secondary battery 500 with high capacity and excellent cycle performance can be obtained.

[Bendable Secondary Battery]

Next, an example of a bendable secondary battery is described with reference to FIG. 26 and FIG. 27.

FIG. 26A is a schematic top view of a bendable secondary battery 250. FIG. 26B1, FIG. 26B2, and FIG. 26C are schematic cross-sectional views respectively taken along the cutting line C1-C2, the cutting line C3-C4, and the cutting line A1-A2 in FIG. 26A. The secondary battery 250 includes an exterior body 251 and an electrode stack 210 held in the exterior body 251. The electrode stack 210 has a structure in which at least a positive electrode 211a and a negative electrode 211b are stacked. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 27A:
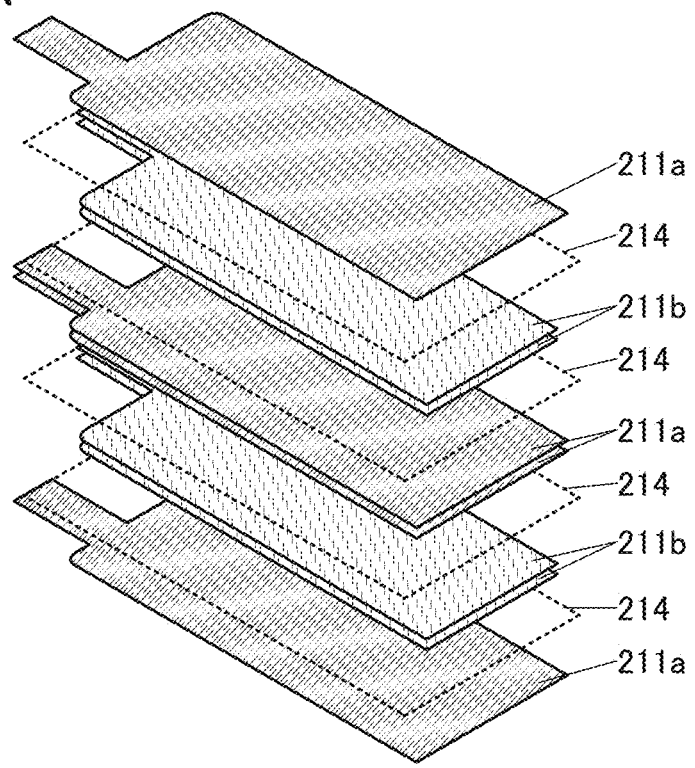
FIG. 27A and FIG. 27B are diagrams showing a bendable secondary battery.
Figure 27B:
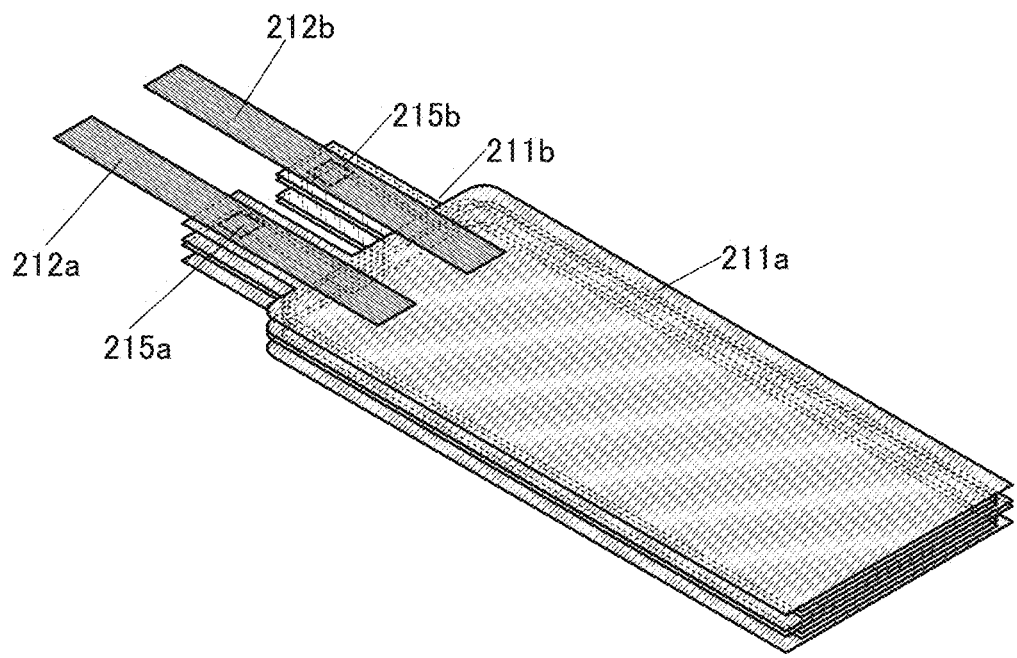

The positive electrode 211a and the negative electrode 211b that are included in the secondary battery 250 are described using FIG. 27. FIG. 27A is a perspective view illustrating the stacking order of the positive electrode 211a, the negative electrode 211b, and a separator 214. FIG. 27B is a perspective view illustrating the lead 212a and the lead 212b in addition to the positive electrode 211a and the negative electrode 211b.

As illustrated in FIG. 27A, the secondary battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab portion. A positive electrode active material layer is formed on one surface of the positive electrode 211a other than the tab portion, and a negative electrode active material layer is formed on one surface of the negative electrode 211b other than the tab portion.

The positive electrodes 211a and the negative electrodes 211b are stacked so that surfaces of the positive electrodes 211a on each of which the positive electrode active material layer is not formed are in contact with each other and that surfaces of the negative electrodes 211b on each of which the negative electrode active material is not formed are in contact with each other.

Furthermore, the separator 214 is provided between the surface of the positive electrode 211a on which the positive electrode active material is formed and the surface of the negative electrode 211b on which the negative electrode active material is formed. In FIG. 27, the separator 214 is shown by a dotted line for clarity.

As illustrated in FIG. 27B, the plurality of positive electrodes 211a are electrically connected to the lead 212a in a bonding portion 215a. In addition, the plurality of negative electrodes 211b are electrically connected to the lead 212b in a bonding portion 215b.

Next, the exterior body 251 is described using FIG. 26B1, FIG. 26B2, FIG. 26C, and FIG. 26D.

The exterior body 251 has a film-like shape and is folded in half so as to sandwich the positive electrodes 211a and the negative electrodes 211b. The exterior body 251 includes a folded portion 261, a pair of seal portions 262, and a seal portion 263. The pair of seal portions 262 is provided with the positive electrodes 211a and the negative electrodes 211b sandwiched therebetween and thus can also be referred to as side seals. In addition, the seal portion 263 includes portions overlapping with the lead 212a and the lead 212b and can also be referred to as a top seal.

Portions of the exterior body 251 that overlap with the positive electrodes 211a and the negative electrodes 211b preferably have a wave shape in which crest lines 271 and trough lines 272 are alternately arranged. In addition, the seal portions 262 and the seal portion 263 of the exterior body 251 are preferably flat.

FIG. 26B1 is a cross section cut along a portion overlapping with the crest line 271, and FIG. 25B2 is a cross section cut along a portion overlapping with the trough line 272. FIG. 26B1 and FIG. 26B2 correspond to cross sections of the secondary battery 250, the positive electrodes 211a, and the negative electrodes 211b in the width direction.

Here, the distance between the seal portion 262 and end portions of the positive electrode 211a and the negative electrode 211b in the width direction, that is, the end portions of the positive electrode 211a and the negative electrode 211b, is referred to as a distance La. When the secondary battery 250 changes in shape, for example, is bent, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard, so that the exterior body 251 is damaged in some cases. In particular, when a metal film of the exterior body 251 is exposed, the metal film might be corroded by the electrolyte solution. Therefore, the distance La is preferably set as long as possible. However, if the distance La is too long, the volume of the secondary battery 250 is increased.

The distance La between the seal portion 262 and the positive electrodes 211a and the negative electrodes 211b is preferably increased as the total thickness of the stacked positive electrodes 211a and negative electrodes 211b is increased.

More specifically, when the total thickness of the stacked positive electrodes 211a, negative electrodes 211b, and separators 214 (not illustrated) is referred to as a thickness t, the distance La is preferably 0.8 times or more and 3.0 times or less, further preferably 0.9 times or more and 2.5 times or less, and still further preferably 1.0 times or more and 2.0 times or less as large as the thickness t. When the distance La is in the above range, a compact battery that is highly reliable for bending can be obtained.

When the distance between the pair of seal portions 262 is referred to as a distance Lb, it is preferable that the distance Lb be sufficiently longer than the widths of the positive electrode 211a and the negative electrode 211b (here, a width Wb of the negative electrode 211b). Thus, even if the positive electrode 211a and the negative electrode 211b come into contact with the exterior body 251 due to a change in shape such as repeated bending of the secondary battery 250, parts of the positive electrode 211a and the negative electrode 211b can be shifted in the width direction; thus, the positive electrode 211a and the negative electrode 211b can be effectively prevented from being rubbed against the exterior body 251.

For example, the difference between the distance Lb, which is the distance between the pair of seal portions 262, and the width Wb of the negative electrode 211b is preferably 1.6 times or more and 6.0 times or less, further preferably 1.8 times or more and 5.0 times or less, and still further preferably 2.0 times or more and 4.0 times or less as large as the thickness t of the positive electrode 211a and the negative electrode 211b.

In other words, the distance Lb, the width Wb, and the thickness t preferably satisfy the relationship of Formula 1 below.

[Formula 1]

$$\frac{Lb - Wb}{2t} \geq a \quad (1)$$

Here, a satisfies 0.8 or more and 3.0 or less, preferably 0.9 or more and 2.5 or less, further preferably 1.0 or more and 2.0 or less.

FIG. 26C illustrates a cross section including the lead 212a and corresponds to a cross section of the secondary battery 250, the positive electrode 211a, and the negative electrode 211b in the length direction. As illustrated in FIG. 26C, in the folded portion 261, a space 273 is preferably included between the end portions of the positive electrode 211a and the negative electrode 211b in the length direction and the exterior body 251.

FIG. 26D is a schematic cross-sectional view of the secondary battery 250 in a bent state. FIG. 26D corresponds to a cross section along the cutting line B1-B2 in FIG. 26A.

When the secondary battery 250 is bent, the exterior body 251 changes in shape such that part of the exterior body 251 positioned on the outer side in bending is stretched and the other part positioned on the inner side shrinks. More specifically, the part of the exterior body 251 positioned on the outer side in bending changes in shape such that the wave amplitude becomes smaller and the wave period becomes longer. In contrast, the part of the exterior body 251 positioned on the inner side changes in shape such that the wave amplitude becomes larger and the wave period becomes shorter. When the exterior body 251 changes in shape in this manner, stress applied to the exterior body 251 due to bending is relieved, so that a material itself of the exterior body 251 does not need to expand and contract. As a result, the secondary battery 250 can be bent with weak force without damage to the exterior body 251.

As illustrated in FIG. 26D, when the secondary battery 250 is bent, the positive electrode 211a and the negative electrode 211b are relatively shifted to each other. At this time, ends of the stacked positive electrodes 211a and negative electrodes 211b on the seal portion 263 side are fixed by a fixing member 217; thus, the plurality of positive electrodes 211a and negative electrodes 211b are shifted so that the shift amount becomes larger at a position closer to the folded portion 261. Therefore, stress applied to the positive electrode 211a and the negative electrode 211b is relieved, and the positive electrode 211a and the negative electrode 211b themselves do not need to expand and contract. As a result, the secondary battery 250 can be bent without damage to the positive electrode 211a and the negative electrode 211b.

The space 273 is included between the exterior body 251 and the positive electrode 211a and the negative electrode 211b, whereby the positive electrode 211a and the negative electrode 211b can be shifted relatively while the positive electrode 211a and the negative electrode 211b positioned on an inner side in bending do not come in contact with the exterior body 251.

In the secondary battery 250 illustrated in FIG. 26 and FIG. 27, damage to the exterior body, damage to the positive electrode 211a and the negative electrode 211b, and the like are less likely to occur and battery characteristics are less likely to deteriorate even when the secondary battery 250 is repeatedly bent and stretched. When the positive electrode active material described in the above embodiment is used in the positive electrode 211a included in the secondary battery 250, a battery with better cycle performance can be obtained.

Embodiment 5

In this embodiment, examples of electronic devices each including the secondary battery of one embodiment of the present invention are described.

First, FIG. 28A to FIG. 28G illustrates examples of electronic devices including the bendable secondary battery described in part of Embodiment 4. Examples of electronic devices each including a bendable secondary battery include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

A secondary battery with a flexible shape can also be incorporated along a curved surface of an inside wall or an outside wall of a house or a building or an interior or an exterior of an automobile.

Figure 28A:
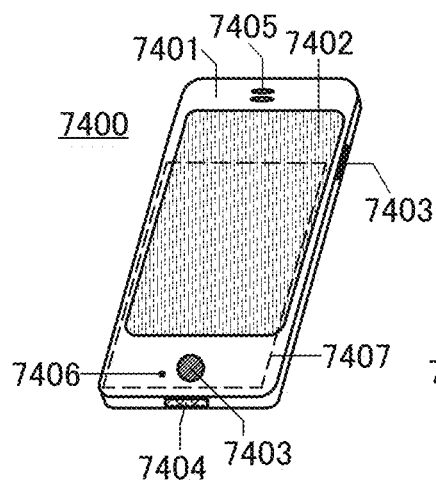
FIG. 28A, FIG. 28B, FIG. 28C, FIG. 28D, FIG. 28E, FIG. 28F, FIG. 28G, and FIG. 28H are diagrams showing examples of electronic devices.

FIG. 28A illustrates an example of a mobile phone. A mobile phone 7400 includes operation buttons 7403, an external connection port 7404, a speaker 7405, a microphone 7406, and the like in addition to a display portion 7402 incorporated in a housing 7401. Note that the mobile phone 7400 includes a secondary battery 7407. When the secondary battery of one embodiment of the present invention is used as the secondary battery 7407, a lightweight mobile phone with a long lifetime can be provided.

Figure 28B:
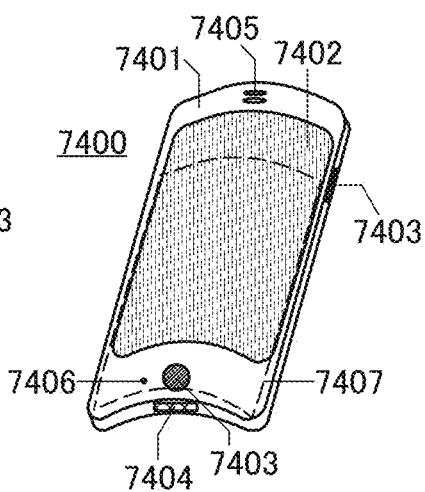
Figure 28C:
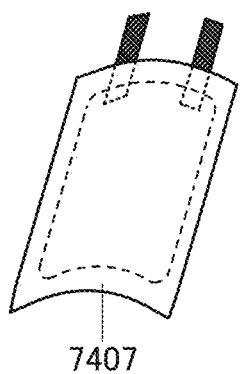

FIG. 28B illustrates the mobile phone 7400 in a bent state. When the whole mobile phone 7400 is bent through deformation by the external force, the secondary battery 7407 provided therein is also bent. FIG. 28C illustrates the bent secondary battery 7407 in a bent state. The secondary battery 7407 is a thin storage battery. The secondary battery 7407 is fixed in a bent state. Note that the secondary battery 7407 includes a lead electrode electrically connected to a current collector. The current collector is, for example, copper foil and partly alloyed with gallium; thus, adhesion between the current collector and an active material layer in contact with the current collector is improved and the secondary battery 7407 can have high reliability even in a bent state.

Figure 28D:
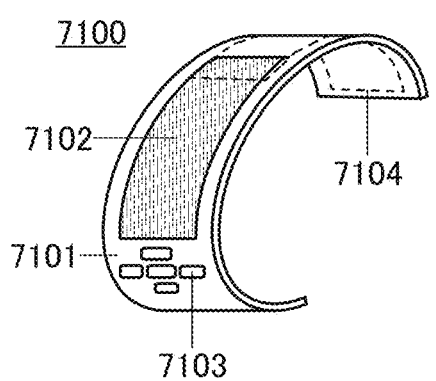
Figure 28E:

FIG. 28D illustrates an example of a bangle-type display device. A portable display device 7100 includes a housing 7101, a display portion 7102, operation buttons 7103, and a secondary battery 7104. FIG. 28E illustrates the secondary battery 7104 in a bent state. When the display device is worn on a user's arm while the secondary battery 7104 is bent, the housing changes in shape and the curvature of part or the whole of the secondary battery 7104 is changed. Note that a value represented by the radius of a circle that corresponds to the bending condition of a curve at a given point is referred to as the radius of curvature, and the reciprocal of the radius of curvature is referred to as curvature. Specifically, part or the whole of the housing or the main surface of the secondary battery 7104 is changed in the range of radius of curvature from 40 mm or more to 150 mm or less. When the radius of curvature at the main surface of the secondary battery 7104 is in the range from 40 mm or more to 150 mm or less, the reliability can be kept high. When the secondary battery of one embodiment of the present invention is used as the secondary battery 7104, a lightweight portable display device with a long lifetime can be provided.

Figure 28F:
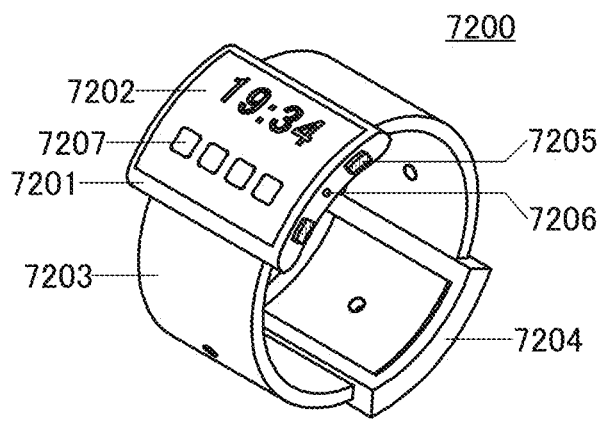

FIG. 28F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music replay, Internet communication, and a computer game.

The display portion 7202 with a curved display surface is provided, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can execute near field communication that is standardized communication. For example, mutual communication with a headset capable of wireless communication enables hands-free calling.

The portable information terminal 7200 includes the input output terminal 7206, and can perform direct data communication with another information terminal via a connector. In addition, charging via the input output terminal 7206 is possible. Note that the charging operation may be performed by wireless power feeding without using the input output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 28E can be provided in the housing 7201 while being curved, or can be provided in the band 7203 such that it can be curved.

The portable information terminal 7200 preferably includes a sensor. As the sensor, for example, a human body sensor such as a fingerprint sensor, a pulse sensor, or a temperature sensor; a touch sensor; a pressure sensitive sensor; an acceleration sensor; or the like is preferably mounted.

Figure 28G:
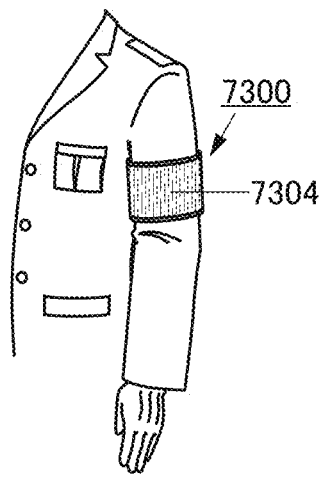

FIG. 28G illustrates an example of an armband display device. A display device 7300 includes a display portion 7304 and the secondary battery of one embodiment of the present invention. In addition, the display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication that is standardized communication.

The display device 7300 includes an input/output terminal, and can perform direct data communication with another information terminal via a connector. In addition, charging via the input/output terminal is possible. Note that the charging operation may be performed by wireless power feeding without using the input/output terminal.

When the secondary battery of one embodiment of the present invention is used as the secondary battery included in the display device 7300, a lightweight display device with a long lifetime can be provided.

Figure 28H:
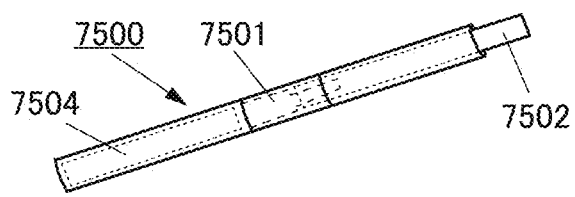
Figure 29A:
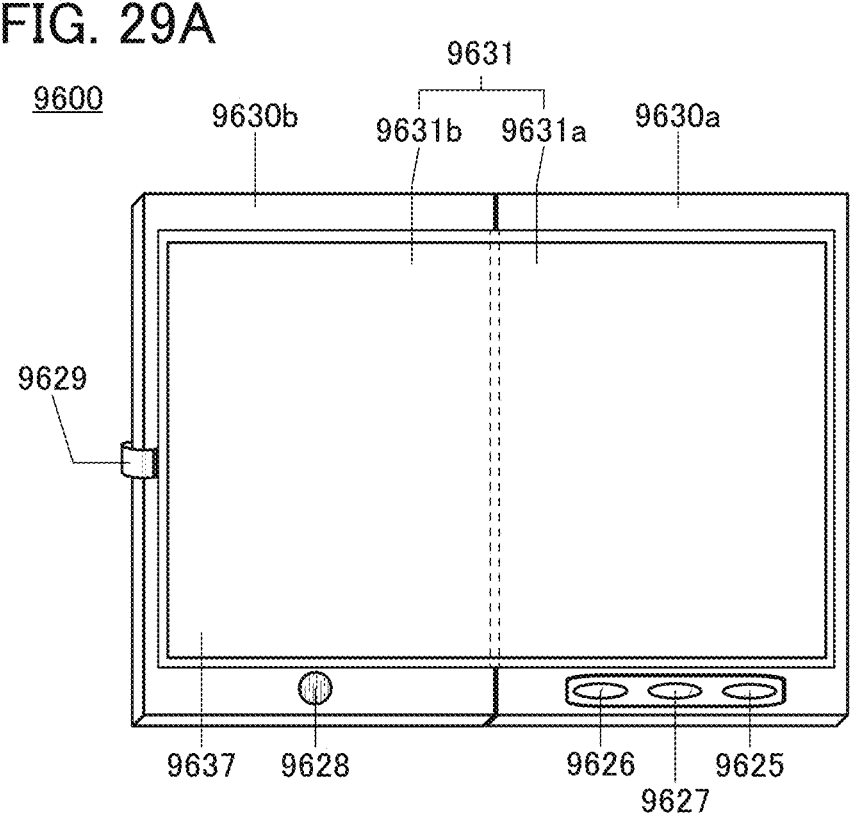
FIG. 29A, FIG. 29B, and FIG. 29C are diagrams showing an example of an electronic device.
Figure 29B:
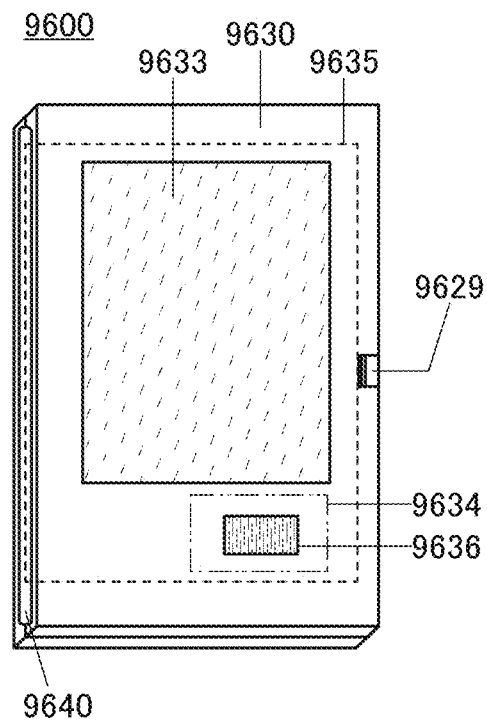
Figure 29C:
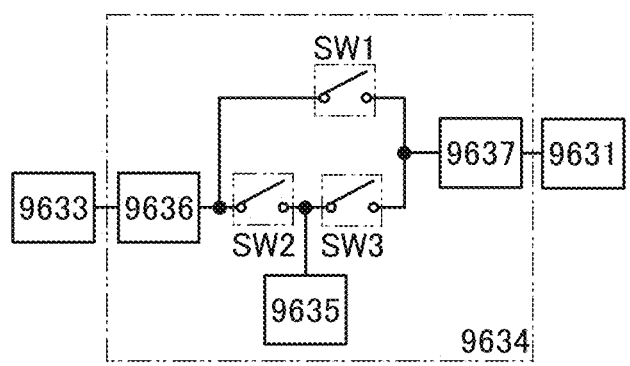
Figure 30:
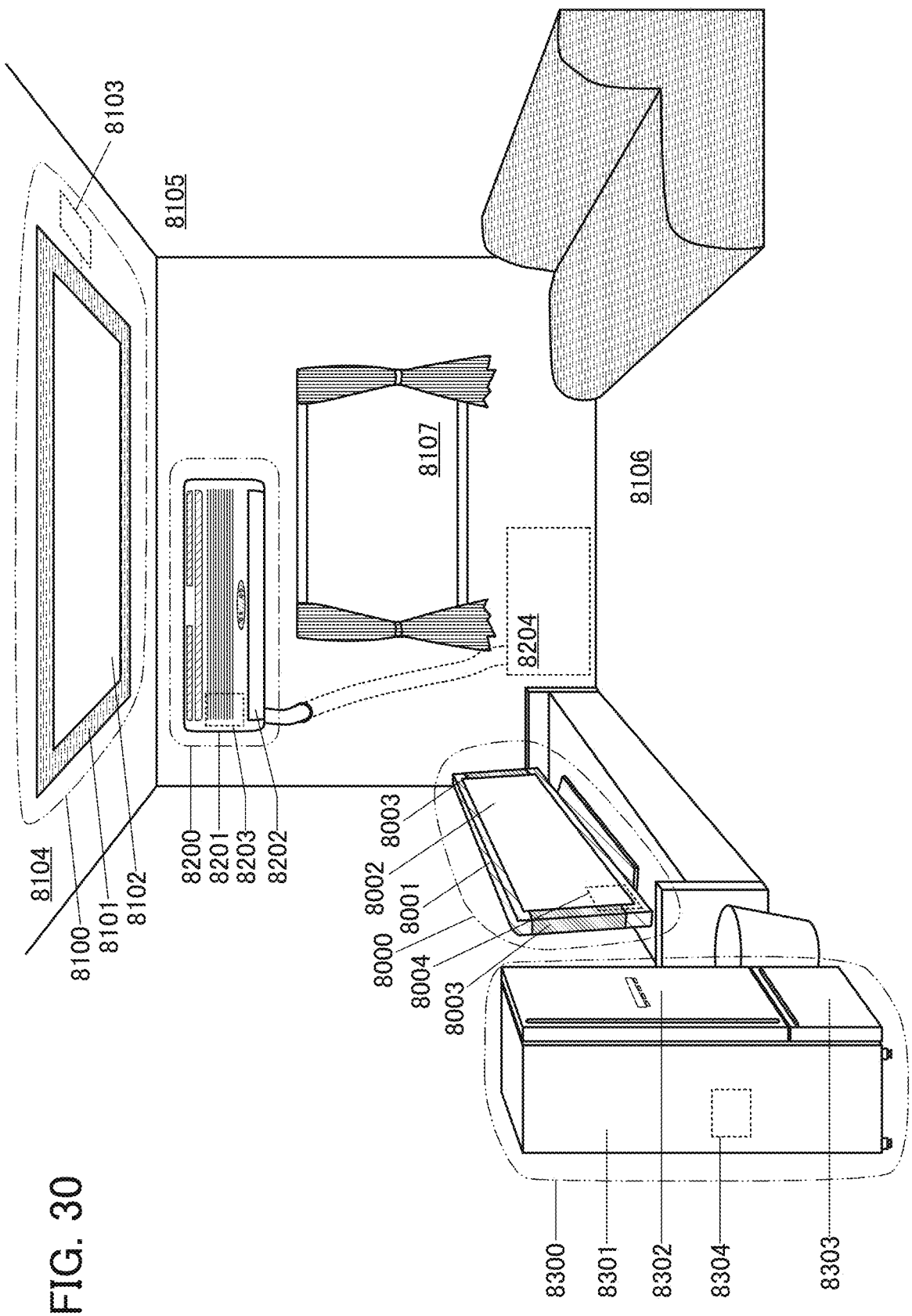
FIG. 30 is a diagram showing examples of electronic devices.

Examples of electronic devices each including the secondary battery with excellent cycle performance described in the above embodiment are described using FIG. 28H, FIG. 29, and FIG. 30.

When the secondary battery of one embodiment of the present invention is used as a secondary battery of a daily electronic device, a lightweight product with a long lifetime can be provided. Examples of the daily electronic device include an electric toothbrush, an electric shaver, and electric beauty equipment. As secondary batteries of these products, small and lightweight secondary batteries with stick-like shapes and high capacity are desired in consideration of handling ease for users.

FIG. 28H is a perspective view of a device called a cigarette smoking device (electronic cigarette). In FIG. 28H, an electronic cigarette 7500 includes an atomizer 7501 including a heating element, a secondary battery 7504 that supplies power to the atomizer, and a cartridge 7502 including a liquid supply bottle, a sensor, and the like. To improve safety, a protection circuit that prevents overcharging and overdischarging of the secondary battery 7504 may be electrically connected to the secondary battery 7504. The secondary battery 7504 in FIG. 28H includes an external terminal for connection to a charger. When the electronic cigarette 7500 is held by a user, the secondary battery 7504 becomes a tip portion; thus, it is preferable that the secondary battery 7504 have a short total length and be lightweight. With the secondary battery of one embodiment of the present invention, which has high capacity and excellent cycle performance, the small and lightweight electronic cigarette 7500 that can be used for a long time over a long period can be provided.

Next, FIG. 29A and FIG. 29B illustrate an example of a tablet terminal that can be folded in half. A tablet terminal 9600 illustrated in FIG. 29A and FIG. 28B includes a housing 9630*a*, a housing 9630*b*, a movable portion 9640 connecting the housing 9630*a* and the housing 9630*b* to each other, a display portion 9631 including a display portion 9631*a* and a display portion 9631*b*, a switch 9625 to a switch 9627, a fastener 9629, and an operation switch 9628. By using a flexible panel for the display portion 9631, the tablet terminal can have a larger display portion. FIG. 29A illustrates the tablet terminal 9600 that is opened, and FIG. 29B illustrates the tablet terminal 9600 that is closed.

The tablet terminal 9600 includes a power storage unit 9635 inside the housing 9630*a* and the housing 9630*b*. The power storage unit 9635 is provided across the housing 9630*a* and the housing 9630*b*, passing through the movable portion 9640.

Part of or the entire display portion 9631 can be a touch panel region, and data can be input by touching text, an input form, an image including an icon, and the like displayed on the region. For example, it is possible that keyboard buttons are displayed on the entire display portion 9631*a* on the housing 9630*a* side, and data such as text or an image is displayed on the display portion 9631*b* on the housing 9630*b* side.

It is possible that a keyboard is displayed on the display portion 9631*b* on the housing 9630*b* side, and data such as text or an image is displayed on the display portion 9631*a* on the housing 9630*a* side. Furthermore, it is possible that a button for switching keyboard display on a touch panel is displayed on the display portion 9631 and the button is touched with a finger, a stylus, or the like to display a keyboard on the display portion 9631.

Touch input can be performed concurrently in a touch panel region in the display portion 9631*a* on the housing 9630*a* side and a touch panel region in the display portion 9631*b* on the housing 9630*b* side.

The switch 9625 to the switch 9627 may function not only as an interface for operating the tablet terminal 9600 but also as an interface that can switch various functions. For example, at least one of the switch 9625 to the switch 9627 may have a function of switching power on/off of the tablet terminal 9600. For another example, at least one of the switch 9625 to the switch 9627 may have a function of switching display between a portrait mode and a landscape mode and a function of switching display between monochrome display and color display. For another example, at least one of the switch 9625 to the switch 9627 may have a function of adjusting the luminance of the display portion 9631. The luminance of the display portion 9631 can be optimized in accordance with the amount of external light in use of the tablet terminal 9600, which is detected by an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

Although FIG. 29A illustrates the example where the display portion 9631*a* on the housing 9630*a* side and the display portion 9631*b* on the housing 9630*b* side have substantially the same display area, there is no particular limitation on the display area of each of the display portion 9631*a* and the display portion 9631*b*; the size may be different between one and the other, and the display quality may also be different. For example, one may be a display panel that can display higher-definition images than the other.

The tablet terminal 9600 is folded in half in FIG. 29B, and the tablet terminal 9600 includes a housing 9630, a solar cell 9633, and a charging and discharging control circuit 9634 including a DCDC converter 9636. The power storage unit of one embodiment of the present invention is used as the power storage unit 9635.

Note that as described above, the tablet terminal 9600 can be folded in half, and thus can be folded when not in use such that the housing 9630*a* and the housing 9630*b* overlap with each other. The display portion 9631 can be protected owing to the holding, which can increase the durability of the tablet terminal 9600. Since the power storage unit 9635 including the secondary battery of one embodiment of the present invention has high capacity and excellent cycle performance, the tablet terminal 9600 that can be used for a long time over a long period can be provided.

The tablet terminal 9600 illustrated in FIG. 29A and FIG. 29B can also have a function of displaying various kinds of information (a still image, a moving image, a text image, and the like), a function of displaying a calendar, a date, the time, or the like on the display portion, a touch-input function of operating or editing data displayed on the display portion by touch input, a function of controlling processing by various kinds of software (programs), and the like.

The solar cell 9633 attached on the surface of the tablet terminal 9600 supplies electric power to a touch panel, a display portion, a video signal processing portion, and the like. Note that the solar cell 9633 can be provided on one surface or both surfaces of the housing 9630 and the power storage unit 9635 can be charged efficiently. Note that the use of a lithium-ion battery as the power storage unit 9635 brings an advantage such as a reduction in size.

The structure and operation of the charging and discharging control circuit 9634 illustrated in FIG. 29B are described with reference to a block diagram in FIG. 29C. The solar cell 9633, the power storage unit 9635, the DCDC converter 9636, a converter 9637, switches SW1 to SW3, and the display portion 9631 are illustrated in FIG. 29C, and the power storage unit 9635, the DCDC converter 9636, the converter 9637, and the switches SW1 to SW3 correspond to the charging and discharging control circuit 9634 illustrated in FIG. 29B.

First, an operation example in the case where electric power is generated by the solar cell 9633 using external light is described. The voltage of electric power generated by the solar cell is raised or lowered by the DCDC converter 9636 to a voltage for charging the power storage unit 9635. Then, when the display portion 9631 is operated with the electric power from the solar cell 9633, the switch SW1 is turned on and the voltage is raised or lowered by the converter 9637 so as to be a voltage needed for the display portion 9631. When display on the display portion 9631 is not performed, the switch SW1 is turned off and the switch SW2 is turned on so that the power storage unit 9635 is charged.

Although the solar cell 9633 is described as an example of a power generation means, the power generation means is not particularly limited, and the power storage unit 9635 may be charged with another power generation means such as a piezoelectric element or a thermoelectric conversion element (Peltier element). For example, the power storage unit 9635 may be charged with a non-contact power transmission module that transmits and receives power wirelessly (without contact) for charging, or with a combination of other charging means.

FIG. 30 illustrates other examples of electronic devices. In FIG. 30, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power supply from a commercial power source or can use electric power stored in the secondary battery 8004. Thus, the display device 8000 can be used with the use of the secondary battery 8004 of one embodiment of the present invention as an uninterruptible power supply even when electric power supply cannot be received from a commercial power source due to power failure or the like.

A semiconductor display device such as a liquid crystal display device, a light-emitting device in which a light-emitting element such as an organic EL element is provided in each pixel, an electrophoretic display device, a DMD (Digital Micromirror Device), a PDP (Plasma Display Panel), or an FED (Field Emission Display) can be used for the display portion 8002.

Note that the display device includes, in its category, all of information display devices for personal computers, advertisement displays, and the like other than TV broadcast reception.

In FIG. 30, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 30 illustrates the case where the secondary battery 8103 is provided in a ceiling 8104 on which the housing 8101 and the light source 8102 are installed, the secondary battery 8103 may be provided in the housing 8101. The lighting device 8100 can receive electric power supply from a commercial power source, or can use electric power stored in the secondary battery 8103. Thus, the lighting device 8100 can be used with the use of the secondary battery 8103 of one embodiment of the present invention as an uninterruptible power supply even when electric power supply cannot be received from a commercial power source due to power failure or the like.

Note that although the installation lighting device 8100 provided in the ceiling 8104 is illustrated in FIG. 30, the secondary battery of one embodiment of the present invention can be used for an installation lighting device provided in, for example, a wall 8105, a floor 8106, a window 8107, or the like other than the ceiling 8104, or can be used in a tabletop lighting device or the like.

As the light source 8102, an artificial light source that obtains light artificially by using power can be used. Specifically, an incandescent lamp, a discharge lamp such as a fluorescent lamp, and a light-emitting element such as an LED or an organic EL element are given as examples of the artificial light source.

In FIG. 30, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 30 illustrates the case where the secondary battery 8203 is provided in the indoor unit 8200, the secondary battery 8203 may be provided in the outdoor unit 8204. Alternatively, the secondary battery 8203 may be provided in both the indoor unit 8200 and the outdoor unit 8204. The air conditioner can receive electric power supply from a commercial power source, or can use electric power stored in the secondary battery 8203. Particularly in the case where the secondary battery 8203 is provided in both the indoor unit 8200 and the outdoor unit 8204, the air conditioner can be operated with the use of the secondary battery 8203 of one embodiment of the present invention as an uninterruptible power supply even when electric power supply cannot be received from a commercial power source due to power failure or the like.

Note that FIG. 30 illustrates the split-type air conditioner composed of the indoor unit and the outdoor unit, the secondary battery of one embodiment of the present invention can also be used in an integrated air conditioner in which one housing has the function of an indoor unit and the function of an outdoor unit.

In FIG. 30, an electric refrigerator-freezer 8300 is an example of an electronic device using a secondary battery 8304 of one embodiment of the present invention. Specifically, the electric refrigerator-freezer 8300 includes a housing 8301, a door for refrigerator compartment 8302, a door for freezer compartment 8303, the secondary battery 8304, and the like. The secondary battery 8304 is provided in the housing 8301 in FIG. 30. The electric refrigerator-freezer 8300 can receive electric power supply from a commercial power source, or can use electric power stored in the secondary battery 8304. Thus, the electric refrigerator-freezer 8300 can be used with the use of the secondary battery 8304 of one embodiment of the present invention as an uninterruptible power supply even when electric power supply cannot be received from a commercial power source due to power failure or the like.

Note that among the electronic devices described above, a high-frequency heating apparatus such as a microwave oven and an electronic device such as an electric rice cooker require high power in a short time. Therefore, the tripping of a breaker of a commercial power source in use of an electronic device can be prevented by using the secondary battery of one embodiment of the present invention as an auxiliary power supply for supplying electric power which cannot be supplied enough by a commercial power source.

In addition, in a time period when electronic devices are not used, particularly when the proportion of the amount of electric power which is actually used to the total amount of electric power which can be supplied from a commercial power source (such a proportion referred to as a usage rate of electric power) is low, electric power can be stored in the secondary battery, whereby an increase in the usage rate of electric power can be reduced in a time period when the electronic devices are used. For example, in the case of the electric refrigerator-freezer 8300, electric power can be stored in the secondary battery 8304 in night time when the temperature is low and the door for refrigerator compartment 8302 and the door for freezer compartment 8303 are not opened and closed. Moreover, in daytime when the temperature is high and the door for refrigerator compartment 8302 and the door for freezer compartment 8303 are opened and closed, the usage rate of power in daytime can be kept low by using the secondary battery 8304 as an auxiliary power supply.

According to one embodiment of the present invention, the secondary battery can have excellent cycle performance and improved reliability. Furthermore, according to one embodiment of the present invention, a secondary battery with high capacity can be obtained; thus, the secondary battery itself can be made more compact and lightweight owing to the improvement in the characteristics of the secondary battery. Thus, the secondary battery of one embodiment of the present invention is incorporated in the electronic device described in this embodiment, whereby a more lightweight electronic device with a longer lifetime can be obtained. This embodiment can be implemented in combination with any of the other embodiments as appropriate.

Embodiment 6

In this embodiment, examples of vehicles each including the secondary battery of one embodiment of the present invention are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 31A:
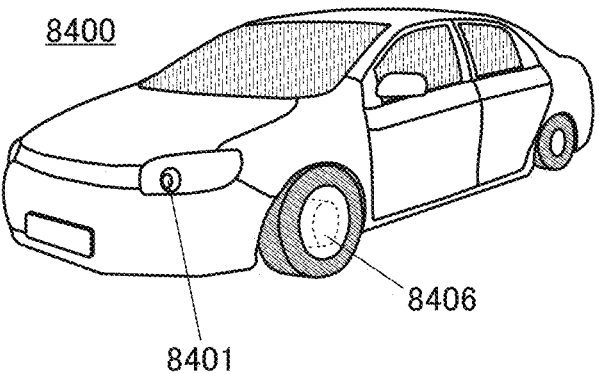
FIG. 31A, FIG. 31B, and FIG. 31C are diagrams each showing an example of a vehicle.

FIG. 31 illustrates examples of vehicles each including the secondary battery of one embodiment of the present invention. An automobile 8400 illustrated in FIG. 31A is an electric vehicle that runs on an electric motor as a power source. Alternatively, the automobile 8400 is a hybrid electric vehicle capable of driving using either an electric motor or an engine with an appropriate selection. The use of one embodiment of the present invention can achieve a high-mileage vehicle. The automobile 8400 includes the secondary battery. As the secondary battery, the modules of the secondary batteries illustrated in FIG. 16C and FIG. 16D may be arranged to be used in a floor portion in the automobile. Alternatively, a battery pack in which a plurality of secondary batteries illustrated in FIG. 19 are combined may be placed in the floor portion in the automobile. The secondary battery is used not only for driving an electric motor 8406, but also for supplying electric power to a light-emitting device such as a headlight 8401 or a room light (not illustrated).

The secondary battery can also supply electric power to a display device included in the automobile 8400, such as a speedometer or a tachometer. Furthermore, the secondary battery can supply electric power to a semiconductor device included in the automobile 8400, such as a navigation system.

Figure 31B:
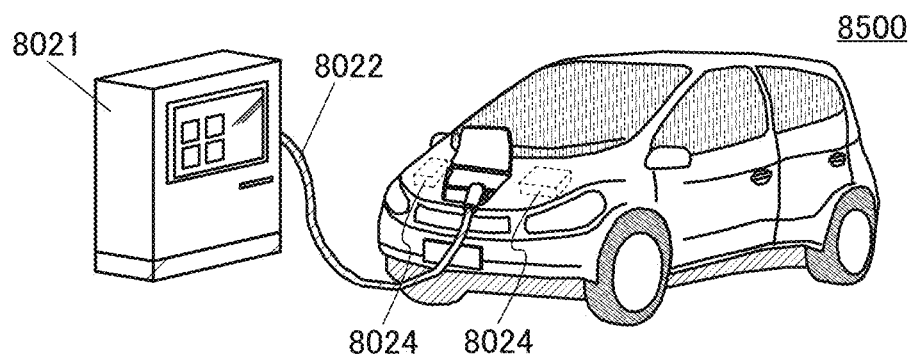

An automobile 8500 illustrated in FIG. 31B can be charged when a secondary battery included in the automobile 8500 is supplied with power through external charging equipment by a plug-in system, a contactless power feeding system, or the like. FIG. 31B illustrates a state where a secondary battery 8024 incorporated in the automobile 8500 is charged from a ground installation type charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with a plug-in technique, the secondary battery 8024 incorporated in the automobile 8500 can be charged by power supply from the outside. The charging can be performed by converting AC electric power into DC electric power through a converter, such as an AC-DC converter.

Although not illustrated, the vehicle may include a power receiving device so that it can be charged by being supplied with electric power from an above-ground power transmitting device in a contactless manner. In the case of the contactless power feeding system, by incorporating a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the vehicle to charge the secondary battery while the vehicle is stopped or driven. To supply electric power in such a contactless manner, an electromagnetic induction method or a magnetic resonance method can be used.

Figure 31C:
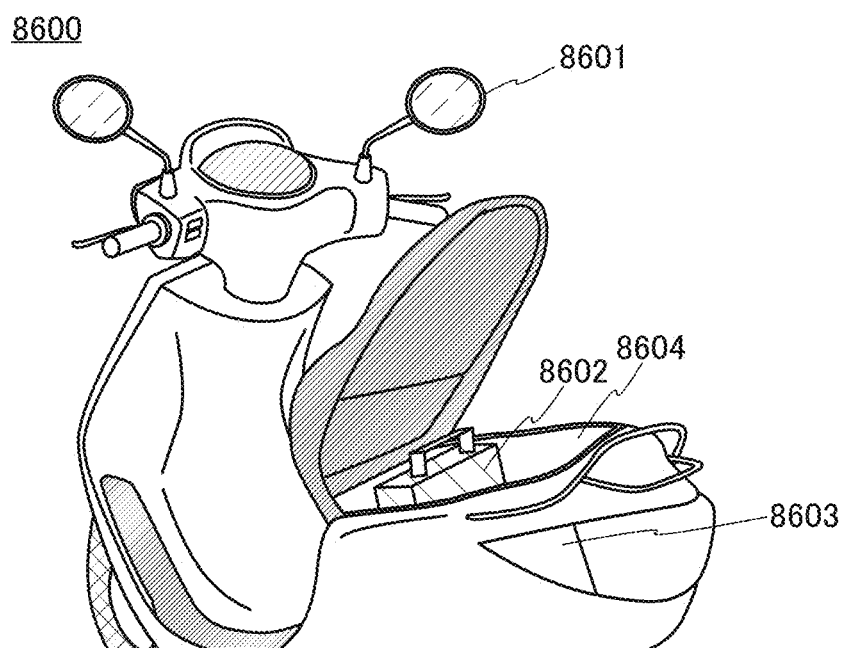

FIG. 31C is an example of a motorcycle including the secondary battery of one embodiment of the present invention. A scooter 8600 illustrated in FIG. 31C includes a secondary battery 8602, side mirrors 8601, and direction indicators 8603. The secondary battery 8602 can supply electricity to the direction indicators 8603.

In the scooter 8600 illustrated in FIG. 31C, the secondary battery 8602 can be stored in an under-seat storage 8604. The secondary battery 8602 can be stored in the under-seat storage 8604 even when the under-seat storage 8604 is small. The secondary battery 8602 is detachable; thus, the secondary battery 8602 is carried indoors when charged, and is stored before the motor scooter is driven.

According to one embodiment of the present invention, the secondary battery can have improved cycle performance and the secondary battery can have higher capacity. Thus, the secondary battery itself can be made more compact and lightweight. The compact and lightweight secondary battery contributes to a reduction in the weight of a vehicle, and thus increases the mileage. Furthermore, the secondary battery included in the vehicle can be used as a power supply source for products other than the vehicle. In such a case, the use of a commercial power source can be avoided at peak time of electric power demand, for example. Avoiding the use of a commercial power source at peak time of electric power demand can contribute to energy saving and a reduction in carbon dioxide emissions. Moreover, the secondary battery with excellent cycle performance can be used over a long period; thus, the use amount of rare metals such as cobalt can be reduced.

This embodiment can be implemented in combination with any of the other embodiments as appropriate.

Example 1

In this example, lithium cobalt oxides (a sample A1 to a sample A3) was fabricated as a positive electrode active material of one embodiment of the present invention, and XRD analysis and ESR analysis were performed thereon. As a comparative example, commercial lithium cobalt oxide (a sample A4) was used. Furthermore, secondary batteries using these lithium cobalt oxides were fabricated, and the cycle performances and continuous charging tolerances at high-voltage charging were evaluated. Here, the addition amount of magnesium and that of halogen were different among the sample A1 to the sample A3.

[Fabrication Method of Positive Electrode Active Material]
<Sample A1>

The sample A1 was fabricated using a halogen source, a lithium source, a magnesium source, and a composite oxide containing lithium and a transition metal as starting materials (see FIG. 9).

First, the starting materials were weighed. As the halogen source and the magnesium source, magnesium fluoride ($MgF_2$) was used. As the halogen source and the lithium source, lithium fluoride (LiF) was used.

Next, the composite oxide containing lithium and a transition metal was weighed. As the composite oxide containing lithium and a transition metal, CELLSEED C-10N manufactured by NIPPON CHEMICAL INDUSTRIAL CO., LTD., which is lithium cobalt oxide ($LiCoO_2$), was used. CELLSEED C-10N is lithium cobalt oxide having D50 of approximately 12 μm and few impurities.

Specifically, 0.47585 g (7.6378 mmol) of $MgF_2$, 0.06602 g (2.54526 mmol) of LiF, and 149.45813 g (1527.109 mmol) of CELLSEED C-10N were weighed. The amounts allow the ratio of the number of magnesium atoms to the number of cobalt atoms to be 0.5 atomic %. Furthermore, the amounts allow the molar ratio of LiF to $MgF_2$ to be 0.33.

Note that in this specification and the like, the addition amount of magnesium means the ratio of the number of magnesium atoms to the number of cobalt atoms in starting materials.

Next, the starting materials were mixed. A wet ball mill was used for the mixing. Specifically, the mixing was performed by a dry process. The mixing was performed in a ball mill using a zirconia ball at 150 rpm for one hour.

Next, heat treatment was performed on the mixture. The mixture was put in an alumina crucible and processed at 850° C. using a muffle furnace in an oxygen atmosphere for 60 hours. At the time of the heat treatment, the alumina crucible was covered with a lid. The flow rate of oxygen was 10 L/min. The temperature rising rate was 200° C./hr and the temperature decreasing time was longer than or equal to 10 hours.

Next, the materials subjected to heat treatment were cooled to room temperature and collected, whereby the sample A1 was obtained.

<Sample A2>

For the sample A2, 0.12553 g (2.0149 mmol) of $MgF_2$, 0.01742 g (0.67146 mmol) of LiF, and 9.85705 g (100.716 mmol) of CELLSEED C-10N were weighed. The amounts allow the ratio of the number of magnesium atoms to the number of cobalt atoms to be 2.0 atomic %. Furthermore, the amounts allow the molar ratio of LiF to $MgF_2$ to be 0.33. Since the description of the sample A1 can be referred to for the other steps, the detailed description is omitted.

<Sample A3>

For the sample A3, 0.36613 g (5.8767 mmol) of $MgF_2$, 0.05080 g (1.9583 mmol) of LiF, and 9.58307 g (97.9163 mmol) of CELLSEED C-10N were weighed. The amounts allow the ratio of the number of magnesium atoms to the number of cobalt atoms to be 6.0 atomic %. Furthermore, the amounts allow the molar ratio of LiF to $MgF_2$ to be 0.33. Since the description of the sample A1 can be referred to for the other steps, the detailed description is omitted.

<Sample A4>

Commercial lithium cobalt oxide (CELLSEED C-10N) not subjected to any treatment was used as the sample A4 (a comparative example).

[ESR Analysis]

Next, ESR analysis was performed on the sample A1 to the sample A4. In the ESR analysis, a high frequency power (microwave power) of 9.15 GHz was set as 1 mW, a magnetic field was swept from 0 mT to 800 mT, and the measurement temperature was set to 300 K (approximately 27° C.), 200 K (approximately −73° C.), and 113 K (approximately −160° C.). The weights of the sample A1 to the sample A4 used as the samples for the ESR analysis were each 0.005 g. In addition, magnetic field correction and detection sensitivity correction were performed using $Mn^{2+}$ marker. The number of spins was calculated using TEMPOL (4-Hydroxy-2,2,6,6-tetramethylpiperidine-1-oxyl) as a reference sample.

Figure 32:
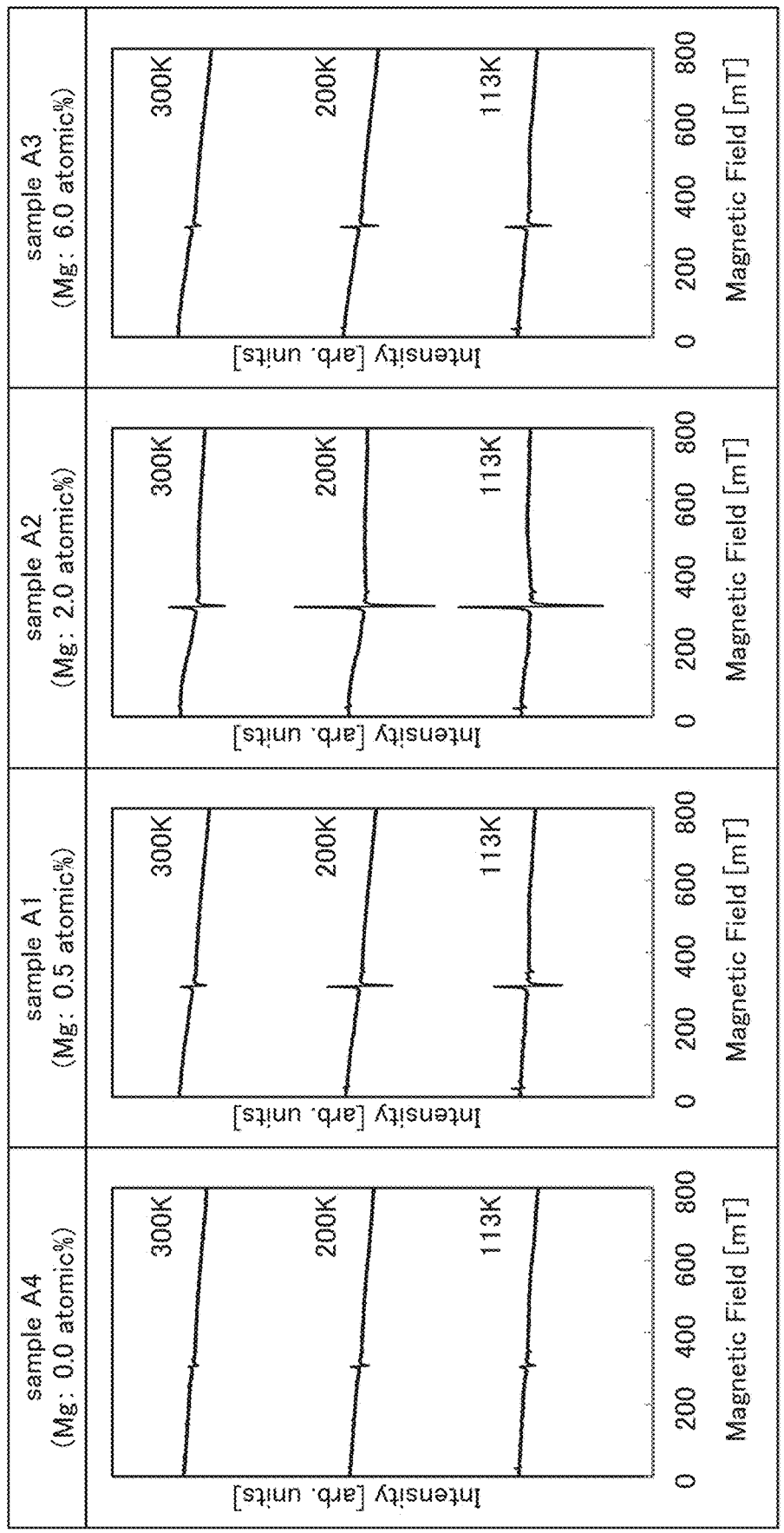
FIG. 32 is a diagram showing ESR measurement results.

FIG. 32 shows the ESR measurement results of the sample A1 to the sample A4. In FIG. 32, the horizontal axis represents the magnetic field and the vertical axis represents the intensity of ESR signal. Note that the signal intensity indicates a first derivative value of the absorption amount of microwave.

As shown in FIG. 32, sharp signals were observed at around 305 mT (g=2.15) in all the samples. The signals at around 305 mT (g=2.15) are attributed to $Co^{2+}$ and $Co^{4+}$. The line widths ΔHpp of the signals at around 305 mT (g=2.15) were each approximately 4 mT. Here, the line width ΔHpp represents a difference in magnetic field between the maximum signal value and the minimum signal value. Furthermore, no signal at around 130 mT (g=5.1) attributed to $Co_3O_4$ was observed. It was found that the sample A1 to the sample A4 each contained no or an extremely small amount of $Co_3O_4$.

Next, ESR analysis was performed while the magnetic field was swept from 200 mT to 400 mT. In the ESR analysis, the measurement temperature was 300 K (approximately 27° C.), 200 K (approximately −73° C.), and 113 K (approximately −160° C.).

Figure 33:
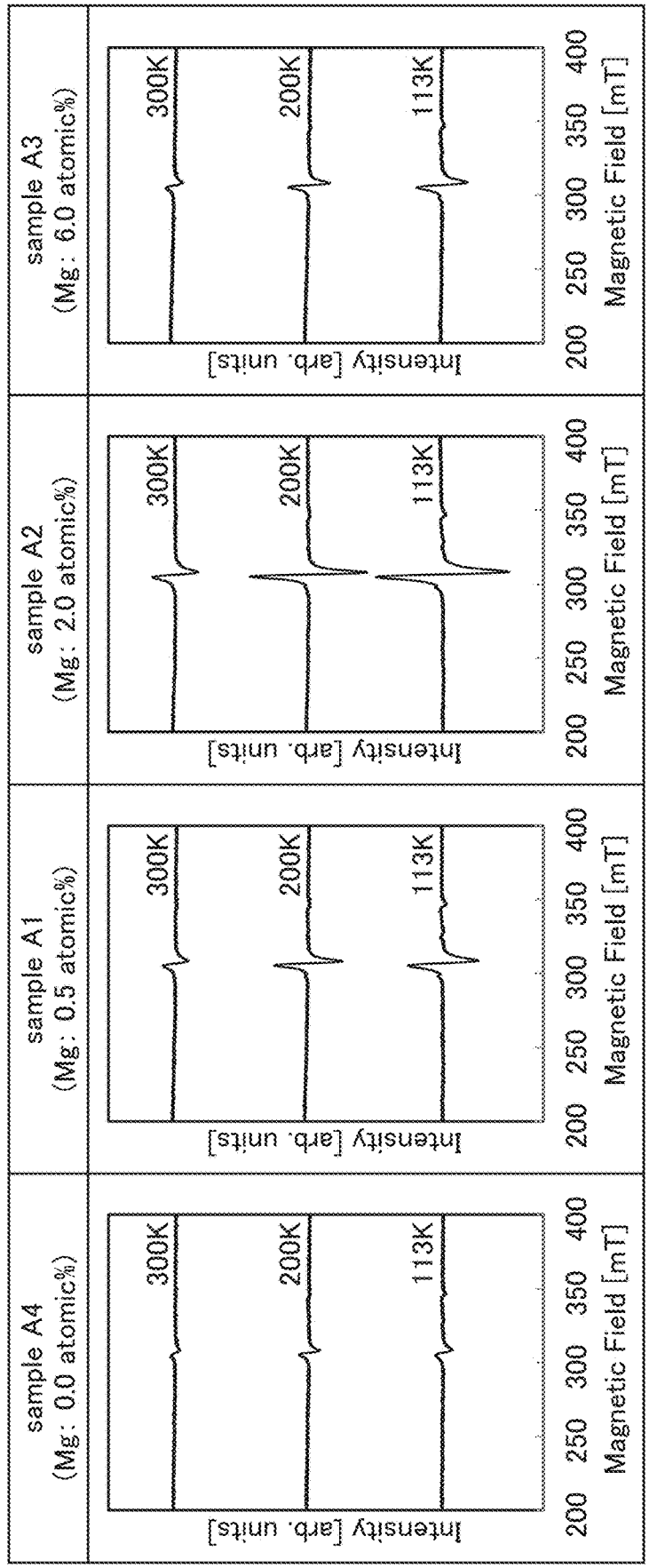
FIG. 33 is a diagram showing ESR measurement results.

FIG. 33 shows the ESR measurement results of the sample A1 to the sample A4. In FIG. 33, the horizontal axis represents the magnetic field and the vertical axis represents the intensity of ESR signal. Note that the signal intensity indicates a first derivative value of the absorption amount of microwave.

Figure 34A:
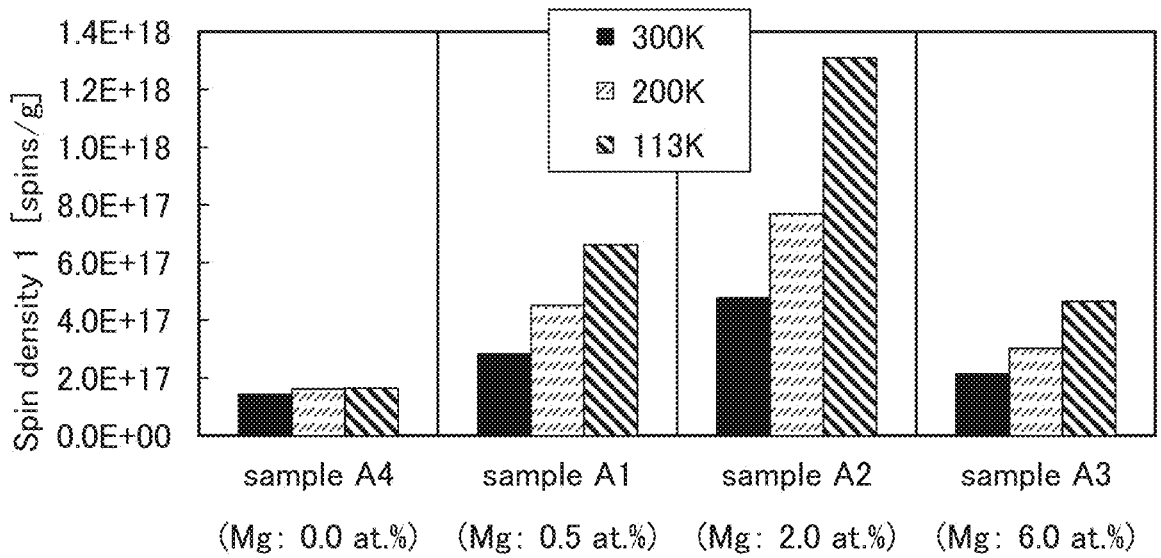
FIG. 34A and FIG. 34B are diagrams each showing the spin densities.
Figure 34B:
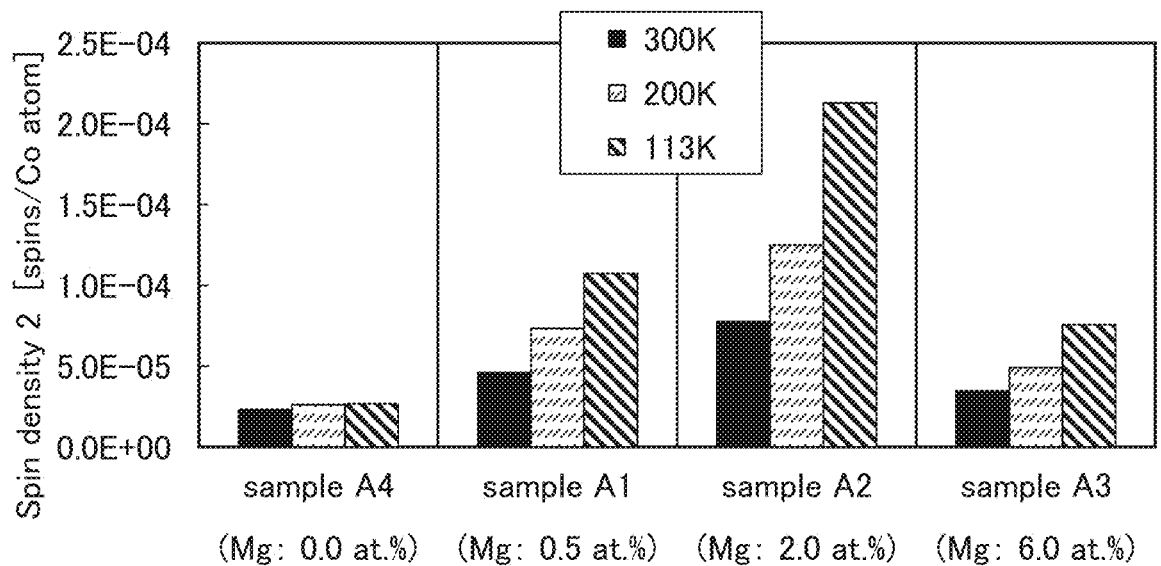

As shown in FIG. 33, sharp signals were observed at around 305 mT (g=2.15) in all the samples. Table 1 shows the number of spins calculated from the signal intensity at around 305 mT (g=2.15). Table 1 also shows a spin density 1 and a spin density 2 calculated from the number of spins. The spin density 1 shown in Table 1 is a value obtained by dividing the number of spins by the weight (0.005 g) of the sample used for the ESR analysis. In addition, the spin density 2 shown in Table 1 is a value obtained by calculating the number of cobalt atoms in each sample whose composition is $LiCoO_2$ with a molecular weight of 97.87, and then dividing the number of spins by the number of cobalt atoms. FIG. 34A shows the spin density 1 of the sample A1 to the sample A4 and FIG. 34B shows the spin density 2 thereof. In FIG. 34A and FIG. 34B, the horizontal axes represent the sample name and the vertical axes represent the spin density 1 or the spin density 2.

TABLE 1

| | ESR measurement temperature [K] | Number of spins [spins] | Spin density 1 [spins/g] | Spin density 2 [spins/Co atom] |
|---|---|---|---|---|
| sample A4 | 300 | 7.1E+14 | 1.4E+17 | 2.3E−05 |
| (Mg: 0.0 atomic %) | 200 | 8.1E+14 | 1.6E+17 | 2.6E−05 |
| | 113 | 8.2E+14 | 1.6E+17 | 2.7E−05 |

TABLE 1-continued

|  | ESR measurement temperature [K] | Number of spins [spins] | Spin density 1 [spins/g] | Spin density 2 [spins/Co atom] |
|---|---|---|---|---|
| sample A1 | 300 | 1.4E+15 | 2.8E+17 | 4.6E−05 |
| (Mg: 0.5 atomic %) | 200 | 2.3E+15 | 4.5E+17 | 7.3E−05 |
|  | 113 | 3.3E+15 | 6.6E+17 | 1.1E−04 |
| sample A2 | 300 | 2.4E+15 | 4.8E+17 | 7.8E−05 |
| (Mg: 2.0 atomic %) | 200 | 3.8E+15 | 7.7E+17 | 1.2E−04 |
|  | 113 | 6.5E+15 | 1.3E+18 | 2.1E−04 |
| sample A3 | 300 | 1.1E+15 | 2.1E+17 | 3.5E−05 |
| (Mg: 6.0 atomic %) | 200 | 1.5E+15 | 3.0E+17 | 4.9E−05 |
|  | 113 | 2.3E+15 | 4.7E+17 | 7.6E−05 |

As shown in Table 1, FIG. 34A, and FIG. 34B, the sample A1 to the sample A3 that are one embodiment of the present invention were found to have higher spin density at lower measurement temperature of the ESR analysis and to show paramagnetism, in accordance with the Curie-Weiss law. In contrast, the sample A4 that is the comparative example was found to have small dependence of the spin density on the measurement temperature and to show different behavior from paramagnetism.

Figure 35A:
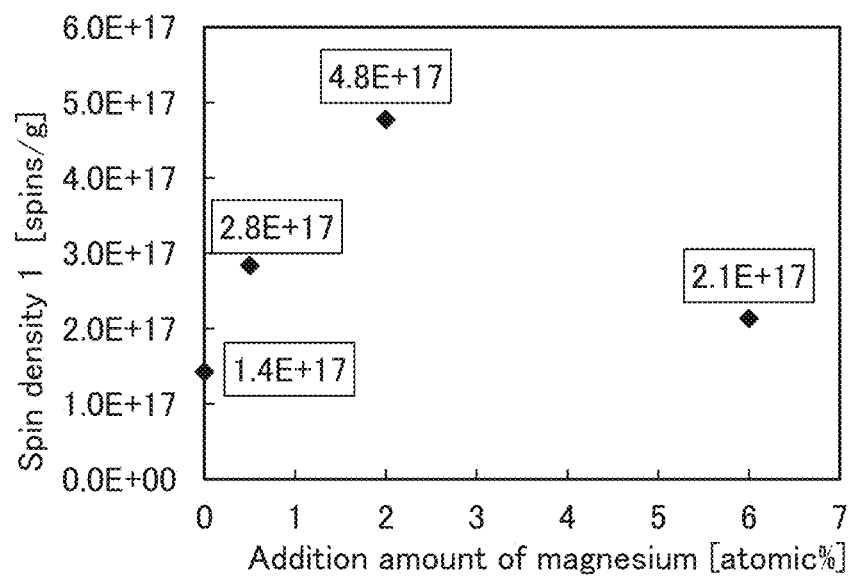
FIG. 35A and FIG. 35B are diagrams each showing correlation between the addition amount of magnesium and the spin density.
Figure 35B:
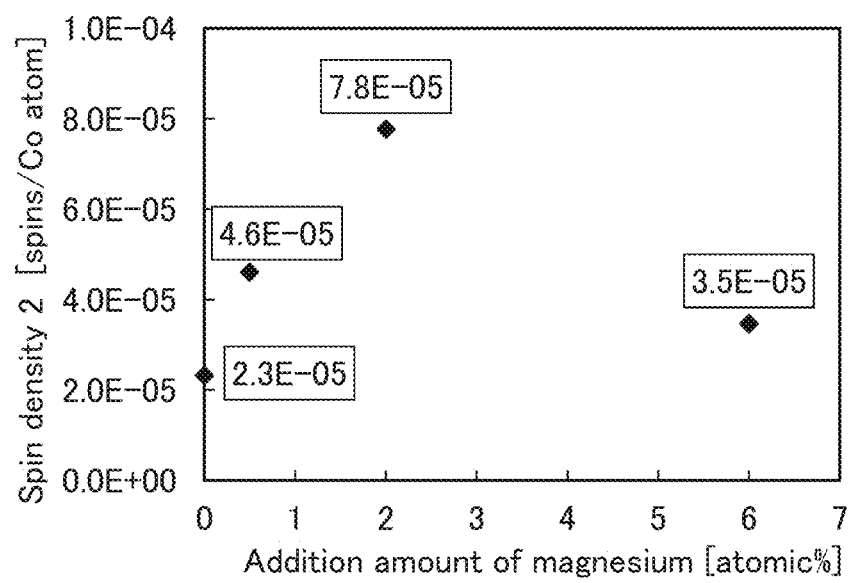

FIG. 35A shows the correlation between the spin density 1 obtained from the ESR analysis at 300 K (approximately 27° C.) and the addition amount of magnesium with respect to cobalt. FIG. 35B shows the correlation between the spin density 2 and the addition amount of magnesium with respect to cobalt. In FIG. 35A and FIG. 35B, the horizontal axes represent the addition amount of magnesium and the vertical axes represent the spin density 1 or the spin density 2.

As shown in FIG. 35A and FIG. 35B, it was found that the spin density attributed to $Co^{2+}$ and $Co^{4+}$ increased as the addition amount of magnesium increased. It was also found that the spin density attributed to $Co^{2+}$ and $Co^{4+}$ decreased when the addition amount of magnesium was excessive. In addition, small signals were observed on a lower magnetic field side than g=2.1 in the samples A1, A2, and A3 in which magnesium was added, which indicates the existence of anisotropy of crystal field caused by magnesium substitution.

As shown in FIG. 35A, in the sample A4 in which magnesium was not added, the spin density attributed to $Co^{2+}$ and $Co^{4+}$ per weight of the positive electrode active material was $1.4 \times 10^{17}$ spins/g. In contrast, the spin density of the sample A1 in which 0.5 atomic % of magnesium was added was $2.8 \times 10^{17}$ spins/g, the spin density of the sample A2 in which 2.0 atomic % of magnesium was added was $4.8 \times 10^{17}$ spins/g, and the spin density of the sample A3 in which 6.0 atomic % of magnesium was added was $2.1 \times 10^{17}$ spins/g, which are greater than or equal to $2.0 \times 10^{17}$ spins/g and less than or equal to $1.0 \times 10^{18}$ spins/g.

As shown in FIG. 35B, in the sample A4 in which magnesium was not added, the spin density attributed to $Co^{2+}$ and $Co^{4+}$ per Co atom was $2.3 \times 10^{-5}$ spins/Co atom. In contrast, the spin density of the sample A1 in which 0.5 atomic % of magnesium was added was $4.6 \times 10^{-5}$ spins/Co atom, the spin density of the sample A2 in which 2.0 atomic % of magnesium was added was $7.8 \times 10^{-5}$ spins/Co atom, and the spin density of the sample A3 in which 6.0 atomic % of magnesium was added was $3.5 \times 10^{-5}$ spins/Co atom, which are greater than or equal to $3.3 \times 10^{-5}$ spins/Co atom and less than or equal to $1.6 \times 10^{-4}$ spins/Co atom.

[XRD Analysis]

Next, XRD analysis was performed on the sample A1 to the sample A4. For the XRD analysis, CuKα rays with a wavelength of 0.154178 nm were used as the X-ray source.

Figure 36:
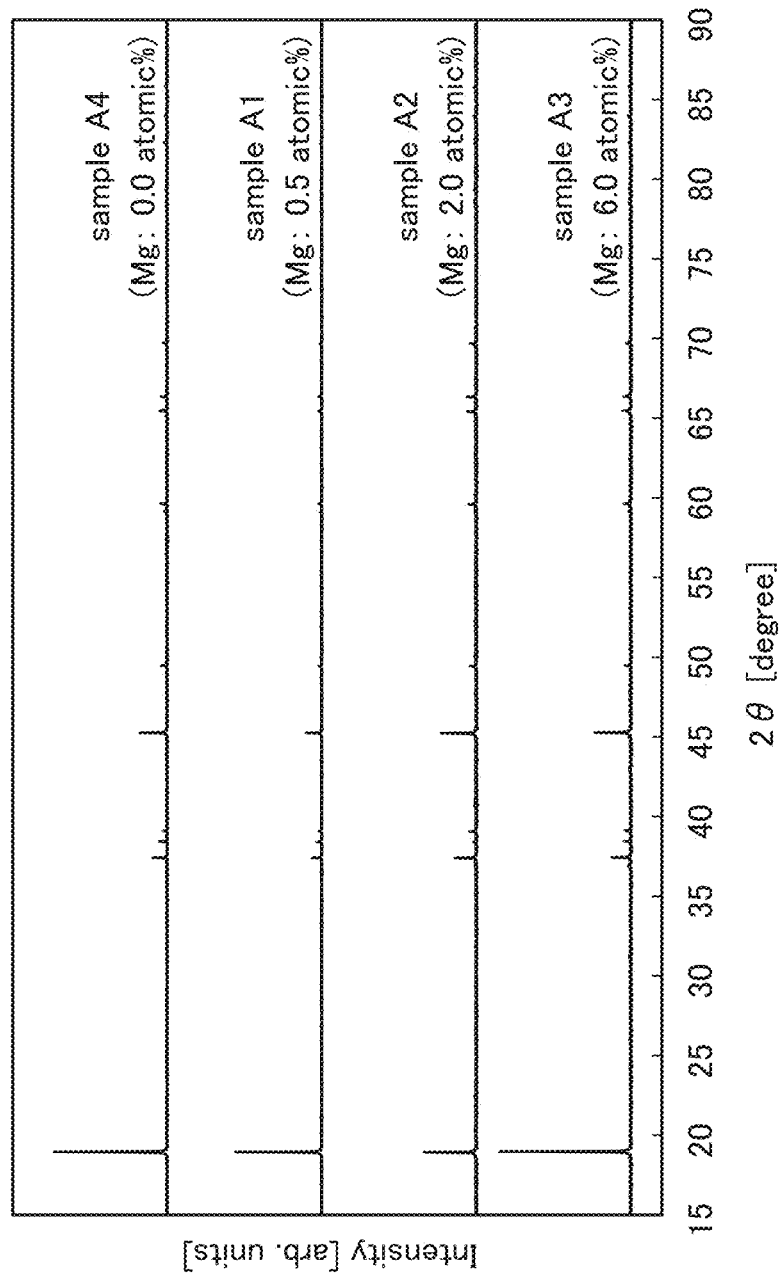
FIG. 36 is a diagram showing XRD measurement results.

FIG. 36 shows the XRD measurement results of the sample A1 to the sample A4. It was found that most of the XRD peaks observed in the sample A1 to the sample A4 were attributed to $LiCoO_2$.

Figure 37A:
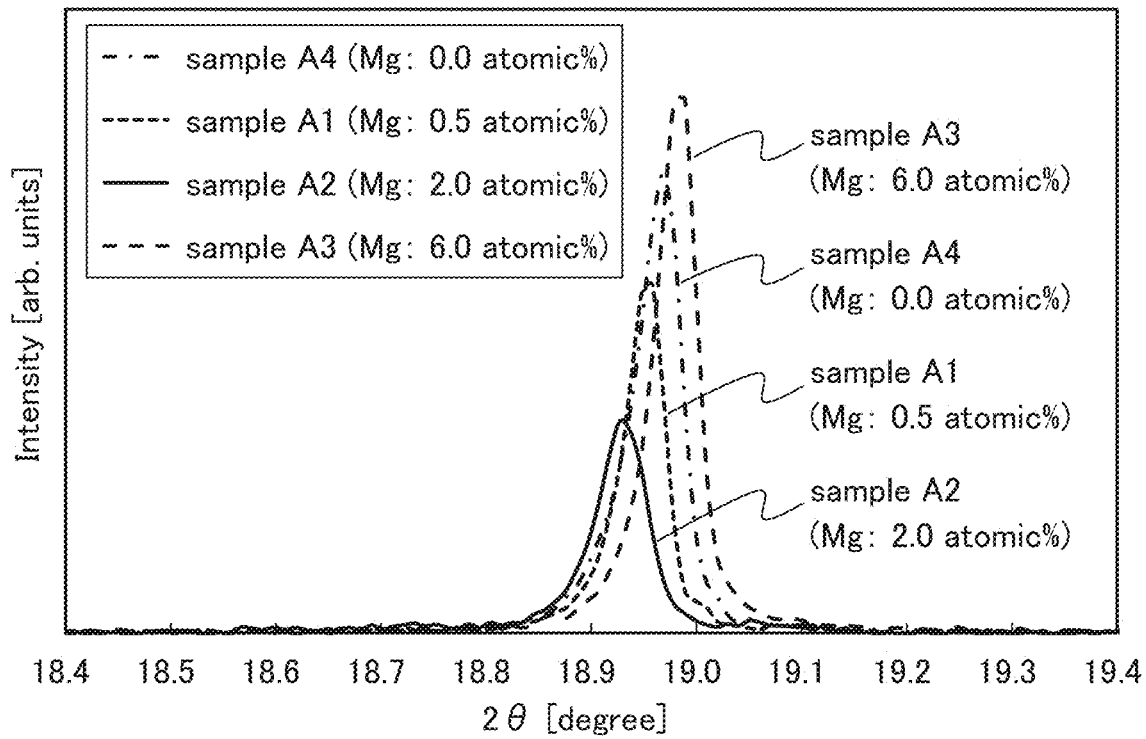
FIG. 37A and FIG. 37B are diagrams each showing XRD measurement results.
Figure 37B:
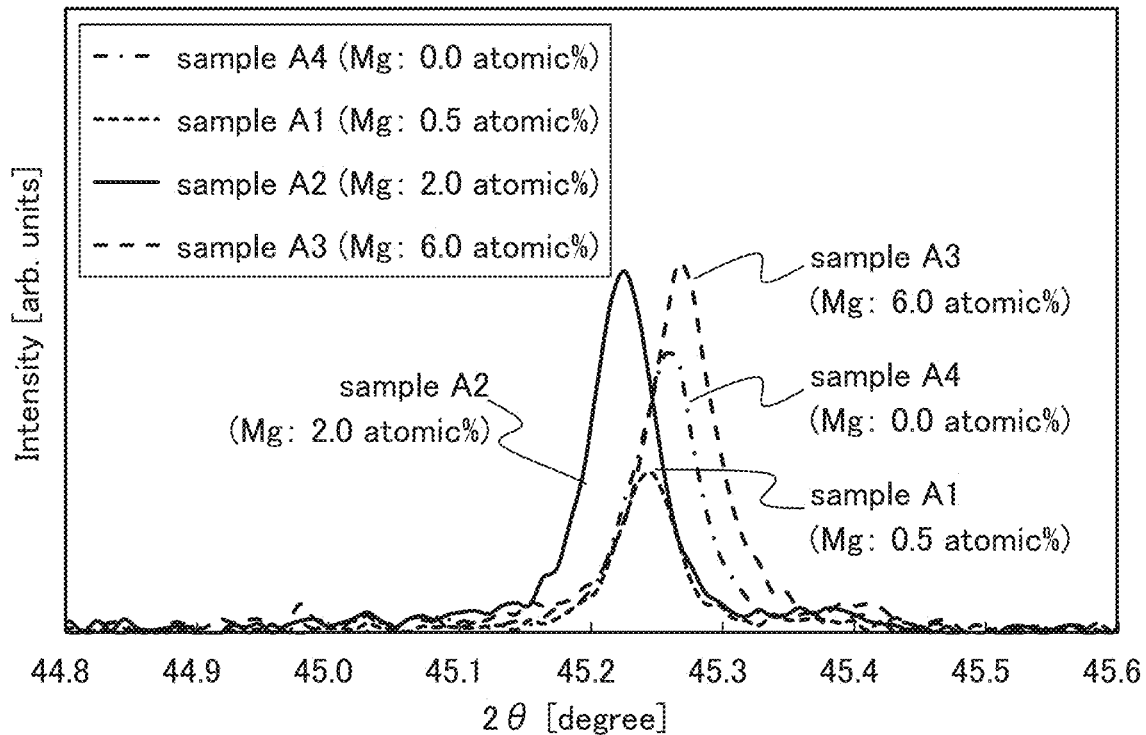
Figure 38:
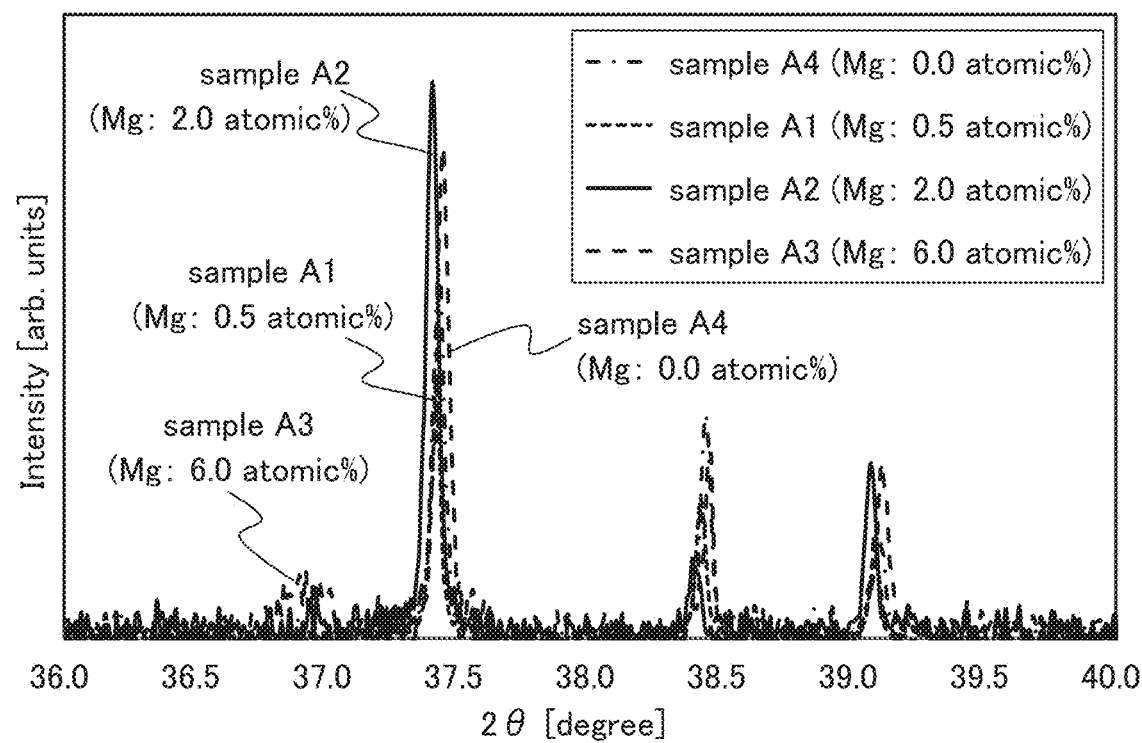
FIG. 38 is a diagram showing XRD measurement results.

Enlarged graphs of FIG. 36 are shown in FIG. 37A, FIG. 37B, and FIG. 38. In each of FIG. 36, FIG. 37A, FIG. 37B, and FIG. 38, the horizontal axis represents the diffraction angle 2θ and the vertical axis represents the intensity of diffraction X-ray.

As shown in FIG. 37A, FIG. 37B, and FIG. 38, it was found that the positions of the XRD peaks varied depending on the addition amount of magnesium. Note that in the sample A3, a peak not attributed to $LiCoO_2$ was observed at around 2θ=37 deg (see FIG. 38). When a large amount of magnesium is added and two $Mg^{2+}$ substitute for $Li^+$ and $Co^{3+}$, for example, it is probable that the valence of the whole $LiCoO_2$ does not change and thus a magnetic spin is not induced. Therefore, when the Mg concentration is too high, the magnetic spin is less likely to be induced in some cases.

The Rietveld analysis was performed on the XRD measurement results shown in FIG. 36 to obtain the crystal size and the crystal lattice. Software (TOPAS) from Bruker AXS was used for the Rietveld analysis and the R-3m structure was used as a space group.

Figure 39A:
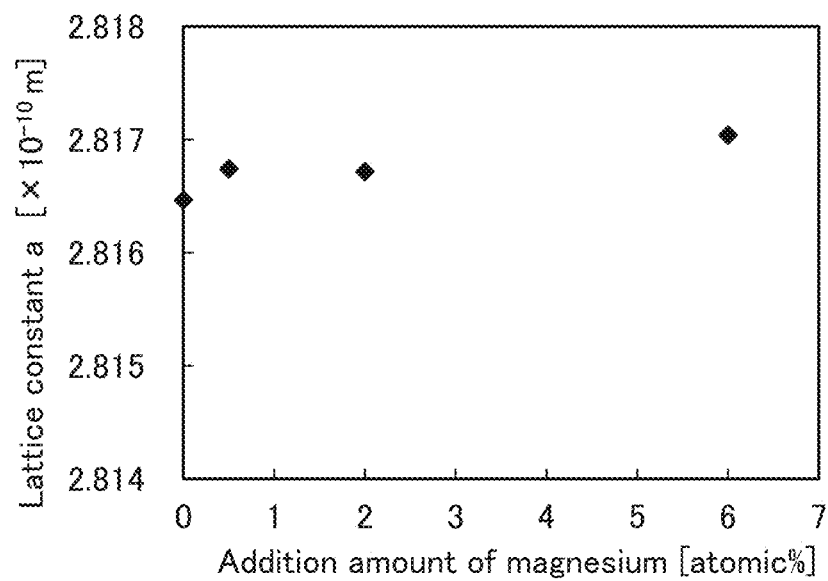
FIG. 39A and FIG. 39B are diagrams showing the lattice constants.
Figure 39B:
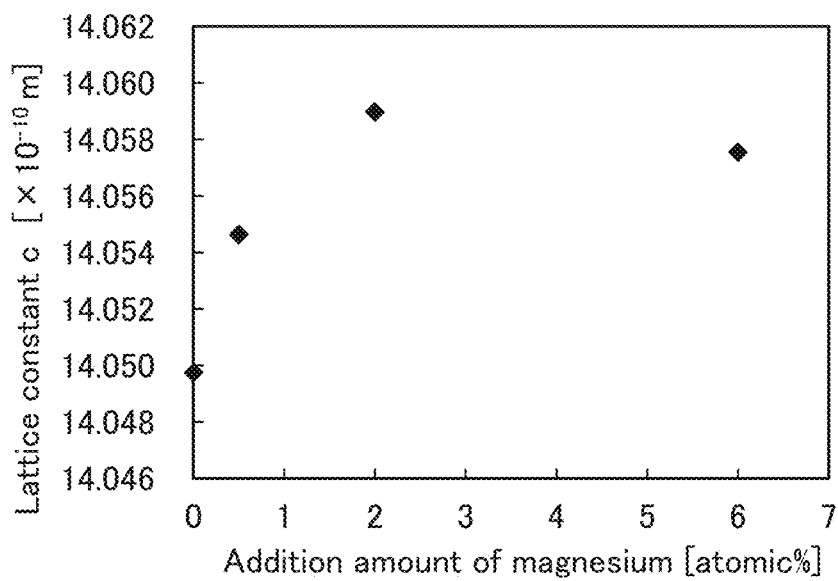

Table 2 shows the crystal sizes and the crystal lattices of the sample A1 to the sample A4 obtained by the Rietveld analysis. FIG. 39A and FIG. 39B show lattice constants. In FIG. 39A and FIG. 39B, the horizontal axes represent the addition amount of magnesium and the vertical axes represent a lattice constant a or a lattice constant c.

TABLE 2

|  |  |  | Lattice constant | |
|---|---|---|---|---|
|  | GOF | Crystal size [nm] | a [×10⁻¹⁰ m] | c [×10⁻¹⁰ m] |
| sample A4 (Mg: 0.0 atomic %) | 1.14 | 540 | 2.816465 | 14.04975 |
| sample A1 (Mg: 0.5 atomic %) | 1.10 | 869 | 2.816743 | 14.05464 |
| sample A2 (Mg: 2.0 atomic %) | 1.05 | 445 | 2.816717 | 14.05897 |
| sample A3 (Mg: 6.0 atomic %) | 1.18 | 591 | 2.817040 | 14.05754 |

As shown in Table 2, in each of the sample A1 to the sample A4, the lattice constant of the a-axis was greater than or equal to $2.8155 \times 10^{-10}$ m and $2.8175 \times 10^{-10}$ m, and the lattice constant of the c-axis was greater than or equal to $14.045 \times 10^{-10}$ m and less than or equal to $14.065 \times 10^{-10}$ m. It was also found that the lattice constants tended to increase as the addition amount of magnesium increased and there was a small difference in the lattice constant among the samples.

Next, secondary batteries were fabricated using the sample A1 to the sample A4 and the cycle performances were evaluated.

[Fabrication Method of Secondary Battery]

Positive electrodes were fabricated using the sample A1 to the sample A4 as the positive electrode materials.

[Cycle Performance 1]

Then, the cycle performances of the sample A1 to the sample A4 were evaluated. The carried amount of the positive electrode was set to 20 mg/cm$^2$ and the upper limit voltage in charging was set to 4.5 V.

First, two cycles of the CCCV charging (at a rate of 0.05 C, 4.5 V, a termination current of 0.005 C) and the CC discharging (at a rate of 0.05 C, 2.5 V) were performed at 25° C. for measurement. After that, the CCCV charging (at a rate of 0.2 C, 4.5 V, a termination current of 0.02 C) and the CC discharging (0.2 C, 2.5 V) were repeatedly performed at 25° C., and then the cycle performances were evaluated.

Figure 40A:
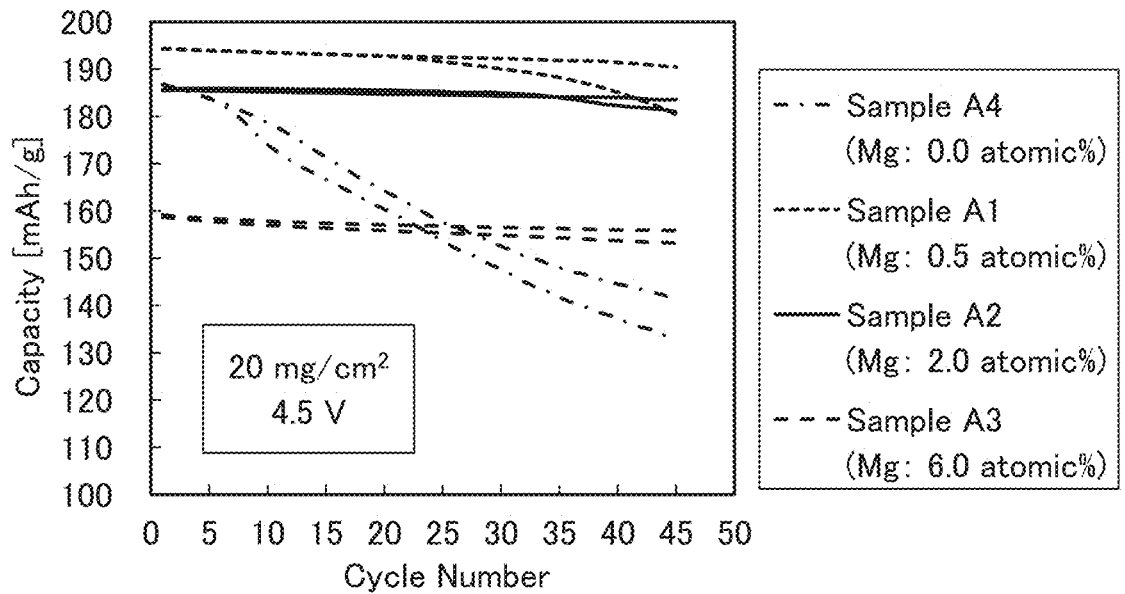
FIG. 40A and FIG. 40B are diagrams each showing cycle performances.
Figure 40B:
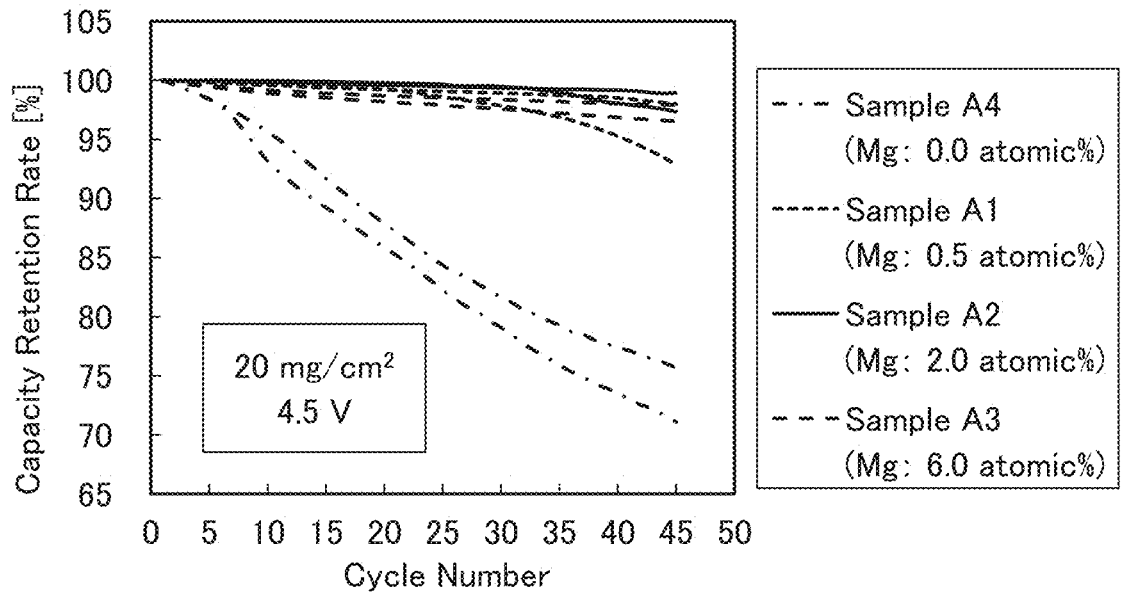

FIG. 40A and FIG. 40B show the cycle performances of the sample A1 to the sample A4. In FIG. 40A, the horizontal axis represents the cycle number and the vertical axis represents the capacity at the time of discharging. In FIG. 40B, the horizontal axis represents the cycle number and the vertical axis represents the capacity retention rate at the time of discharging. The capacity retention rate at the time of discharging is a percentage of a capacity in each cycle to the maximum capacity value at the time of discharging.

As shown in FIG. 40A and FIG. 40B, the sample A1 to the sample A3 in which magnesium was added were found to have more favorable cycle performance than the sample A4 in which magnesium was not added. In particular, the sample A1 and the sample A2 were found to have high capacity and excellent cycle performance.

[Cycle Performance 2]

Next, the cycle performance was evaluated while the carried amount of the positive electrode was set to 20 mg/cm$^2$ and the upper limit voltage in charging was set to 4.6 V.

First, two cycles of the CCCV charging (at a rate of 0.05 C, 4.6 V, a termination current of 0.005 C) and the CC discharging (at a rate of 0.05 C, 2.5 V) were performed at 25° C. for measurement. After that, the CCCV charging (at a rate of 0.2 C, 4.6 V, a termination current of 0.02 C) and the CC discharging (at a rate of 0.2 C, 2.5 V) were repeatedly performed at 25° C., and then the cycle performances were evaluated.

Figure 41A:
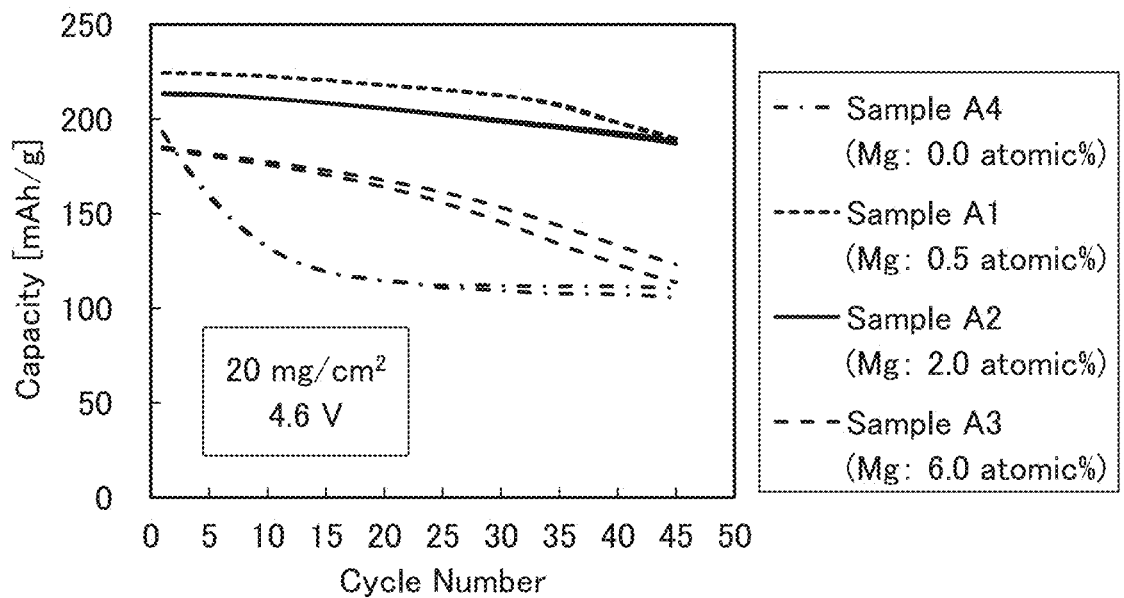
FIG. 41A and FIG. 41B are diagrams each showing cycle performances.
Figure 41B:
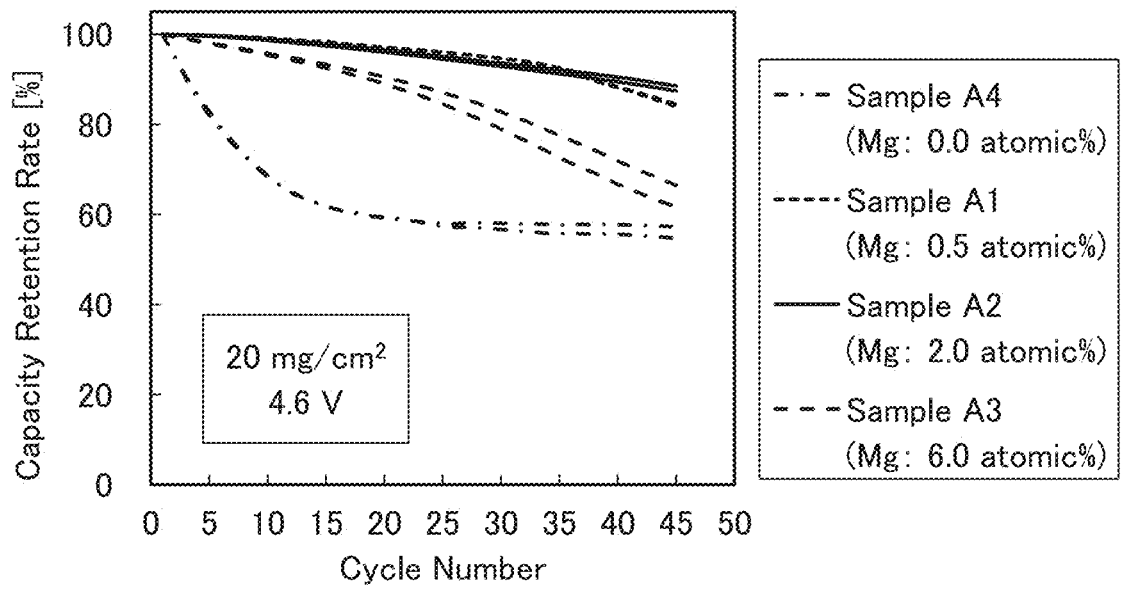

FIG. 41A and FIG. 41B show the cycle performances of the sample A1 to the sample A4.

As shown in FIG. 41A and FIG. 41B, the sample A1 to the sample A3 in which magnesium was added were found to have more favorable cycle performance than the sample A4 in which magnesium was not added. In particular, the sample A1 and the sample A2 were found to have high capacity and excellent cycle performance.

[Continuous Charging Tolerance]

Next, the continuous charge tolerances of the secondary batteries using the positive electrode active materials were evaluated. First, two cycles of the CCCV charging (at a rate of 0.05 C, 4.5 V or 4.6 V, a termination current of 0.005 C) and the CC discharging (at a rate of 0.05 C, 2.5 V) were performed at 25° C. for measurement.

After that, the CCCV charging (at a rate of 0.05 C) was performed at 60° C. The upper limit voltage was set to 4.55 V or 4.65 V, and the time until the voltage of the secondary battery became below the value obtained by subtracting 0.01 V from the upper limit voltage (4.54 V when the upper limit voltage was 4.55 V) was measured as a termination condition. In the case where the voltage of the secondary battery was lower than the upper limit voltage, a phenomenon such as a short circuit might have occurred. 1 C was set to approximately 200 mA/g.

Figure 42A:
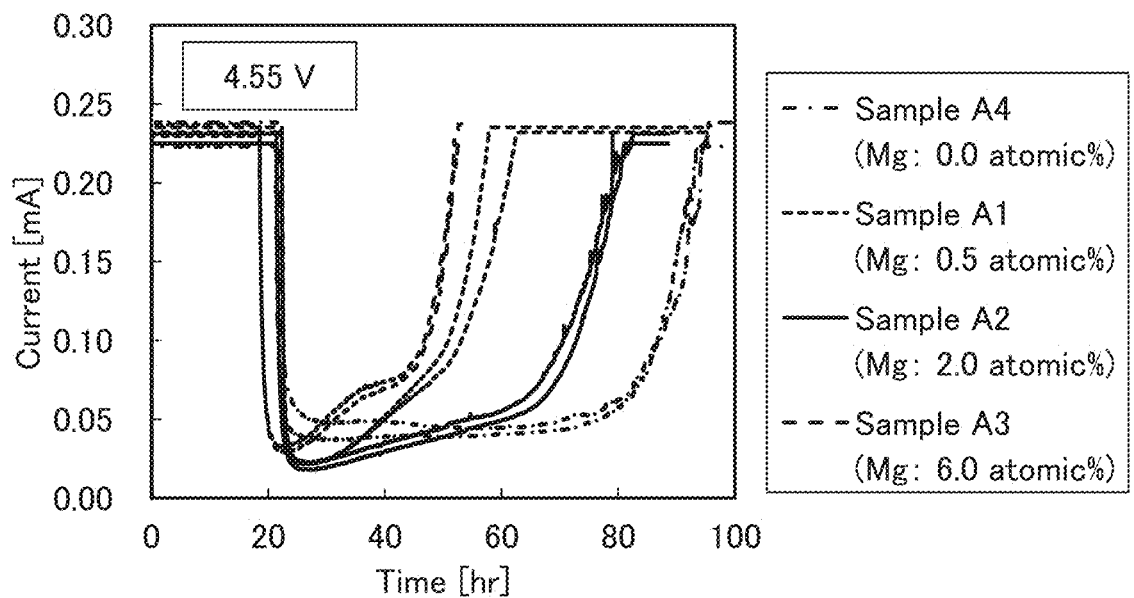
FIG. 42A and FIG. 42B are diagrams each showing continuous charging characteristics.
Figure 42B:
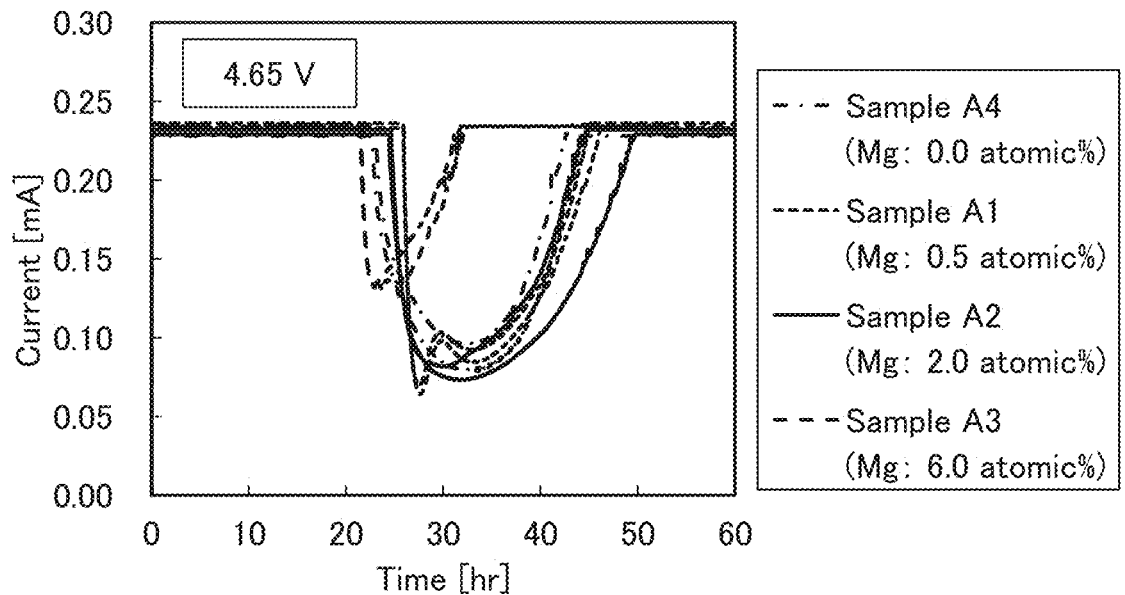

FIG. 42A and FIG. 42B show the evaluation results of the continuous charging tolerance. FIG. 42A shows the evaluation results of the continuous charging tolerance in the case where the charging voltage was set to 4.55 V. FIG. 42B shows the evaluation results of the continuous charging tolerance in the case where the charging voltage was set to 4.65 V. In each of FIG. 42A and FIG. 42B, the horizontal axis represents the time and the vertical axis represents the current.

As shown in FIG. 42A and FIG. 42B, the continuous charging tolerance increased as the addition amount of magnesium increased. Moreover, it was found that the sample A3 in which 6.0 atomic % of magnesium was added tended to have lower continuous charging tolerance.

Example 2

In this example, lithium cobalt oxide (a sample B1) of one embodiment of the present invention was fabricated by a fabrication method different from that in Example 1 described above, and then ESR analysis was performed thereon. As a comparative example, lithium cobalt oxide (a sample B2) in which magnesium was not added was also fabricated. Furthermore, secondary batteries were fabricated using these lithium cobalt oxides, and the cycle performances in high-voltage charging were evaluated.

[Fabrication Method of Positive Electrode Active Material]

<Sample B1>

The sample B1 was fabricated using a halogen source, a lithium source, a magnesium source, and a cobalt source as starting materials (see FIG. 10).

First, the starting materials were weighed. Lithium carbonate ($Li_2CO_3$) as the lithium source, tricobalt tetroxide ($Co_3O_4$) as the cobalt source, magnesium oxide (MgO) as the magnesium source, and lithium fluoride (LiF) as the fluorine source were used.

Specifically, 3.1489 g (42.62 mmol) of $Li_2CO_3$, 6.7726 g (28.13 mmol) of $Co_3O_4$, 0.0344 g (0.85 mmol) of MgO, and 0.0442 g (1.70 mmol) of LiF were weighed. The amounts allow the ratio of the number of magnesium atoms to the number of cobalt atoms to be 1.0 atomic %. Note that $Li_2CO_3$ used is a product of Kojundo Chemical Laboratory Co., Ltd. (catalog No. LIHO6XB). MgO used is a product of Kojundo Chemical Laboratory Co., Ltd. (catalog No. MGO12PB). LiF used is a product of Kojundo Chemical Laboratory Co., Ltd. (catalog No. LIH10XB).

Next, the starting materials were mixed. A wet ball mill was used for the mixing. Specifically, with the use of a 3-mmφ-ball and acetone as a solvent, grinding and mixing were performed at a spinning rate of 300 rpm for 2 hours.

Then, first heat treatment was performed on the mixed materials. In the first heat treatment, with the use of a muffle furnace, the temperature was increased from room temperature to 1000° C. at a temperature rising rate of 200° C./h and heating at 1000° C. was continued for 10 hours. The first heat treatment was performed in a dry air atmosphere, and the flow rate of the dry air was 10 L/min.

Then, the materials subjected to the first heat treatment were cooled to room temperature. After the cooling, crushing treatment was performed on the materials to reduce the particle diameters of the materials. A 53-μm mesh was used for the crushing treatment.

Then, second heat treatment was performed on the material. In the second heat treatment, with the use of a muffle furnace, the temperature was increased from room temperature to 800° C. at a temperature rising rate of 200° C./h and heating at 800° C. was continued for 2 hours. The second heat treatment was performed in a dry air atmosphere and the flow rate of the dry air was 10 L/min.

Next, the materials subjected to the heat treatment were cooled to room temperature and then collected, whereby the sample B1 was obtained.

<Sample B2>

The sample B2 was fabricated using a lithium source and a cobalt source as starting materials. For the sample B2 that is the comparative example, a magnesium source and a halogen source were not used.

First, the starting materials were weighed. Lithium carbonate ($Li_2CO_3$) as the lithium source, tricobalt tetroxide ($Co_3O_4$) as the cobalt source, magnesium oxide (MgO) as the magnesium source, and lithium fluoride (LiF) as the fluorine source were used.

Specifically, 3.1521 g (42.66 mmol) of $Li_2CO_3$ and 6.8479 g (28.44 mmol) of $Co_3O_4$ were weighed. Since the description of the sample B1 can be referred to for the other steps, the detailed description is omitted.

[ESR Analysis]

Next, ESR analysis was performed on the sample B1 and the sample B2. In the ESR analysis, a high frequency power (microwave power) of 9.15 GHz was set as 1 mW, a magnetic field was swept from 0 mT to 500 mT, and the measurement temperature was set to 300 K (approximately 27° C.), 200 K (approximately −73° C.), and 113 K (approximately −160° C.). As for the weight of the samples used for the ESR analysis, the sample B1 was 0.0044 g and the sample B2 was 0.0045 g.

Figure 43A:
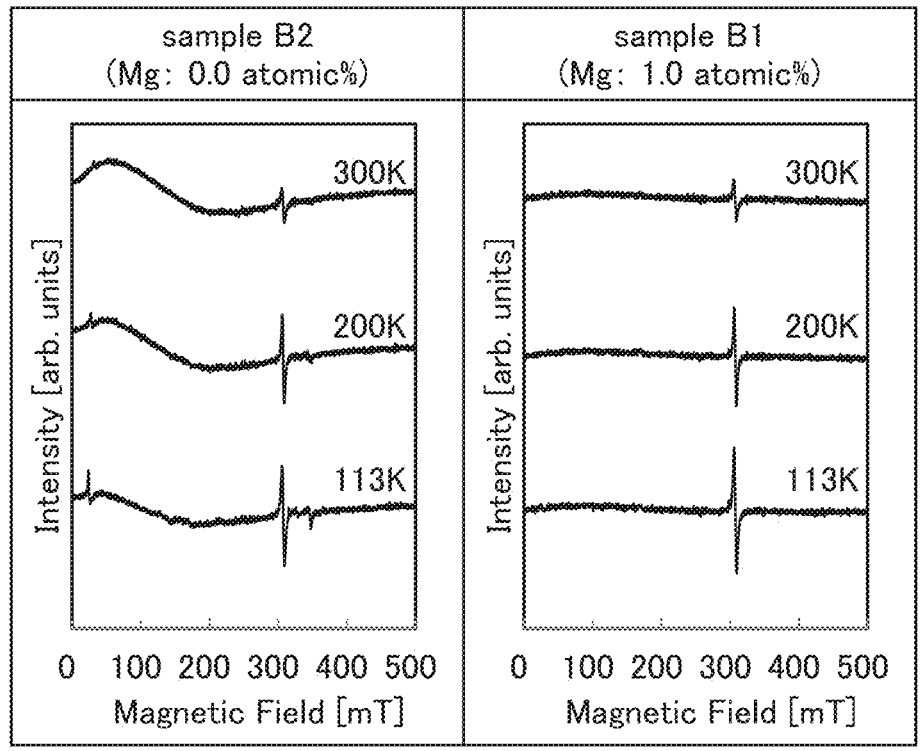
FIG. 43A and FIG. 43B are diagrams each showing ESR measurement results.
Figure 43B:
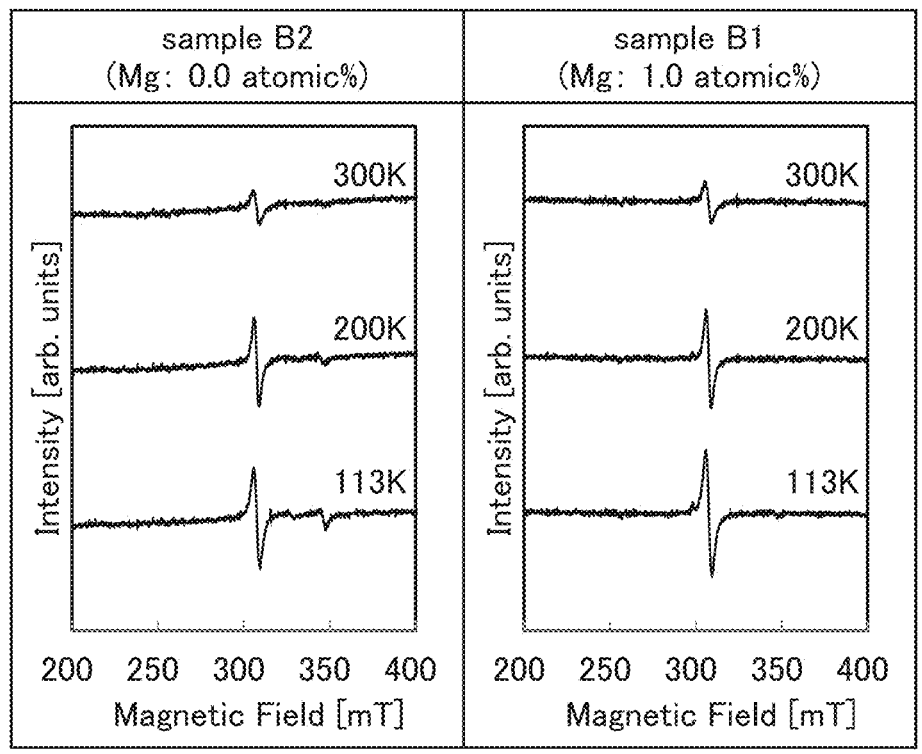

FIG. 43A shows the ESR measurement results of the sample B1 and the sample B2. FIG. 43B shows an enlarged view of FIG. 43A. In each of FIG. 43A and FIG. 43B, the horizontal axis represents the magnetic field and the vertical axis represents the intensity of ESR signal. Note that the signal intensity indicates a first derivative value of the absorption amount of microwave.

As shown in FIG. 43A, broad peaks were observed at around 130 mT (g=5.1) in the sample B2 that is the comparative example in which magnesium was not added. This results indicated the existence of oxygen-tetracoordinated Co in the sample B2.

Figure 44A:
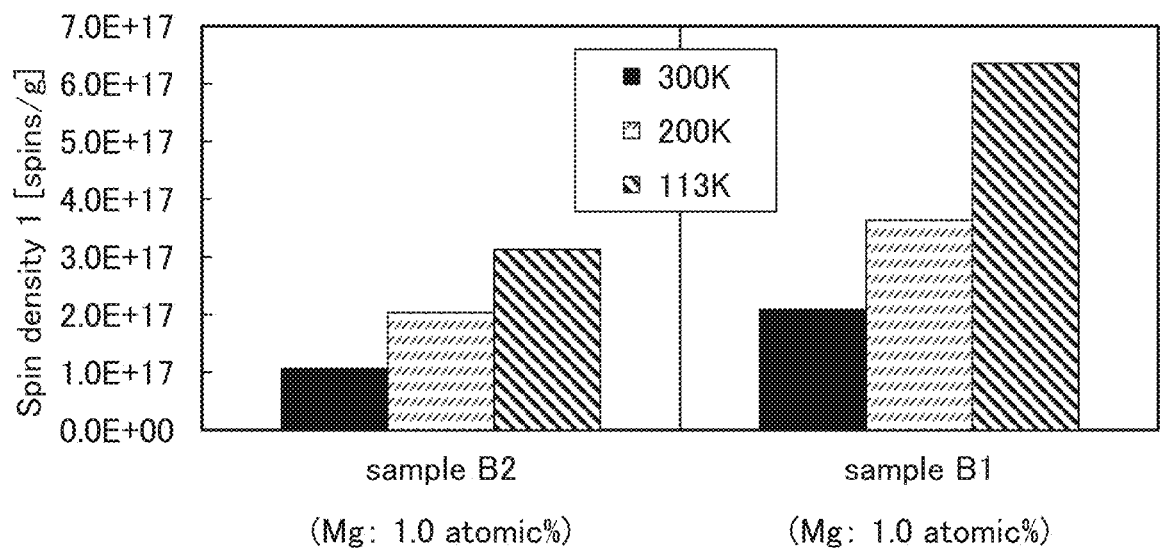
FIG. 44A and FIG. 44B are diagrams each showing the spin densities.
Figure 44B:
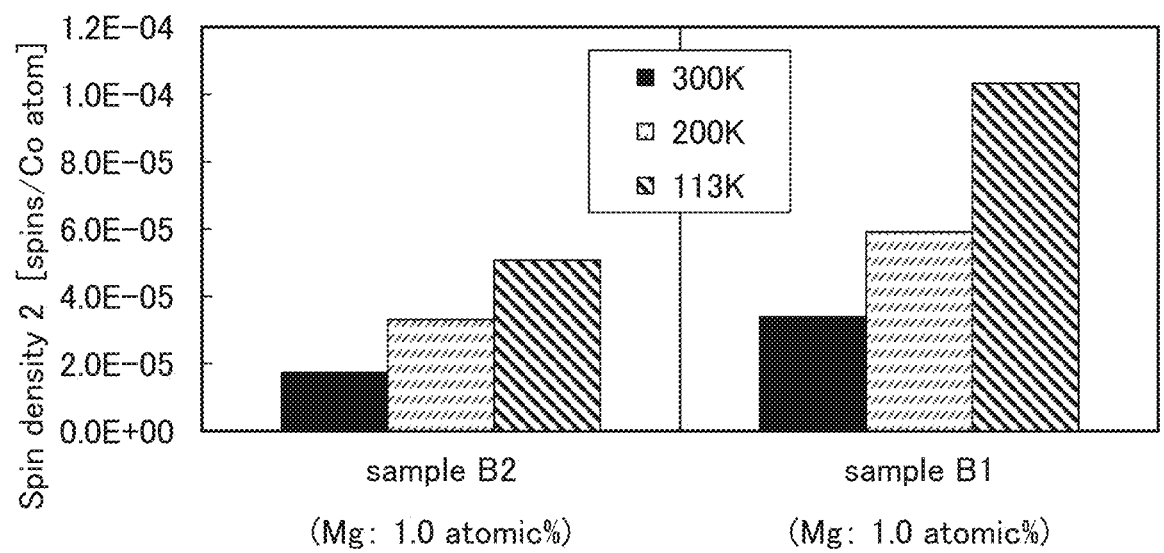

As shown in FIG. 43A and FIG. 43B, sharp signals were observed at around 305 mT (g=2.15) in both samples. The signals at around 305 mT (g=2.15) are attributed to $Co^{2+}$ and $Co^{4+}$. Table 3 shows the number of spins calculated from the signal intensity at around 305 mT (g=2.15). Table 3 also shows the spin density 1 and the spin density 2 calculated from the number of spins. The spin density 1 shown in Table 1 is a value obtained by dividing the number of spins by the weight of the sample (0.005 g). In addition, the spin density 2 shown in Table 3 is a value obtained by calculating the number of cobalt atoms in each sample whose composition is $LiCoO_2$ with a molecular weight of 97.87, and then dividing the number of spins by the number of cobalt atoms. FIG. 44A shows the spin density 1 of the sample B1 and the sample B2 and FIG. 44B shows the spin density 2 thereof. In FIG. 44A and FIG. 44B, the horizontal axes represent the sample name and the vertical axes represent the spin density 1 or the spin density 2.

TABLE 3

|  | ESR measurement temperature [K] | Number of spins [spins] | Spin density 1 [spins/g] | Spin density 2 [spins/Co atom] |
| --- | --- | --- | --- | --- |
| sample B2 (Mg: 0.0 atomic %) | 300 | 4.8E+14 | 1.1E+17 | 1.7E−05 |
|  | 200 | 9.2E+14 | 2.0E+17 | 3.3E−05 |
|  | 113 | 1.4E+15 | 3.1E+17 | 5.1E−05 |
| sample B1 (Mg: 1.0 atomic %) | 300 | 9.2E+14 | 2.1E+17 | 3.4E−05 |
|  | 200 | 1.6E+15 | 3.6E+17 | 5.9E−05 |
|  | 113 | 2.8E+15 | 6.3E+17 | 1.0E−04 |

As shown in Table 3, FIG. 44A, and FIG. 44B, the sample B1 that is one embodiment of the present invention was found to have higher spin density at lower measurement temperature of the ESR analysis and to show paramagnetism, in accordance with the Curie-Weiss law. In contrast, the sample B2 that is the comparative example seemed to be paramagnetic but had a low spin density.

Figure 45A:
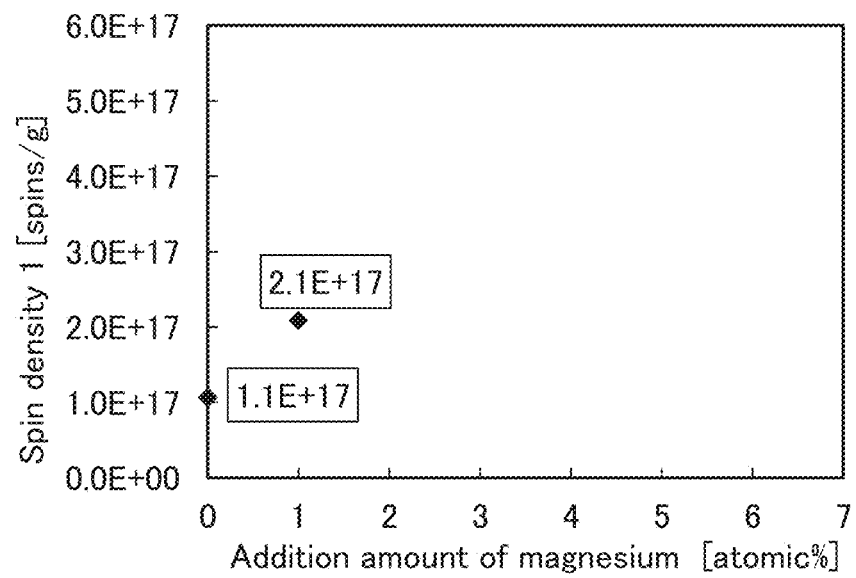
FIG. 45A and FIG. 45B are diagrams each showing the correlation between the addition amount of magnesium and the spin density.
Figure 45B:
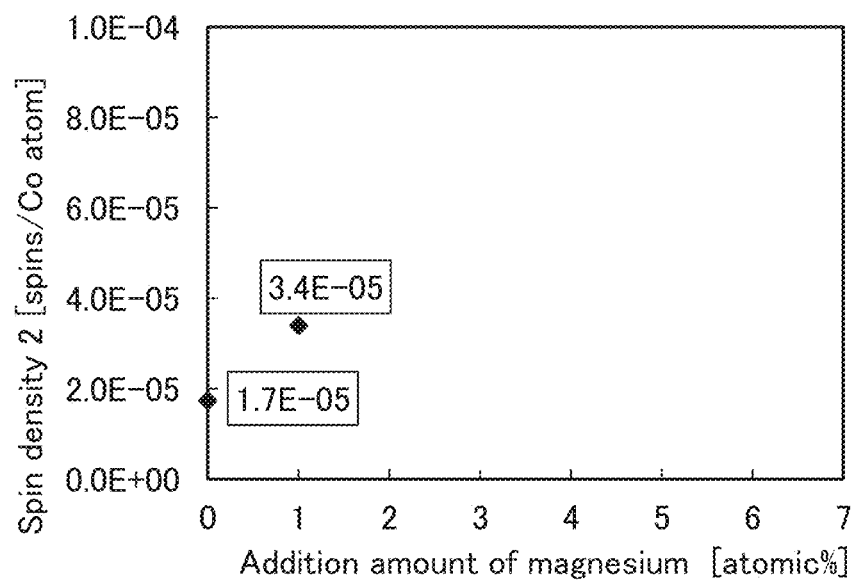

FIG. 45A shows the correlation between the spin density 1 obtained from the ESR analysis at 300 K (approximately 27° C.) and the addition amount of magnesium with respect to cobalt. FIG. 45B shows the correlation between the spin density 2 and the addition amount of magnesium with respect to cobalt. In FIG. 45A and FIG. 45B, the horizontal axes represent the addition amount of magnesium and the vertical axes represent the spin density 1 or the spin density 2.

As shown in FIG. 45A, in the sample B2 in which magnesium was not added, the spin density attributed to $Co^{2+}$ and $Co^{4+}$ per weight of the positive electrode active material was $1.1 \times 10^{17}$ spins/g. In contrast, the spin density of the sample B1 in which 1.0 atomic % of magnesium was added was $2.1 \times 10^{17}$ spins/g, which is greater than or equal to $2.0 \times 10^{17}$ spins/g and less than or equal to $1.0 \times 10^{18}$ spins/g.

As shown in FIG. 45B, in the sample B2 in which magnesium was not added, the spin density attributed to $Co^{2+}$ and $Co^{4+}$ per Co atom was $1.7 \times 10^{-5}$ spins/Co atom. In contrast, the spin density of the sample B1 in which 1.0 atomic % of magnesium was added was $3.4 \times 10^{-5}$ spins/Co atom, which is greater than or equal to $3.3 \times 10^{-5}$ spins/Co atom and less than or equal to $1.6 \times 10^{-4}$ spins/Co atom.

[Fabrication Method of Secondary Battery]

Positive electrodes were fabricated using the sample B1 and the sample B2 as the positive electrode materials.

[Cycle Performance]

Then, the cycle performances of the sample B1 and the sample B2 were evaluated. The carried amount of the positive electrode was set to approximately 7 mg/cm² and the upper limit voltage in charging was set to 4.6 V.

First, two cycles of the CCCV charging (0.05 C, 4.6 V, a termination current of 0.005 C) and the CC discharging (0.05 C, 2.5 V) were performed at 25° C. for measurement. After that, the CCCV charging (0.2 C, 4.6 V, a termination current of 0.02 C) and the CC discharging (0.2 C, 2.5 V) were repeatedly performed at 25° C., and then the cycle performance was evaluated.

Figure 46A:
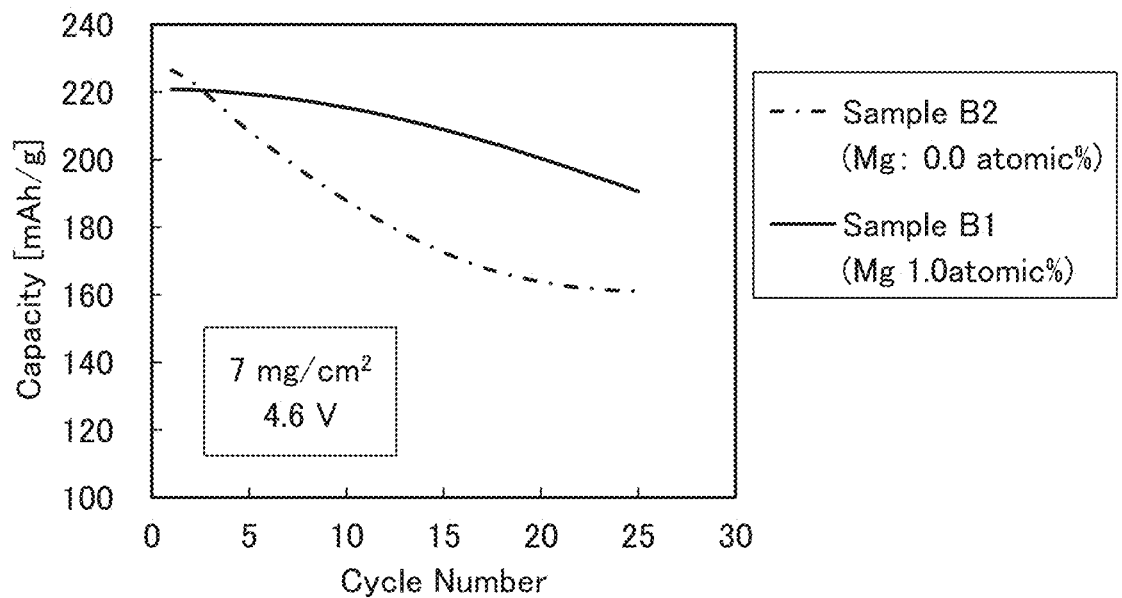
FIG. 46A and FIG. 46B are diagrams each showing cycle performances.
Figure 46B:
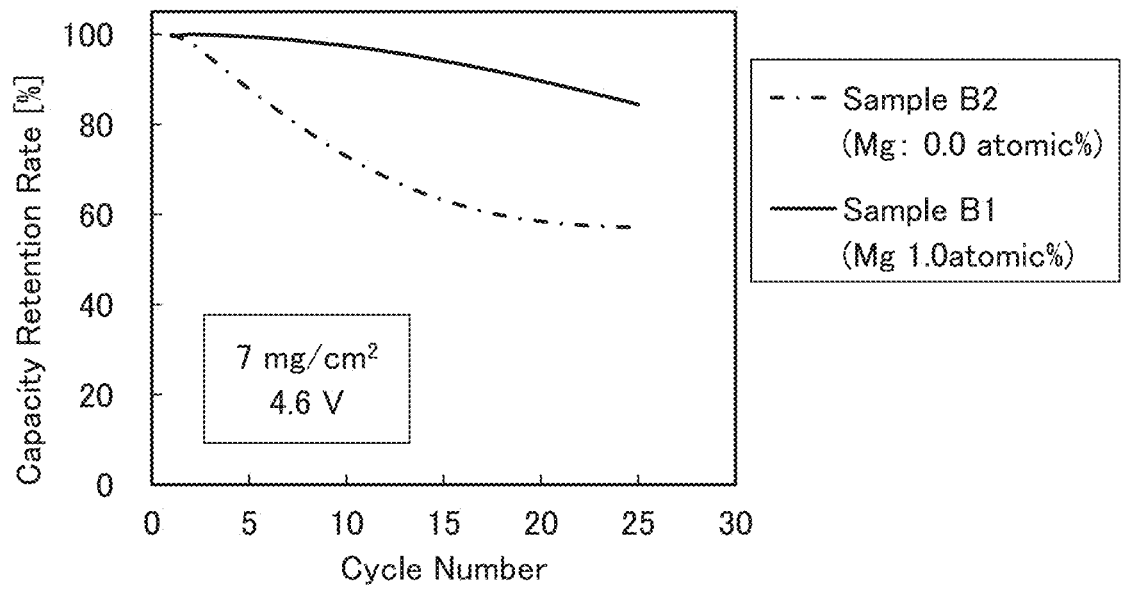

FIG. 46A and FIG. 46B show the cycle performances of the sample A1 to the sample A4. In FIG. 46A, the horizontal axis represents the cycle number and the vertical axis represents the capacity at the time of discharging. In FIG. 46B, the horizontal axis represents the cycle number and the vertical axis represents the capacity retention rate at the time of discharging. The capacity retention rate at the time of discharging is a percentage of a capacity in each cycle to the maximum capacity value at the time of discharging.

As shown in FIG. 46A and FIG. 46B, the sample B1 in which magnesium was added was found to have more favorable cycle performance than the sample B2 in which magnesium was not added.

REFERENCE NUMERALS

100: positive electrode active material, 200: active material layer, 201: graphene compound, 210: electrode stack, 211*a*: positive electrode, 211*b*: negative electrode, 212*a*: lead, 212*b*: lead, 214: separator, 215*a*: bonding portion, 215*b*: bonding portion, 217: fixing member, 250: secondary battery, 251: external body, 261: folded portion, 262: seal portion, 263: seal portion, 271: crest line, 272: trough line, 273: space, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: external body, 510: positive electrode lead electrode, 511: negative electrode lead electrode, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 613: conductive plate, 614: conductive plate, 615: module, 616: wiring, 617: temperature control device, 900: circuit board, 910: label, 911: terminal, 912: circuit, 913: secondary battery, 914: antenna, 915: seal, 916: layer, 917: layer, 918: antenna, 920: display device, 921: sensor, 922: terminal, 930: housing, 930*a*: housing, 930*b*: housing, 931: negative electrode, 932: positive electrode, 933: separator, 950: wound body, 951: terminal, 952: terminal, 980: secondary battery, 981: film, 982: film, 993: wound body, 994: negative electrode, 995: positive electrode, 996: separator, 997: lead electrode, 998: lead electrode, 7100: portable display device, 7101: housing, 7102: display portion, 7103: operation button, 7104: secondary battery, 7200: portable information terminal, 7201: housing, 7202: display portion, 7203: band, 7204: buckle, 7205: operation button, 7206: input output terminal, 7207: icon, 7300: display device, 7304: display portion, 7400: mobile phone, 7401: housing, 7402: display portion, 7403: operation button, 7404: external connection port, 7405: speaker, 7406: microphone, 7407: secondary battery, 7500: electronic cigarette, 7501: atomizer, 7502: cartridge, 7504: secondary battery, 8000: display device, 8001: housing, 8002: display portion, 8003: speaker portion, 8004: secondary battery, 8021: charging apparatus, 8022: cable, 8024: secondary battery, 8100: lighting device, 8101: housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: car, 8401: head light, 8406: electric motor, 8500: car, 8600: scooter, 8601: side mirror, 8602: secondary battery, 8603: direction indicator, 8604: under-seat storage, 9600: tablet terminal, 9625: switch, 9627: switch, 9628: operation switch, 9629: fastener, 9630: housing, 9630*a*: housing, 9630*b*: housing, 9631: display portion, 9631*a*: display portion, 9631*b*: display portion, 9633: solar cell, 9634: charging and discharging control circuit, 9635: power storage unit, 9636: DCDC converter, 9637: converter, 9640: movable portion

The invention claimed is:

1. A positive electrode active material comprising:
lithium, cobalt, magnesium, and oxygen,
wherein the positive electrode active material comprises a first crystal structure in a discharged state,
wherein a constant lattice of a-axis of the first crystal structure is greater than or equal to $2.8155 \times 10^{-10}$ m and less than or equal to $2.8175 \times 10^{-10}$ m,
wherein a constant lattice of c-axis of the first crystal structure is greater than or equal to $14.045 \times 10^{-10}$ m and less than or equal to $14.065 \times 10^{-10}$ m, and
wherein a spin density attributed to one or both of a bivalent cobalt ion and a tetravalent cobalt ion is greater than or equal to $2.0 \times 10^{17}$ spins/g and less than or equal to $1.0 \times 10^{18}$ spins/g.

2. The positive electrode active material according to claim 1, wherein a concentration of the magnesium with respect to the cobalt is greater than or equal to 0.1 atomic % and less than or equal to 6.0 atomic %.

3. The positive electrode active material according to claim 1, wherein the spin density is measured at a temperature set to 300 K.

4. The positive electrode active material according to claim 1, wherein the spin density is measured at a temperature set to 200 K.

5. The positive electrode active material according to claim 1, wherein the spin density is measured at a temperature set to 113 K.

6. A positive electrode active material comprising:
lithium, cobalt, magnesium, and oxygen,
wherein a first spin density attributed to one or both of a bivalent cobalt ion and a tetravalent cobalt ion is greater than or equal to $2.0 \times 10^{17}$ spins/g and less than or equal to $1.0 \times 10^{18}$ spins/g,
wherein the first spin density is measured at a temperature set to 300 K,
wherein a second spin density attributed to one or both of a bivalent cobalt ion and a tetravalent cobalt ion is greater than or equal to $2.0\times10^{17}$ spins/g and less than or equal to $1.0\times10^{18}$ spins/g, wherein the second spin density is measured at a temperature set to 200 K, wherein a third spin density attributed to one or both of a bivalent cobalt ion and a tetravalent cobalt ion is greater than or equal to $2.0\times10^{17}$ spins/g and less than or equal to $1.0\times10^{18}$ spins/g, wherein the third spin density is measured at a temperature set to 113 K, wherein the third spin density is larger than the second spin density, and wherein the second spin density is larger than the first spin density.

7. The positive electrode active material according to claim 6, wherein a concentration of the magnesium with respect to the cobalt is greater than or equal to 0.1 atomic % and less than or equal to 6.0 atomic %.

8. The positive electrode active material according to claim 6, wherein the positive electrode active material comprises a first crystal structure in a discharged state, wherein a constant lattice of a-axis of the first crystal structure is greater than or equal to $2.8155\times10^{-10}$ m and less than or equal to $2.8175\times10^{-10}$ m, and wherein a constant lattice of c-axis of the first crystal structure is greater than or equal to $14.045\times10^{-10}$ m and less than or equal to $14.065\times10^{-10}$ m.

* * * * *